US012670853B2

(12) United States Patent
Gao et al.

(10) Patent No.: US 12,670,853 B2
(45) Date of Patent: Jun. 30, 2026

(54) PIXEL CIRCUIT, DRIVING METHOD THEREFOR, DISPLAY SUBSTRATE AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Wenhui Gao, Beijing (CN); Yonglin Guo, Beijing (CN); Tiaomei Zhang, Beijing (CN); Jingwen Zhang, Beijing (CN); Zhiliang Jiang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 20 days.

(21) Appl. No.: 18/554,998

(22) PCT Filed: Feb. 24, 2023

(86) PCT No.: PCT/CN2023/078087

§ 371 (c)(1),
(2) Date: Oct. 12, 2023

(87) PCT Pub. No.: WO2024/174220

PCT Pub. Date: Aug. 29, 2024

(65) Prior Publication Data

US 2025/0124861 A1 Apr. 17, 2025

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ......... G09G 3/3233; G09G 2300/0426; G09G 2300/0819; G09G 2300/0852;
(Continued)

(56) References Cited

U.S. PATENT DOCUMENTS 8,334,825 B2 * 12/2012 Kim .................... G09G 3/3233 345/82
8,912,989 B2 * 12/2014 Chung ................ G09G 3/3241 345/77

(Continued)

FOREIGN PATENT DOCUMENTS

CN 106097965 A 11/2016
CN 107591124 A 1/2018

(Continued)

OTHER PUBLICATIONS

European Search Report for 23923396.8 Mailed Jul. 16, 2025.

*Primary Examiner* — Julie Anne Watko
(74) *Attorney, Agent, or Firm* — Ling Wu; Stephen Yang; Ling and Yang Intellectual Property

(57) ABSTRACT

A pixel circuit includes a driving sub-circuit, a data writing sub-circuit, a compensation sub-circuit, a storage sub-circuit, and a first control sub-circuit. The data writing sub-circuit is configured to write a data signal provided by a data line into a second node under control of a first scan line. The compensation sub-circuit is configured to write a threshold voltage of the driving sub-circuit into the first node under control of a second scan line. A period of time for which the data writing sub-circuit writes the data signal into the second node is shorter than a period of time for which the compensation sub-circuit writes the threshold voltage of the driving sub-circuit into the first node.

4 Claims, 43 Drawing Sheets

(52) U.S. Cl.
CPC ............... *G09G 2300/0852* (2013.01); *G09G 2300/0861* (2013.01); *G09G 2310/08* (2013.01); *G09G 2340/0435* (2013.01)

(58) Field of Classification Search
CPC ....... G09G 2300/0861; G09G 2310/08; G09G 2340/0435
See application file for complete search history.

(56) References Cited

U.S. PATENT DOCUMENTS

| | | | | |
|---|---|---|---|---|
| 2009/0109150 | A1* | 4/2009 | Han | G09G 3/3266 345/82 |
| 2011/0069058 | A1* | 3/2011 | Chung | G09G 3/3233 345/212 |
| 2013/0249883 | A1* | 9/2013 | Hwang | G09G 3/3275 345/212 |
| 2017/0061876 | A1* | 3/2017 | Cho | G09G 3/3233 |
| 2018/0151115 | A1 | 5/2018 | Tseng et al. | |
| 2020/0234648 | A1 | 7/2020 | Zhu et al. | |
| 2021/0035502 | A1 | 2/2021 | Lee et al. | |
| 2021/0210018 | A1 | 7/2021 | Wang et al. | |
| 2022/0051627 | A1 | 2/2022 | Yang et al. | |
| 2022/0114949 | A1 | 4/2022 | Xuan et al. | |
| 2022/0180810 | A1* | 6/2022 | Zhang | G09G 3/3241 |
| 2022/0284850 | A1 | 9/2022 | Park et al. | |
| 2022/0376015 | A1 | 11/2022 | Cheng et al. | |
| 2024/0005860 | A1* | 1/2024 | Kim | G09G 3/3291 |
| 2024/0212584 | A1* | 6/2024 | Kim | G09G 3/3233 |
| 2024/0312404 | A1* | 9/2024 | Zhang | G09G 3/3233 |

FOREIGN PATENT DOCUMENTS

| | | | | | |
|---|---|---|---|---|---|
| CN | 109192143 | A | | 1/2019 | |
| CN | 109785799 | A | | 5/2019 | |
| CN | 109961738 | A | | 7/2019 | |
| CN | 110189708 | A | | 8/2019 | |
| CN | 112382237 | A | | 2/2021 | |
| CN | 113658554 | A | | 11/2021 | |
| CN | 114241977 | A | * | 3/2022 | G09G 3/30 |
| CN | 115035831 | A | | 9/2022 | |
| CN | 115188333 | A | * | 10/2022 | |
| CN | 115662355 | A | | 1/2023 | |
| CN | 119229808 | A | * | 12/2024 | |
| EP | 4300474 | A1 | | 1/2024 | |
| KR | 1020220085299 | A | | 6/2022 | |
| WO | 2023004812 | A1 | | 2/2023 | |

* cited by examiner

PIXEL CIRCUIT, DRIVING METHOD THEREFOR, DISPLAY SUBSTRATE AND DISPLAY DEVICE

CROSS-REFERENCE TO RELATED APPLICATION

The present application is a U.S. National Phase Entry of International Application PCT/CN2023/078087 having an international filing date of Feb. 24, 2023, and entitled "Pixel Circuit, Driving Method Therefor, Display Substrate and Display Device", the contents of which are hereby incorporated herein by reference in their entireties.

TECHNICAL FIELD

The present document relates to, but is not limited to, display technologies, in particular to a pixel circuit, a method for driving the pixel circuit, a display substrate, and a display device.

BACKGROUND

An Organic Light Emitting Diode (OLED) with advantages of ultra-thin design, large field of view, active emission, high brightness, continuous and adjustable light colors, low cost, quick response, low power consumption, wide working temperature range, flexible display, and the like, has gradually become a next-generation display technology with a broad development prospect and attracted more and more attention. The OLED may be divided into a Passive Matrix (PM) type and an Active Matrix (AM) type according to different drive modes. An AMOLED is a current-driven device and controls each sub-pixel using an independent Thin Film Transistor (TFT), and each sub-pixel may be continuously and independently driven to emit light.

In recent years, with the rapid development of display industry, AMOLED display screens are used in various industries, such as mobile phones, bracelets, watches, car displays, laptop computers, televisions and so on. However, with the continuous development of industries having high requirements on refresh rate, such as real-time games, consumers have higher and higher requirements on display screens, and display screens with high refresh or even ultra-high refresh are gradually needed by various industries.

SUMMARY

The following is a summary of subject matter described herein in detail. The summary is not intended to limit the protection scope of claims.

Embodiments of the present disclosure provide a pixel circuit, a method for driving the pixel circuit, a display substrate, and a display device.

In one aspect, an embodiment of the present disclosure provides a pixel circuit including a driving sub-circuit, a data writing sub-circuit, a compensation sub-circuit, a storage sub-circuit, and a first control sub-circuit. The driving sub-circuit is coupled with a first power supply line, a first node and a third node, and is configured to provide a driving signal to the third node under control of the first node. The data writing sub-circuit is coupled with a data line, a first scan line, and a second node, and is configured to write a data signal provided by the data line into the second node under control of the first scan line. The compensation sub-circuit is coupled with a second scan line, the first node, and the third node, and is configured to turn on the first node and the third node under control of the second scan line to write a threshold voltage of the driving sub-circuit into the first node. The storage sub-circuit is coupled with the first node and the second node. The first control sub-circuit is coupled with the a first control line, a reference voltage line and the second node, and is configured to provide a reference voltage signal provided by the reference voltage line to the second node under control of the first control line after the data writing sub-circuit writes the data signal into the second node, such that the data signal written into the second node is coupled to the first node through the storage sub-circuit.

In some exemplary implementations, the pixel circuit further includes a second control sub-circuit, wherein the second control sub-circuit is coupled with a second control line, the third node and a fourth node, and is configured to transmit the driving signal to the fourth node under control of the second control line, and the fourth node is coupled with a light emitting element.

In some exemplary implementations, a period of time for which the data writing sub-circuit writes the data signal into the second node is shorter than a period of time for which the compensation sub-circuit writes the threshold voltage of the driving sub-circuit into the first node.

In some exemplary implementations, an end time at which the data writing sub-circuit ends writing the data signal into the second node is earlier than an end time at which the compensation sub-circuit ends writing the threshold voltage of the driving sub-circuit to the first node.

In some exemplary implementations, the pixel circuit further includes: a first reset sub-circuit, wherein the first reset sub-circuit is coupled with a first reset control line, a first initial signal line and the first node, or coupled with the first reset control line, a first initial signal line, and the third node; the first reset sub-circuit is configured to transmit a first initial signal provided by the first initial signal line to the first node or the third node under control of the first reset control line.

In some exemplary implementations, the first reset sub-circuit includes a first reset transistor, wherein a gate of the first reset transistor is coupled with the first reset control line, a first electrode of the first reset transistor is coupled with the first initial signal line, and a second electrode of the first reset transistor is coupled with the first node or the third node.

In some exemplary implementations, the first reset transistor is an oxide thin film transistor, or the first reset transistor is a low temperature poly-silicon thin film transistor of a double gate structure.

In some exemplary implementations, the pixel circuit further includes a second reset sub-circuit, wherein the second reset sub-circuit is coupled with a second reset control line, a second initial signal line and the fourth node, and is configured to transmit a second initial signal provided by the second initial signal line to the fourth node under control of the second reset control line.

In some exemplary implementations, the driving sub-circuit includes: a driving transistor; a gate of the driving transistor is coupled with the first node, a first electrode of the driving transistor is coupled with the first power supply line, and a second electrode of the driving transistor is coupled with the third node. The data writing sub-circuit includes a data writing transistor, wherein a gate of the data writing transistor is coupled with the first scan line, a first electrode of the data writing transistor is coupled with the data line, and a second electrode of the data writing transistor is coupled with the second node. The compensation sub-circuit includes a compensation transistor, wherein a gate of the compensation transistor is coupled with the second scan line, a first electrode of the compensation transistor is coupled with the first node, and a second electrode of the compensation transistor is coupled with the third node. The storage sub-circuit includes a storage capacitor, wherein a first plate of the storage capacitor is coupled with the first node, and a second plate of the storage capacitor is coupled with the second node. The first control sub-circuit includes a first control transistor, wherein a gate of first control transistor is coupled with the first control line, a first electrode of the first control transistor is coupled with the reference voltage line, and a second electrode of the first control transistor is coupled with the second node. The second control sub-circuit includes a second control transistor, wherein a gate of the second control transistor is coupled with the second control line, a first electrode of the second control transistor is coupled with the third node, and a second electrode of the second control transistor is coupled with the fourth node.

In some exemplary implementations, the compensation transistor is an oxide thin film transistor, or the compensation transistor is a low temperature poly-silicon thin film transistor of a double gate structure.

In some exemplary implementations, the reference voltage signal provided by the reference voltage line is the same as a first voltage signal provided by the first power supply line.

In another aspect, an embodiment of the present disclosure provides a method for driving a pixel circuit, which is applied to the pixel circuit as described in the above item. The method includes: the data writing sub-circuit writing the data signal provided by a data line to the second node under control of the first scan line; the compensation sub-circuit turning on the first node and the third node under control of the second scan line so that the threshold voltage of the driving sub-circuit is written into the first node; the first control sub-circuit providing the reference voltage signal provided by the reference voltage line to the second node under control of the first control line so that the data signal written into the second node is coupled with the first node through the storage sub-circuit.

In some exemplary implementations, the method further includes: a second control sub-circuit transmitting a driving signal output by the driving sub-circuit to a light emitting element under control of the second control line.

In some exemplary implementations, a duration of an effective level signal of the first scan line is less than a duration of an effective level signal of the second scan line.

In some exemplary implementations, the method further includes: a first reset sub-circuit transmitting a first initial signal provided by a first initial signal line to the first node or the third node under control of the first reset control line before the compensation sub-circuit writes the threshold voltage of the driving sub-circuit into the first node.

In some exemplary implementations, the method further includes: a first reset sub-circuit transmitting a first initial signal provided by a first initial signal line to the third node under control of the first reset control line after the compensation sub-circuit writes the threshold voltage of the driving sub-circuit into the first node.

In some exemplary implementations, the method further includes: a second reset sub-circuit transmitting a second initial signal provided by a second initial signal line to a fourth node under control of a second reset control line before the data writing sub-circuit writes the data signal into the second node.

In another aspect, an embodiment of the present disclosure provides a pixel circuit including a driving sub-circuit, a data writing sub-circuit, a compensation sub-circuit, a storage sub-circuit, a first control sub-circuit, and a voltage stabilizing sub-circuit. The driving sub-circuit is coupled with a first power supply line, a first node and a third node, and is configured to provide a driving signal to the third node under control of the first node. The storage sub-circuit is coupled with the first node and a second node. The data writing sub-circuit is coupled with a data line, a first scan line and the second node, and is configured to write a data signal provided by the data line into the first node through the storage sub-circuit under control of the first scan line. The compensation sub-circuit is coupled with a second scan line, the first node, and a third node, and is configured to turn on the first node and the third node under control of the second scan line to write a threshold voltage of the driving sub-circuit into the first node. The voltage stabilizing sub-circuit is coupled with the first node and a fifth node. The first control sub-circuit is coupled with a first control line, a reference voltage line and the fifth node, and is configured to provide a reference voltage signal provided by the reference voltage line to the fifth node under control of the first control line after the data signal is written into the first node.

In some exemplary implementations, the pixel circuit further includes a second control sub-circuit, wherein the second control sub-circuit is coupled with a second control line, the third node and a fourth node, and is configured to transmit the driving signal to the fourth node under control of the second control line, and the fourth node is coupled with a light emitting element.

In some exemplary implementations, the pixel circuit further includes: a first reset sub-circuit and a second reset sub-circuit, wherein the first reset sub-circuit is coupled with a first reset control line, a first initial signal line and the third node, and is configured to transmit a first initial signal provided by the first initial signal line to the third node under control of the first reset control line, the second reset sub-circuit is coupled with a second reset control line, a second initial signal line and the fourth node, and is configured to transmit a second initial signal provided by the second initial signal line to the fourth node under control of the second reset control line.

In some exemplary implementations, the driving sub-circuit includes: a driving transistor; a gate of the driving transistor is coupled with the first node, a first electrode of the driving transistor is coupled with the first power supply line, and a second electrode of the driving transistor is coupled with the third node. The data writing sub-circuit includes a data writing transistor, wherein a gate of the data writing transistor is coupled with the first scan line, a first electrode of the data writing transistor is coupled with the data line, and a second electrode of the data writing transistor is coupled with the second node. The compensation sub-circuit includes a compensation transistor, wherein a gate of the compensation transistor is coupled with the second scan line, a first electrode of the compensation transistor is coupled with the first node, and a second electrode of the compensation transistor is coupled with the third node. The storage sub-circuit includes a storage capacitor, wherein a first plate of the storage capacitor is coupled with the first node, and a second plate of the storage capacitor is coupled with the second node. The voltage stabilizing sub-circuit includes a voltage stabilizing capacitor, wherein a first plate of the voltage stabilizing capacitor is coupled with the first node, and a second plate of the voltage stabilizing capacitor is coupled with the fifth node. The first control sub-circuit includes a first control transistor, wherein a gate of first control transistor is coupled with the first control line, a first electrode of first control transistor is coupled with the reference voltage line, and a second electrode of first control transistor is coupled with the fifth node. The second control sub-circuit includes a second control transistor, wherein a gate of the second control transistor is coupled with the second control line, a first electrode of the second control transistor is coupled with the third node, and a second electrode of the second control transistor is coupled with the fourth node. The first reset sub-circuit includes a first reset transistor, wherein a gate of the first reset transistor is coupled with the first reset control line, a first electrode of the first reset transistor is coupled with the first initial signal line, and a second electrode of the first reset transistor is coupled with the third node. The second reset sub-circuit includes a second reset transistor, wherein a gate of the second reset transistor is coupled with the second reset control line, a first electrode of the second reset transistor is coupled with the second initial signal line, and a second electrode of the second reset transistor is coupled with the fourth node.

In another aspect, an embodiment of the present disclosure provides a method for driving a pixel circuit, which is applied to the pixel circuit as described above. The method includes: the data writing sub-circuit writing a data signal provided by the data line to the first node through the storage sub-circuit under control of the first scan line; the compensation sub-circuit turning on the first node and the third node under control of the second scan line so that the threshold voltage of the driving sub-circuit is written into the first node; the first control sub-circuit providing the reference voltage signal provided by the reference voltage line to the fifth node under control of the first control line, and a potential of the first node is maintained by the voltage stabilizing sub-circuit.

In some exemplary implementations, the method further includes: a first reset control line transmitting a first initial signal provided by a first initial signal line to the third node under control of the first reset control line before and after the compensation sub-circuit writes the threshold voltage of the driving sub-circuit into the first node.

In another aspect, an embodiments of the present disclosure provide a display substrate including a base substrate, a circuit structure layer disposed on the base substrate, wherein the circuit structure layer includes at least one pixel circuit group, and the at least one pixel circuit group includes two pixel circuits as described above arranged adjacent along a first direction. The two pixel circuits of the at least one pixel circuit group are symmetrically arranged with respect to a center line of a pixel circuit group in the first direction.

In some exemplary implementations, the two pixel circuits in the at least one pixel circuit group are electrically connected to a same first power supply line, wherein an orthographic projection of the first power supply line on the base substrate covers the first nodes of the two pixel circuits.

In some exemplary implementations, data lines electrically connected to the two pixel circuits in the at least one pixel circuit group respectively are disposed in a same layer as the first power supply line, and the first power supply line is located between the data lines electrically connected to the two pixel circuits in the pixel circuit group respectively.

In some exemplary implementations, each pixel circuit includes at least one first type transistor, at least one second type transistor. In a direction perpendicular to the display substrate, the circuit structure layer includes: a first semiconductor layer, a first conductive layer, a second conductive layer, a second semiconductor layer, a third conductive layer, a fourth conductive layer, and a fifth conductive layer disposed on the base substrate, wherein the first semiconductor layer includes an active layer of the at least one first type transistor, and the second semiconductor layer includes an active layer of the at least one second type transistor.

In some exemplary implementations, the pixel circuit is electrically connected to a first initial signal line located in the second conductive layer and a second initial signal line located in the fifth conductive layer, and an extension direction of the first initial signal line intersects with an extension direction of the second initial signal line.

In some exemplary implementations, the pixel circuit is electrically connected to a reference voltage line, wherein the reference voltage line includes a first reference trace located in the second conductive layer and a second reference trace located in the fourth conductive layer, the first reference trace is electrically connected with the second reference trace, and an extension direction of the first reference trace intersects with an extension direction of the second reference trace.

In another aspect, an embodiment of the present disclosure provides a display device, which includes the aforementioned display substrate.

Other aspects may be understood upon reading and understanding of the drawings and detailed description.

BRIEF DESCRIPTION OF DRAWINGS

Accompanying drawings are used for providing further understanding of technical solutions of the present disclosure, constitute a part of the specification, and are used for explaining the technical solutions of the present disclosure together with embodiments of the present disclosure, but do not constitute limitations on the technical solutions of the present disclosure. Shapes and sizes of one or more components in the drawings do not reflect actual scales, and are only intended to schematically describe contents of the present disclosure.

DETAILED DESCRIPTION

Figure 1:
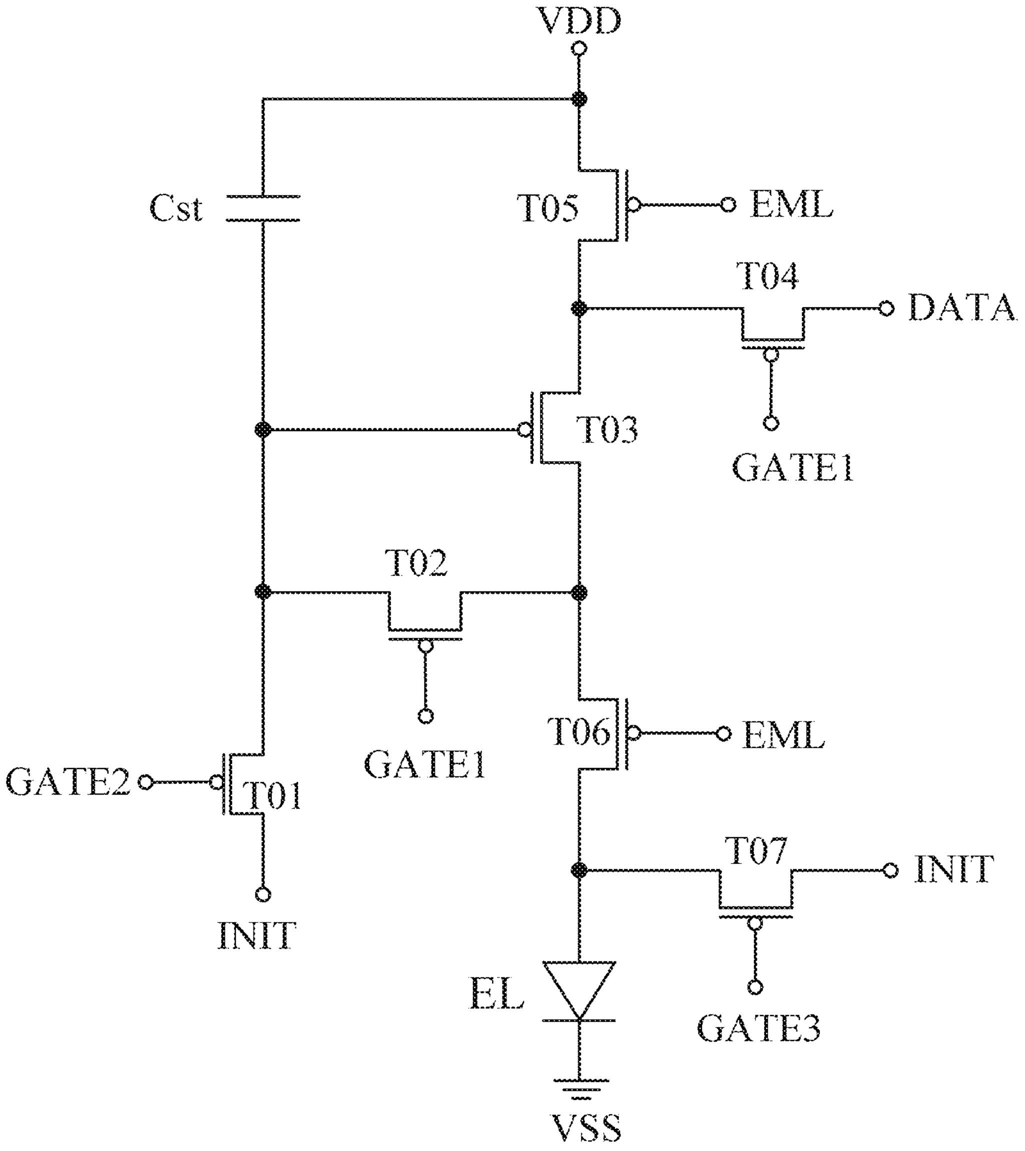
FIG. 1 Prior Art
FIG. 1 is an equivalent circuit diagram of a pixel circuit.

The embodiments of the present disclosure will be described below with reference to the drawings in detail. Implementations may be practiced in multiple different forms. Those of ordinary skills in the art may easily understand such a fact that implementations and contents may be transformed into other forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of one or more constituent elements, a thickness of a layer, or a region is sometimes exaggerated for clarity. Therefore, one implementation of the present disclosure is not necessarily limited to the size, and a shape and a size of one or more components in the drawings do not reflect an actual scale. In addition, the drawings schematically illustrate ideal examples, and one implementation of the present disclosure is not limited to shapes, numerical values, or the like shown in the drawings.

Ordinal numerals such as "first", "second", and "third" in the specification are set to avoid confusion between constituent elements, but not to set a limit in quantity. In the present disclosure, "a plurality/multiple" represents two or more than two.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements are changed as appropriate according to a direction where the constituent elements are described.

Therefore, appropriate replacements may be made according to situations without being limited to the wordings described in the specification.

In the specification, unless otherwise specified and defined explicitly, terms "mount", "mutually connect", "connect", and "couple" should be understood in a broad sense. For example, a connection may be a fixed connection, a detachable connection, or an integrated connection; it may be a mechanical connection or an electrical connection; it may be a direct connection, an indirect connection through a middleware, or an internal communication inside between two components. Those of ordinary skills in the art may understand meanings of the above-mentioned terms in the present disclosure according to situations. Among them, an "electrical connection" includes a case where constituent elements are connected together through an element with a certain electrical effect. The "element with the certain electrical effect" is not particularly limited as long as electrical signals between the connected constituent elements may be transmitted. Examples of the "element with the certain electrical effect" not only include electrodes and wirings, but also include switching elements such as transistors, resistors, inductors, capacitors, other elements with one or more functions, etc.

In the specification, a transistor refers to an element which at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. In the specification, the channel region refers to a region through which a current mainly flows.

In the specification, to distinguish two electrodes of a transistor except a gate electrode, one of the electrodes is referred to as a first electrode and the other electrode is referred to as a second electrode. The first electrode may be a source electrode or a drain electrode, and the second electrode may be a drain electrode or a source electrode. In addition, the gate electrode of the transistor is referred to as a control electrode. In a case that transistors with opposite polarities are used, or in a case that a direction of a current is changed during operation of a circuit, or the like, functions of the "source electrode" and the "drain electrode" are sometimes interchangeable. Therefore, the "source electrode" and the "drain electrode" are interchangeable in the specification.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

A triangle, rectangle, trapezoid, pentagon, or hexagon, etc. in this specification is not strictly defined, and it may be an approximate triangle, rectangle, trapezoid, pentagon, or hexagon, etc. There may be some small deformations caused by tolerance, and there may be a chamfer, an arc edge, and a deformation, etc.

In the present disclosure, "about" and "substantially" refer to that a boundary is not defined strictly and a case within a range of process and measurement errors is allowed. In the present disclosure, "substantially the same" refers to a case where values differ by less than 10%.

In the present disclosure, "A extends along a B direction" means that A may include a main body portion and a secondary portion connected with the main body portion, the main body portion is a line, a line segment, or a strip-shaped body, the main body portion extends along the B direction, and a length of the main body portion extending along the B direction is greater than a length of the secondary portion extending along another direction. In following description, "A extends in a B direction" means "a main body portion of A extends in a B direction".

In the present disclosure, an effective level signal includes a level signal for turning on a transistor, for example, an effective level signal for turning on a P-type transistor is a low level signal, and an effective level signal for turning on a N-type transistor is a high level signal.

In some implementations, in order to meet the needs of high refresh or even ultra-high refresh of the display screen, a display substrate with high refresh rate is designed, but the display substrate with high refresh rate has a problem of insufficient charging.

FIG. 1 is an equivalent circuit diagram of a pixel circuit. As shown in FIG. 1, the pixel circuit includes seven transistors (i.e. transistors T01 to T07) and one storage capacitor Cst. Transistor types of the seven transistors are the same, for example, all the seven transistors are P-type transistors. Gates of the transistors T02 and T04 are connected to a first gate line GATE1, a gate of the transistor T01 is connected to a second gate line GATE2, a gate of the transistor T07 is connected to a third gate line GATE3, and gates of the transistors T05 and T06 are connected to a light emitting control line EML. In the pixel circuit, a data voltage provided by a data signal line DATA can drive the transistor T03 to write the data voltage and compensate a threshold voltage Vth. In a data writing phase, the transistors T02 and T04 use a same scan signal provided by the first gate line GATE1 to implement data writing and compensation of the threshold voltage.

However, with consumers' demands for high refresh rate display, when a refresh rate is increased to 144 Hz/165 Hz, data writing time (1H) of a single row of pixel circuits in one frame will gradually decrease. With decrease of the data writing time, it will be difficult to write data and insufficient threshold voltage compensation will take place, which lead to a too large data range (for example, a black state voltage is too high) and poor sensitivity of threshold voltage Vth.

An embodiment provides a pixel circuit and a method for driving the pixel circuit, a display substrate and a display device, which can improve the situation of insufficient charging time and insufficient threshold voltage compensation time existing in high-frequency display, thereby improving the high-frequency display performance.

Figure 2:
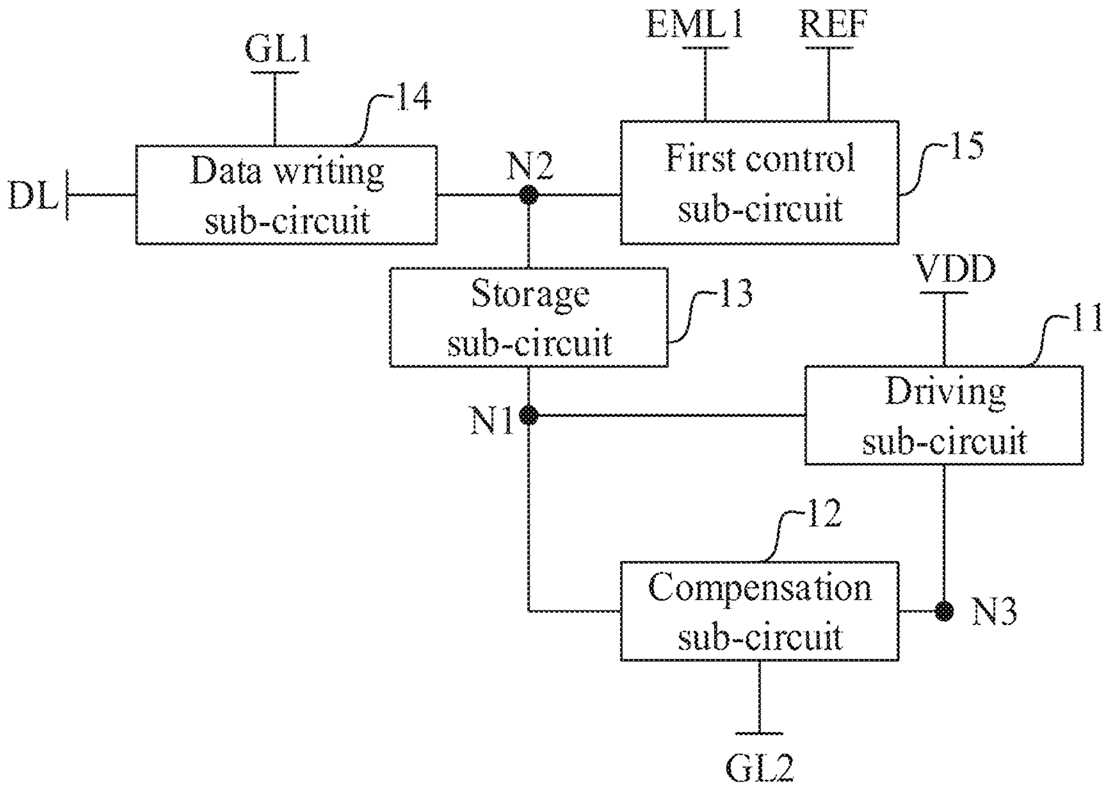
FIG. 2 is a schematic diagram of a structure of a pixel circuit according to at least one embodiment of the present disclosure.

FIG. 2 is a schematic diagram of a structure of a pixel circuit according to at least one embodiment of the present disclosure. In some examples, as shown in FIG. 2, the pixel circuit of this embodiment may at least include a driving sub-circuit 11, a data writing sub-circuit 14, a storage sub-circuit 13, a compensation sub-circuit 12, and a first control sub-circuit 15. The driving sub-circuit 11 is coupled with a first power supply line VDD, a first node N1 and a third node N3, and is configured to provide a driving signal to the third node N3 under control of the first node N1. The data writing sub-circuit 14 is coupled with a data line DL, a first scan line GL1, and a second node N2, and is configured to write a data signal provided by the data line DL into the second node N2 under control of the first scan line GL1. The compensation sub-circuit 12 is coupled with a second scan line GL2, the first node N1, and a third node N3, and is configured to turn on the first node N1 and the third node N3 under control of the second scan line GL2 to write a threshold voltage of the driving sub-circuit 11 into the first node N1. The storage sub-circuit 13 is coupled with the first node N1 and the second node N2. The first control sub-circuit 15 is coupled with a first control line EML1, a reference voltage line REF and the second node N2, and is configured to provide a reference voltage signal provided by the reference voltage line REF to the second node N2 under control of the first control line EML1 after the data writing sub-circuit 14 writes the data signal into the second node N2, so that the data signal written into the second node N2 is coupled to the first node N1 through the storage sub-circuit 13.

In some examples, the first power supply line VDD may provide a constant high-level signal continuously, for example, the first power supply line VDD may provide a first voltage signal. A second power supply line VSS may provide a constant low-level signal continuously, for example, the second power supply line VSS may provide a second voltage signal. The first voltage signal may be greater than the second voltage signal. A magnitude of the reference voltage signal provided by the reference voltage line REF is not limited in this embodiment. For example, the reference voltage signal provided by the reference voltage line REF may be the same as the first voltage signal.

According to the pixel circuit provided in this embodiment, a data writing process and a threshold voltage writing process can be controlled by using the first scan line GL1 and the second scan line GL2, respectively. The data signal and the threshold voltage can be written into both terminals of the storage sub-circuit 13, respectively, and writing of the data signal into the first node N1 is implemented by the first control sub-circuit 15, which can improve the difficulty of data signal writing. Moreover, by controlling the data writing process and the threshold voltage compensation process separately, it is beneficial to improving the insufficient charging time and the insufficient threshold voltage compensation time of the high-frequency display, thus improving the high-frequency display performance.

Figure 3:
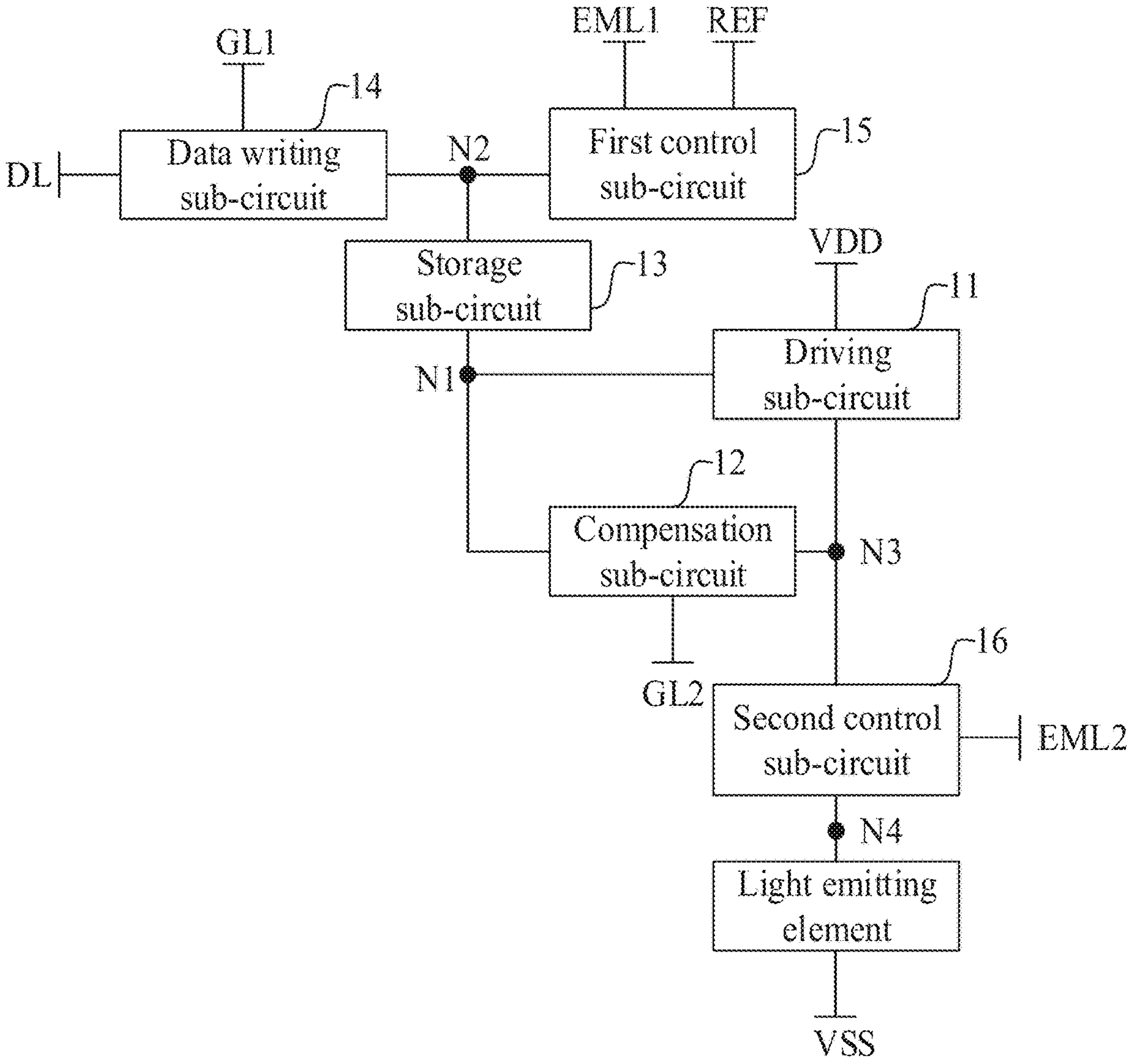
FIG. 3 is a schematic diagram of another structure of a pixel circuit according to at least one embodiment of the present disclosure.

FIG. 3 is a schematic diagram of another structure of a pixel circuit according to at least one embodiment of the present disclosure. In some examples, as shown in FIG. 3, the pixel circuit of this embodiment may at least include a driving sub-circuit 11, a data writing sub-circuit 14, a storage sub-circuit 13, a compensation sub-circuit 12, and a first control sub-circuit 15 and a second control sub-circuit 16. The second control sub-circuit 16 is coupled with a second control line EML2, a third node N3, and a fourth node N4, and is configured to transmit a driving signal to the fourth node N4 under control of the second control line EML2. The fourth node N4 may be coupled with a light emitting element. A first electrode of the light emitting element may be coupled with the fourth node N4, and a second electrode of the light emitting element may be coupled with the second power supply line VSS. Rest of the structure of the pixel circuit according to this example may be referred to descriptions of the aforementioned embodiments, and thus will not be repeated here.

In some examples, the light emitting element may be an organic light emitting diode (OLED). The first electrode of the light-emitting element may be an anode and the second electrode of the light-emitting element may be a cathode. However, this embodiment is not limited thereto.

In some examples, the first scan line GL1 may be configured to provide a first scan signal, and the second scan line GL2 may be configured to provide a second scan signal. The first scan signal may be different from the second scan signal. For example, duration of an effective level signal of the first scan signal may be smaller than duration of an effective level signal of the second scan signal. The first scan signal and the second scan signal may be provided by different scan driving circuits. In some example, a period of time for which the data writing sub-circuit writes the data signal into the second node may be shorter than a period of time for which the compensation sub-circuit writes the threshold voltage of the driving sub-circuit into the first node. In this example, the threshold voltage compensation time may be increased, and the threshold voltage compensation time may be sufficient, thus improving the poor display and improving the yield. In this example, by controlling the data writing process and the threshold voltage compensation process separately, it is beneficial to improving the insufficient charging time and the insufficient threshold voltage compensation time of the high-frequency display, thus improving the high-frequency display performance.

In some examples, an end time at which the data writing sub-circuit 14 stops writing the data signal into the second node N2 may be earlier than an end time at which the compensation sub-circuit 12 stops writing the threshold voltage of the driving sub-circuit 11 into the first node N1. In this example, the data signal and the threshold voltage can be written into both terminals of the storage sub-circuit 13, respectively, and then the writing of the data signal into the first node N1 is implemented by the first control sub-circuit 15, which can improve the difficulty of data signal writing.

In some examples, the first control line EML1 may be configured to provide a first control signal, and the second control line EML2 may be configured to provide a second control signal. The first control signal may be different from the second control signal. For example, duration of an effective level signal of the first control signal and duration of an effective level signal of the second control signal may be the same, and a start time of the effective level signal of the first control signal may be different from a start time of the effective level signal of the second control signal. The first control signal and the second control signal may be provided by shift register units in different stages of a same gate driving circuit. A jumping of the first control signal of this example may be configured to write the data signal from the second node into the first node, and the second control signal may be configured to provide a driving signal to the light emitting element such that the light emitting element emits light.

Figure 4:
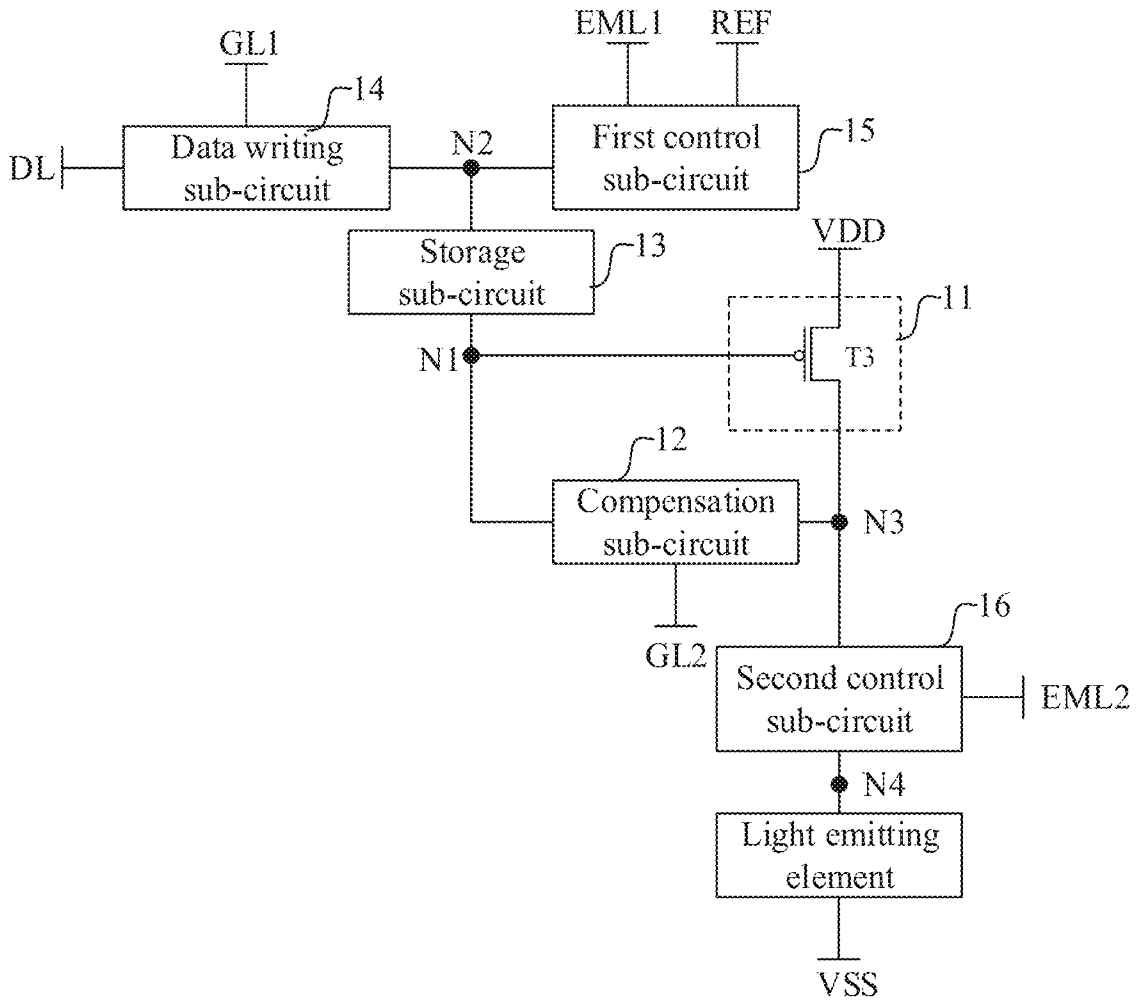
FIG. 4 is an equivalent circuit diagram of a driving sub-circuit of a pixel circuit according to at least one embodiment of the present disclosure.

FIG. 4 is an equivalent circuit diagram of a driving sub-circuit of a pixel circuit according to at least one embodiment of the present disclosure. In some example, as shown in FIG. 4, the driving sub-circuit 11 in the pixel circuit includes a driving transistor T3. A gate of the driving transistor T3 is coupled with a first node N1, a first electrode of the driving transistor T3 is coupled with a first power supply line VDD, and a second electrode of the driving transistor T3 is coupled with a third node N3. The driving transistor T3 is configured to provide a driving signal to the third node N3 under control of the first node N1. The driving transistor T3 may be a P-type transistor, such as a low-temperature poly-silicon thin film transistor.

FIG. 4 illustrates an exemplary structure of the driving sub-circuit. Those skilled in the art may easily understand that embodiments of the driving sub-circuit are not limited thereto as long as its functions can be achieved.

Figure 5:
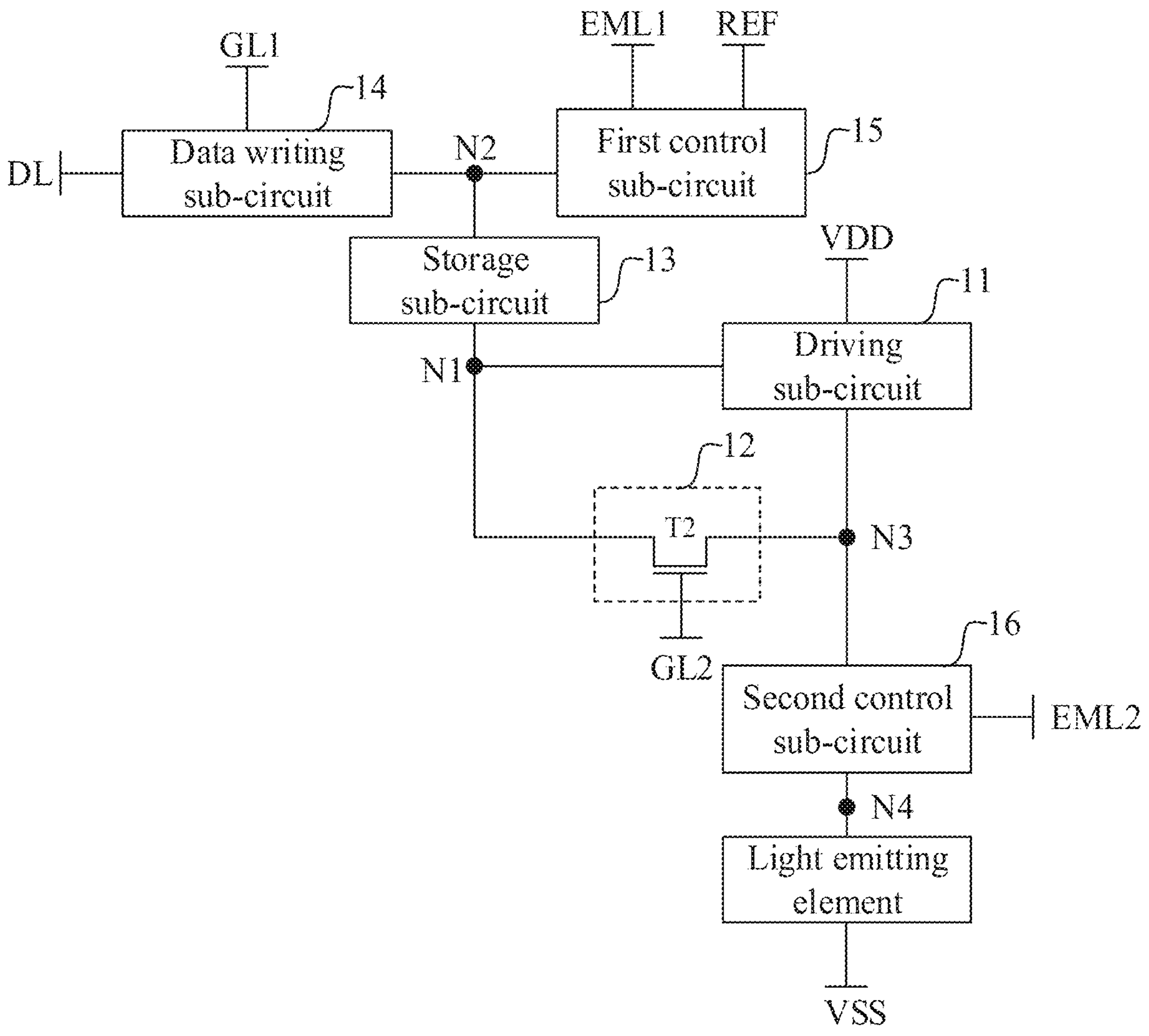
FIG. 5 is an equivalent circuit diagram of a compensation sub-circuit of a pixel circuit according to at least one embodiment of the present disclosure.

FIG. 5 is an equivalent circuit diagram of a compensation sub-circuit of a pixel circuit according to at least one embodiment of the present disclosure. In some example, as shown in FIG. 5, the compensation sub-circuit 12 in the pixel circuit includes a compensation transistor T2. A gate of the compensation transistor T2 is coupled with a second scan line GL2, a first electrode of the compensation transistor T2 is coupled with a first node N1, and a second electrode of the compensation transistor T2 is coupled with a third node N3. The compensation transistor T2 is configured to turn on the first node N1 and the third node N3 under control of the second scan line GL2 so that the threshold voltage of the driving sub-circuit 11 is written into the first node N1. In some examples, the compensation transistor T2 may be an N-type transistor, such as an oxide thin film transistor. The compensation transistor T2 of this example adopts an oxide thin film transistor, which can prevent occurrence of electric leakage of the first node N1 and is beneficial to low frequency display.

FIG. 5 illustrates an exemplary structure of the compensation sub-circuit. Those skilled in the art may easily understand that embodiments of the compensation sub-circuit are not limited thereto as long as its functions can be achieved.

Figure 6:
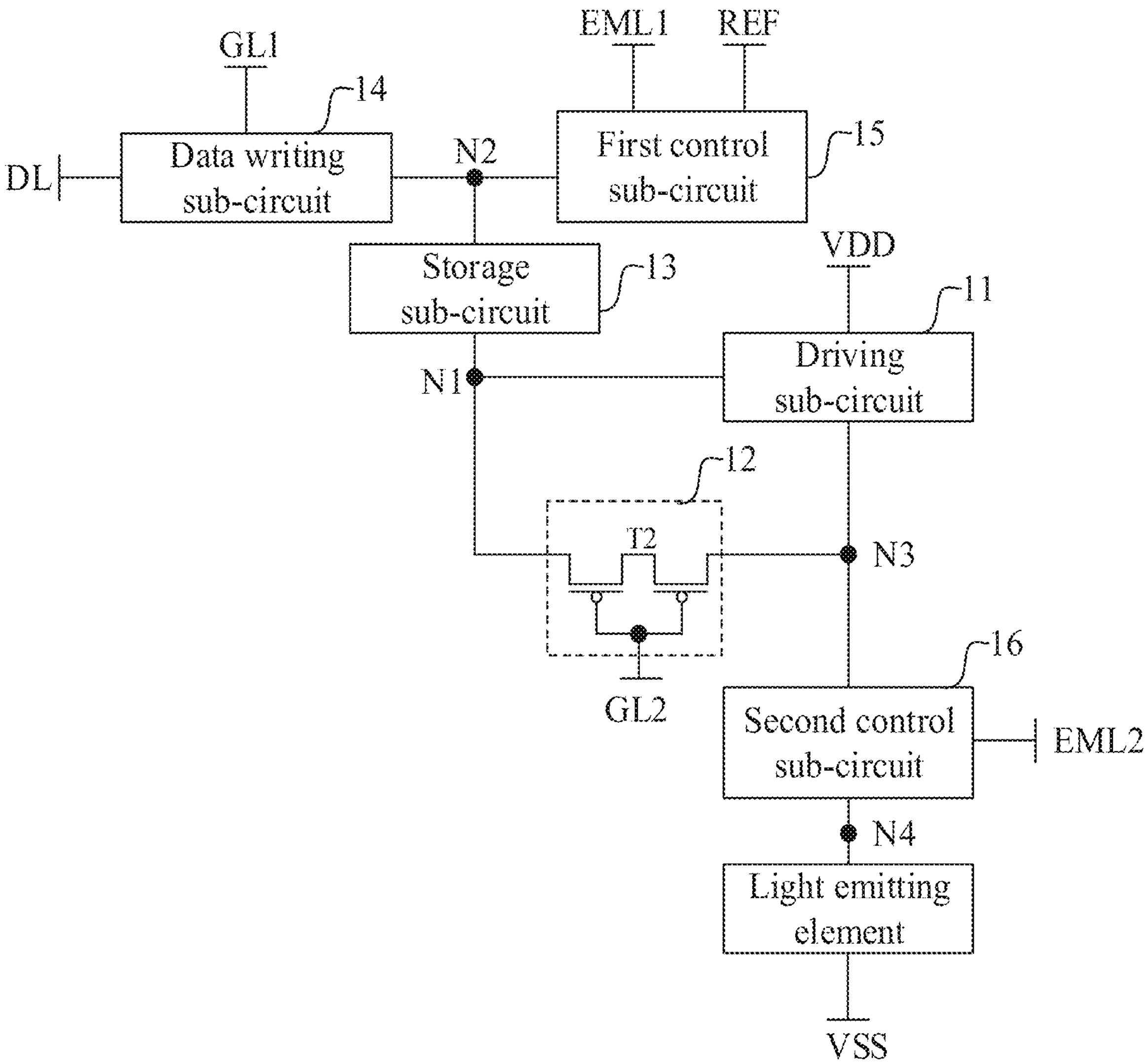
FIG. 6 is another equivalent circuit diagram of a compensation sub-circuit of a pixel circuit according to at least one embodiment of the present disclosure.

FIG. 6 is another equivalent circuit diagram of a compensation sub-circuit of a pixel circuit according to at least one embodiment of the present disclosure. In some example, as shown in FIG. 6, the compensation sub-circuit 12 in the pixel circuit includes a compensation transistor T2. The compensation transistor T2 may be a P-type transistor of a double gate structure. For example, the compensation transistor T2 may be a low temperature poly-silicon thin film transistor of a double gate structure. The compensation transistor T2 of this example is selected as a low-temperature poly-silicon thin film transistor with a double-gate structure, which can prevent occurrence of electric leakage of the first node N1 and is beneficial to low-frequency display. Rest of the structure of the pixel circuit according to this embodiment may be referred to descriptions of the aforementioned embodiments, and thus will not be repeated here.

Figure 7:
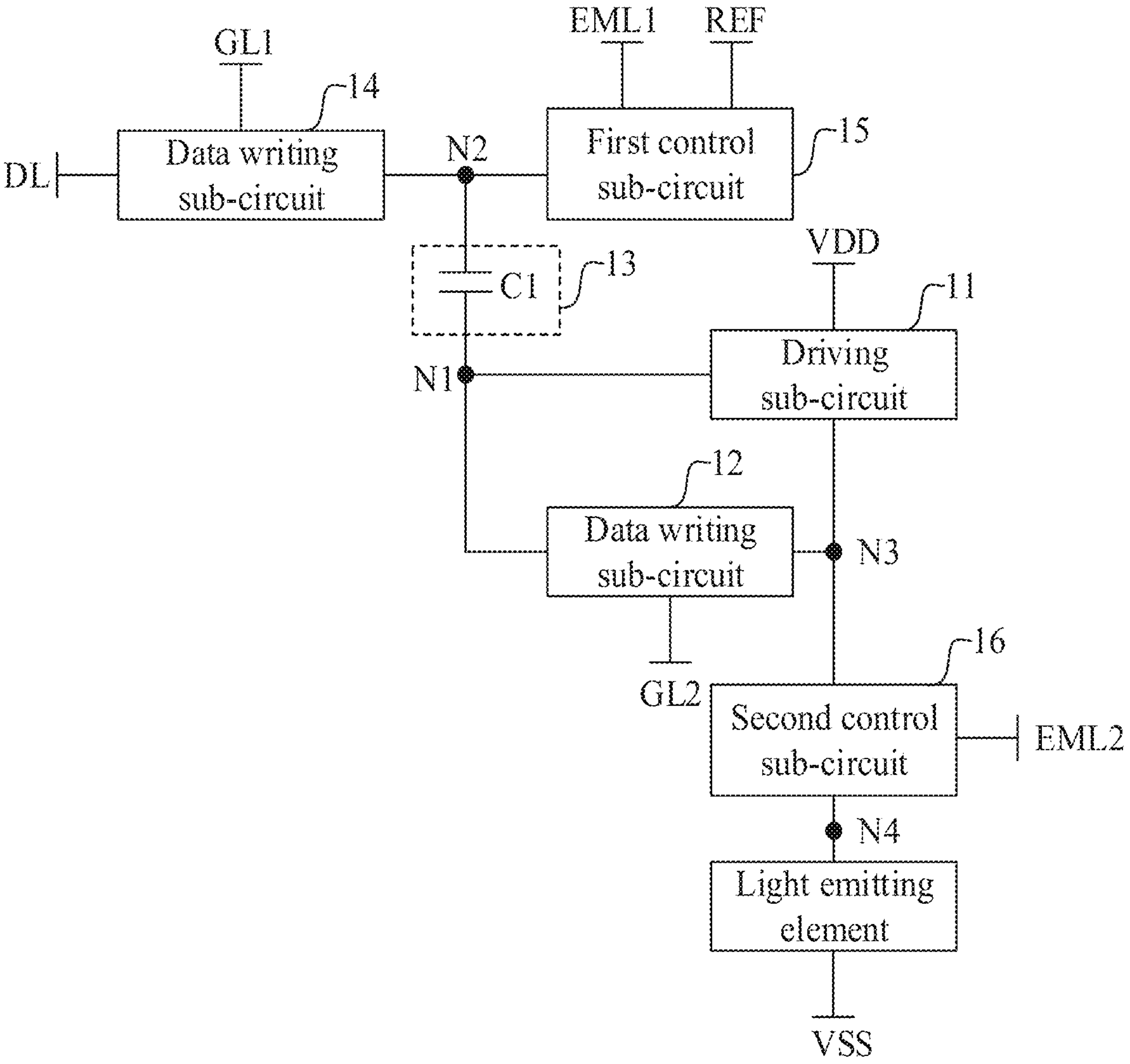
FIG. 7 is an equivalent circuit diagram of a storage sub-circuit of a pixel circuit according to at least one embodiment of the present disclosure.

FIG. 7 is an equivalent circuit diagram of a storage sub-circuit of a pixel circuit according to at least one embodiment of the present disclosure. In some examples, as shown in FIG. 7, the storage sub-circuit 13 in the pixel circuit may include a storage capacitor C1. A first plate of the storage capacitor C1 is coupled with the first node N1, and a second plate of the storage capacitor C1 is coupled with the second node N2.

FIG. 7 illustrates an exemplary structure of the storage sub-circuit. Those skilled in the art may easily understand that embodiments of the storage sub-circuit are not limited thereto as long as its functions can be achieved.

Figure 8:
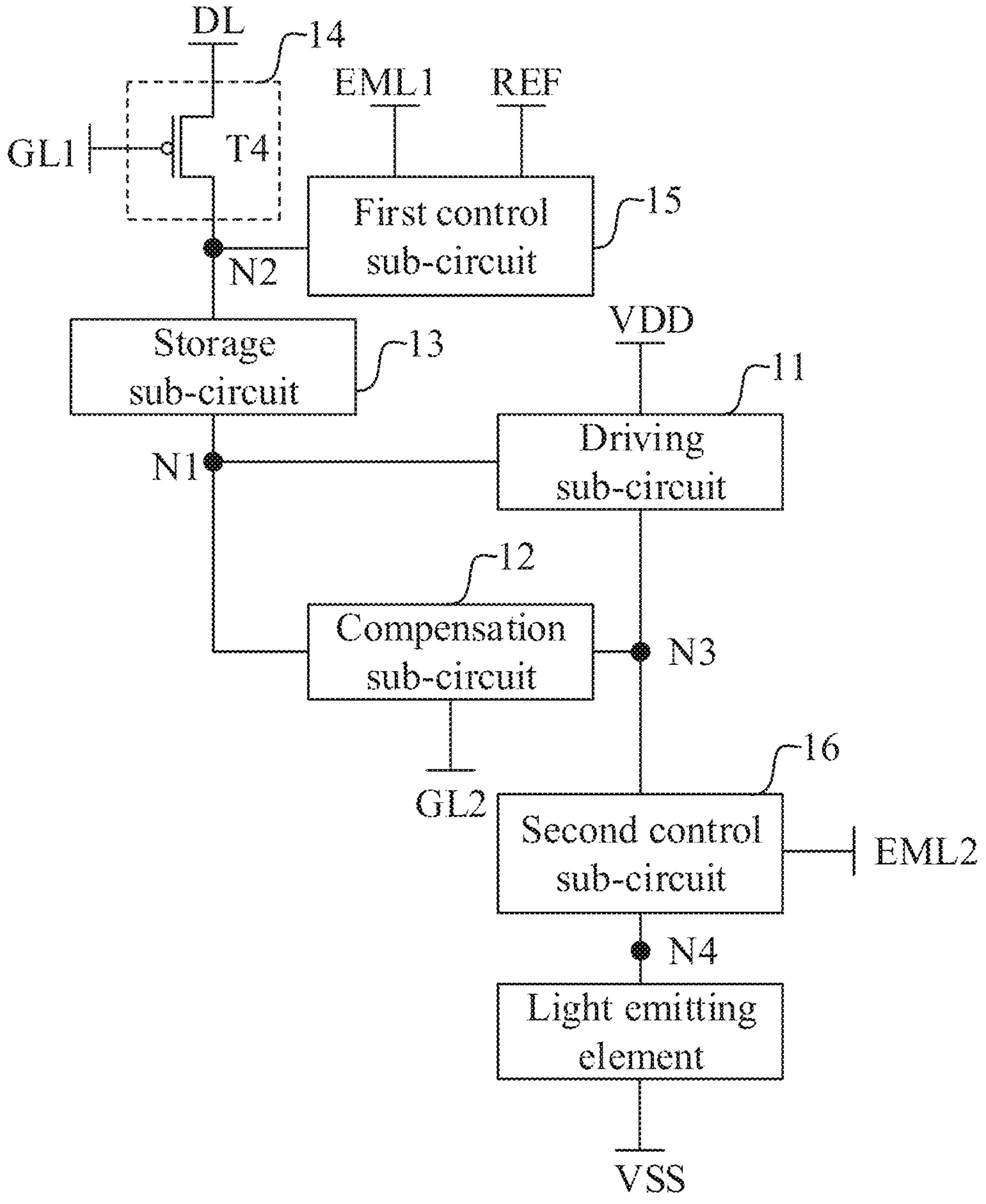
FIG. 8 is an equivalent circuit diagram of a data writing sub-circuit of a pixel circuit according to at least one embodiment of the present disclosure.

FIG. 8 is an equivalent circuit diagram of a data writing sub-circuit of a pixel circuit according to at least one embodiment of the present disclosure. In some examples, as shown in FIG. 8, the data writing sub-circuit 14 in the pixel circuit may include a data writing transistor T4. A gate of the data writing transistor T4 is coupled with a first scan line GL1, a first electrode the data writing transistor T4 is coupled with a data line DL, and a second electrode the data writing transistor T4 is coupled with a second node N2. The data writing transistor T4 may be configured to write the data signal provided by the data line DL into the second node N2 under control of the first scan line GL1.

FIG. 8 illustrates an exemplary structure of the data writing sub-circuit. Those skilled in the art may easily understand that embodiments of the data writing sub-circuit are not limited thereto as long as its functions can be achieved.

Figure 9:
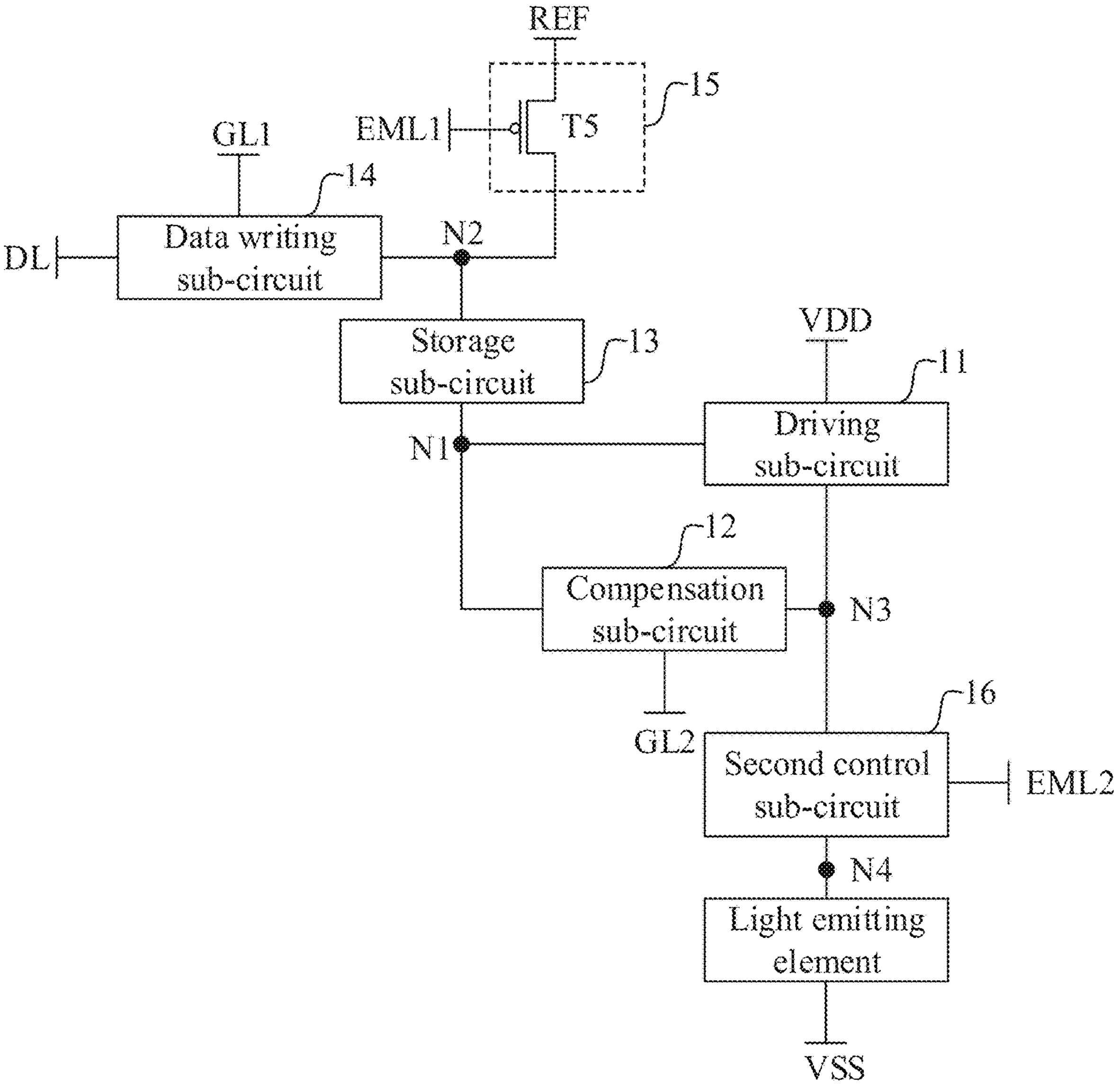
FIG. 9 is an equivalent circuit diagram of a first control circuit of a pixel circuit according to at least one embodiment of the present disclosure.

FIG. 9 is an equivalent circuit diagram of a first control circuit of a pixel circuit according to at least one embodiment of the present disclosure. In some examples, as shown in FIG. 9, the first control sub-circuit 15 in the pixel circuit may include a first control transistor T5. A gate of the first control transistor T5 is coupled with a first control line EML1, a first electrode of the first control transistor T5 is coupled with a reference voltage line REF, and a second electrode of the first control transistor T5 is coupled with a second node N2. The first control transistor T5 may be configured to provide a reference voltage signal provided by the reference voltage line REF to the second node N2 under control of the first control line EML1 after the data writing sub-circuit 14 writes the data signal into the second node N2, so that the data signal written into the second node N2 is coupled with the first node N1 through the storage sub-circuit 13. In this example, the writing of the data signal into the first node N1 is accomplished using the first control sub-circuit.

FIG. 9 illustrates an exemplary structure of the first control sub-circuit. Those skilled in the art easily understand that implementations of the first control sub-circuit are not limited thereto, as long as its functions can be achieved.

Figure 10:
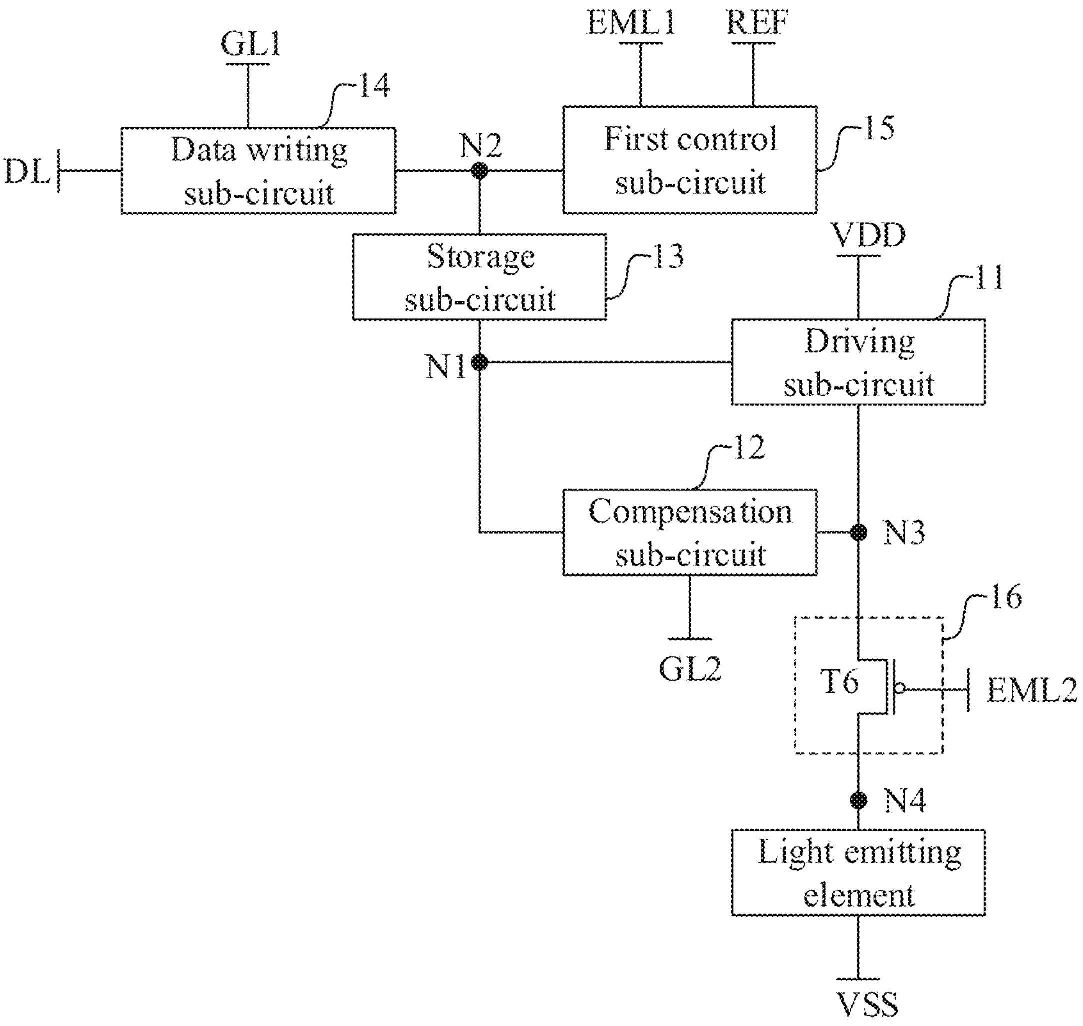
FIG. 10 is an equivalent circuit diagram of a second control circuit of a pixel circuit according to at least one embodiment of the present disclosure.

FIG. 10 is an equivalent circuit diagram of a second control circuit of a pixel circuit according to at least one embodiment of the present disclosure. In some examples, as shown in FIG. 10, the second control sub-circuit 16 in the pixel circuit may include a second control transistor T6. A gate of the second control transistor T6 is coupled with a second control line EML2, a first electrode of the second control transistor T6 is coupled with a third node N3, and a second electrode of the second control transistor T6 is coupled with a fourth node N4. The second control transistor T6 may be configured to transmit a driving signal generated by the driving sub-circuit 11 to the fourth node N4 under control of the second control line EML2 to cause the light emitting element to emit light.

FIG. 10 illustrates an exemplary structure of the second control sub-circuit. Those skilled in the art may easily understand that implementations of the second control sub-circuit are not limited thereto, as long as its functions can be achieved.

Figure 11:
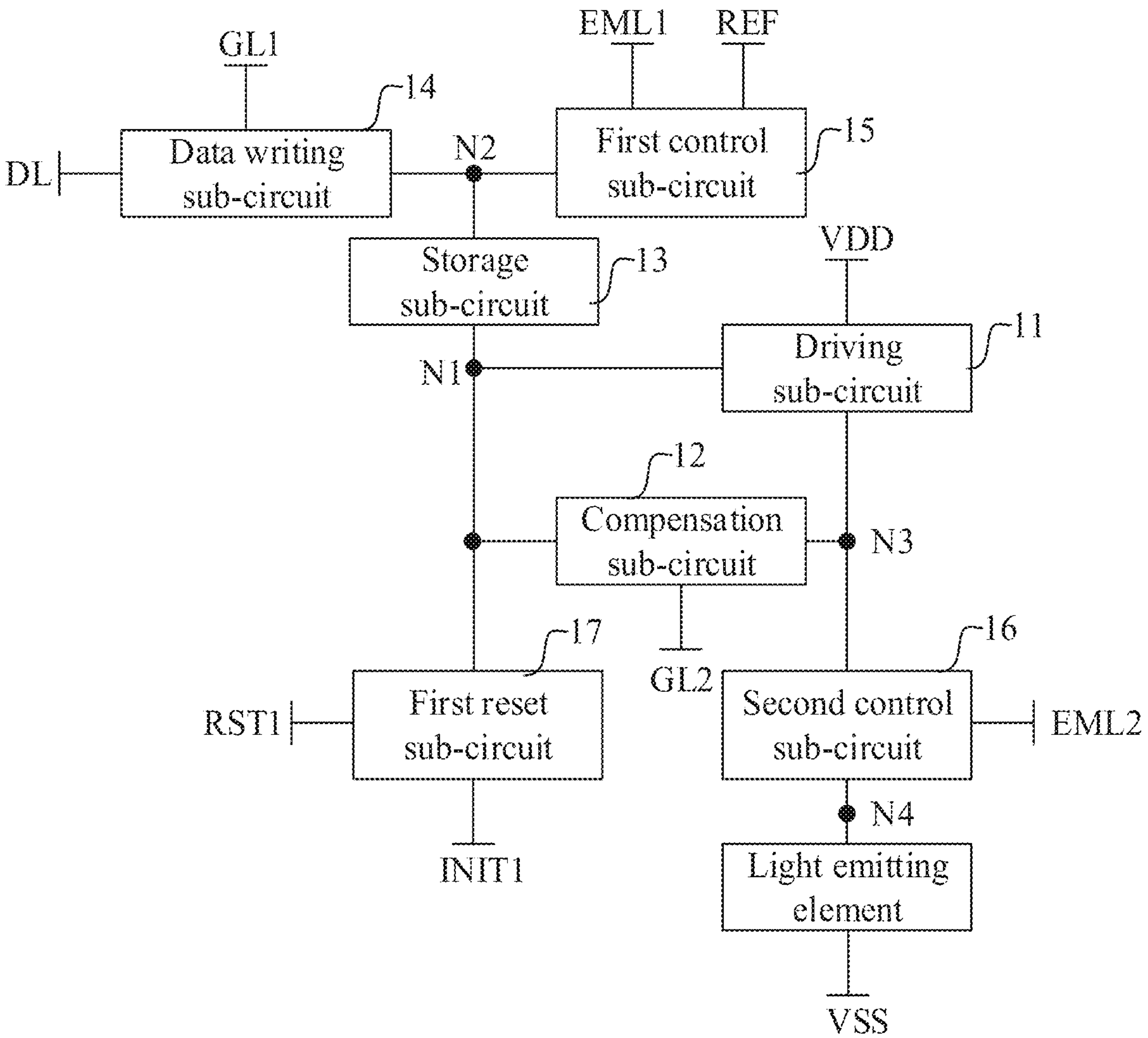
FIG. 11 is a schematic diagram of another structure of a pixel circuit according to at least one embodiment of the present disclosure.

FIG. 11 is a schematic diagram of another structure of a pixel circuit according to at least one embodiment of the present disclosure. In some examples, as shown in FIG. 11, the pixel circuit of this example may include a driving sub-circuit 11, a data writing sub-circuit 14, a storage sub-circuit 13, a compensation sub-circuit 12, a first control sub-circuit 15, a second control sub-circuit 16, and a first reset sub-circuit 17. The first reset sub-circuit 17 is coupled with a first reset control line RST1, a first initial signal line INIT1, and a first node N1. The first reset sub-circuit 17 may be configured to transmit a first initial signal provided by the first initial signal line INIT1 to the first node N1 under control of the first reset control line RST1. In this example, the first node N1 is reset by the first reset sub-circuit 17. Rest of the structure of the pixel circuit according to this embodiment may be referred to descriptions of the aforementioned embodiments, and thus will not be repeated here.

Figure 12:
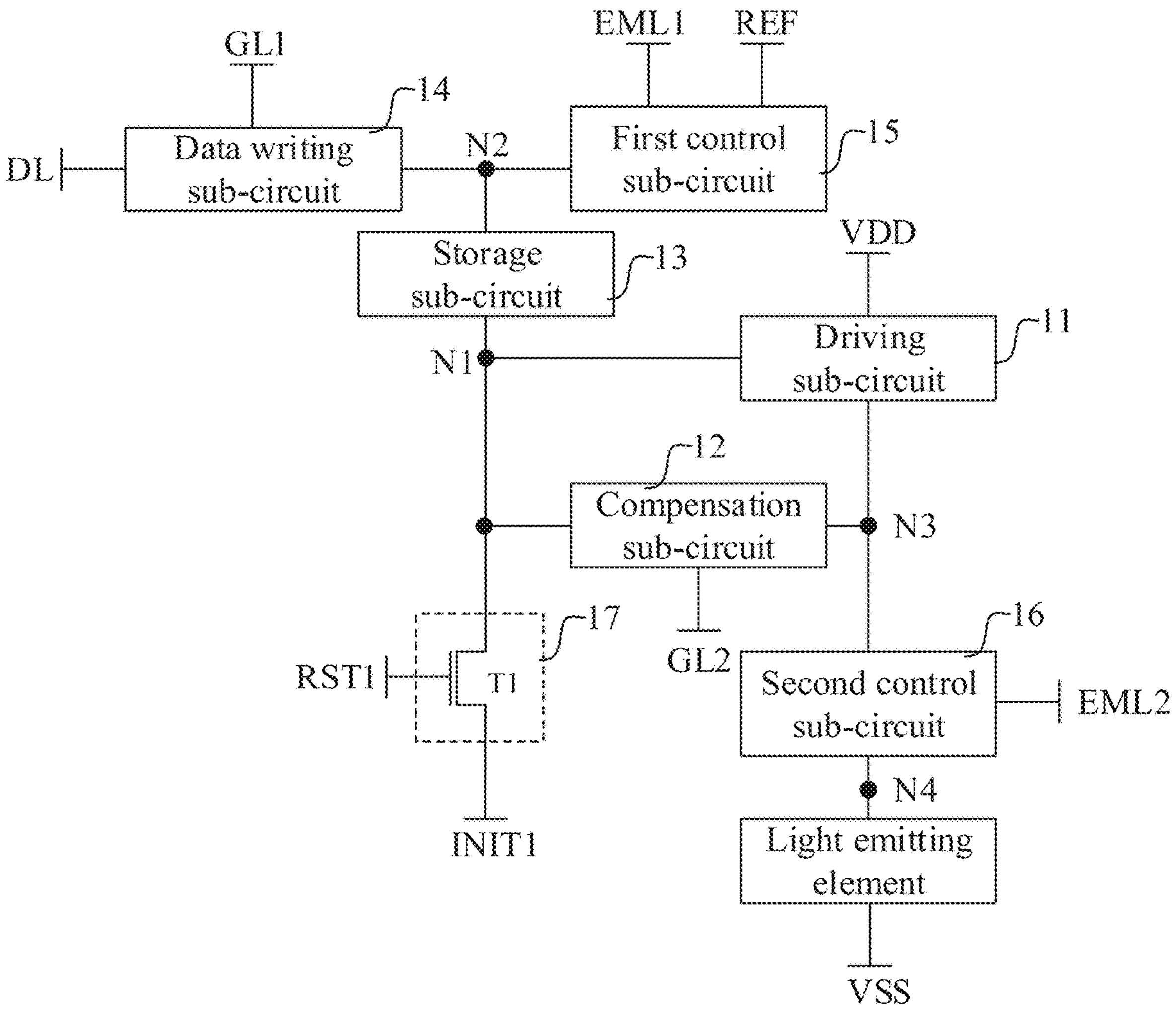
FIG. 12 is an equivalent circuit diagram of a first reset sub-circuit according to at least one embodiment of the present disclosure.

FIG. 12 is an equivalent circuit diagram of a first reset sub-circuit according to at least one embodiment of the present disclosure. In some examples, as shown in FIG. 12, the first reset sub-circuit 17 may include a first reset transistor T1. A gate of the first reset transistor T1 is coupled with a first reset control line RST1, a first electrode of the first reset transistor T1 is coupled with a first initial signal line INIT1, and a second electrode of the first reset transistor T1 is coupled with the first node N1. The first reset transistor T1 may be configured to reset the first node N1 using a first initial signal provided by the first initial signal line INIT1 under control of the first reset control line RST1. In some examples, the first reset transistor T1 may be an N-type transistor, such as an oxide thin film transistor. The first reset transistor T1 of this example is selected as an oxide thin film transistor, which can prevent occurrence of electric leakage of the first node N1 and is beneficial to low frequency display.

FIG. 12 illustrates an exemplary structure of the first reset sub-circuit. Those skilled in the art easily understand that implementations of the first reset sub-circuit are not limited thereto, as long as its functions can be achieved.

Figure 13:
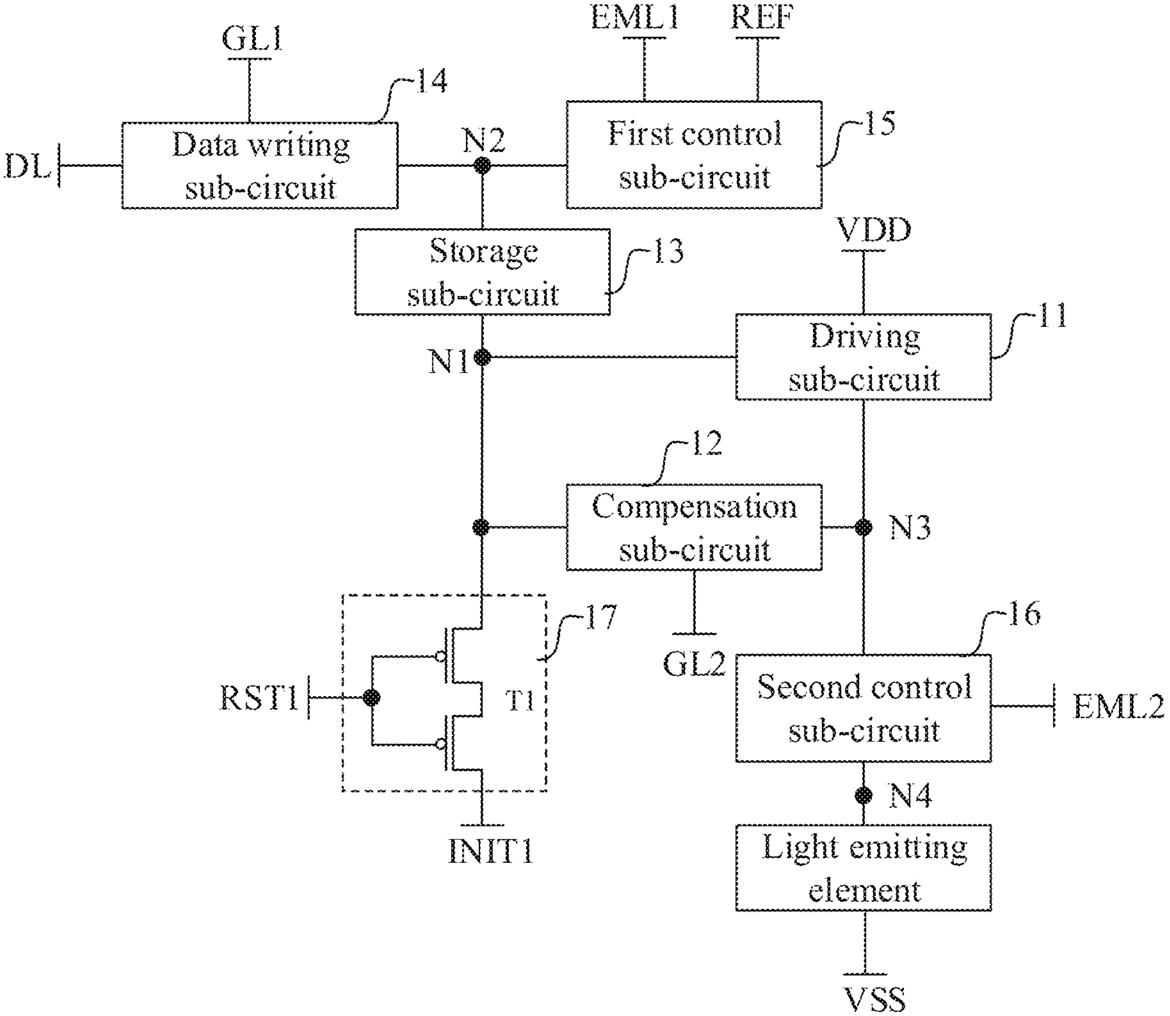
FIG. 13 is another equivalent circuit diagram of a first reset sub-circuit according to at least one embodiment of the present disclosure.

FIG. 13 is another equivalent circuit diagram of a first reset sub-circuit according to at least one embodiment of the present disclosure. In some examples, as shown in FIG. 13, the first reset sub-circuit 17 in the pixel circuit may include a first reset transistor T1. The first reset transistor T1 may be a P-type transistor of a double gate structure. For example, the first reset transistor T1 may be a low temperature poly-silicon thin film transistor of a double gate structure. The first reset transistor T1 of this example is selected as a low-temperature poly-silicon thin film transistor of a double gate structure, which can prevent occurrence of leakage of the first node N1 and is beneficial to low-frequency display. Rest of the structure of the pixel circuit according to this embodiment may be referred to descriptions of the aforementioned embodiments, and thus will not be repeated here.

Figure 14:
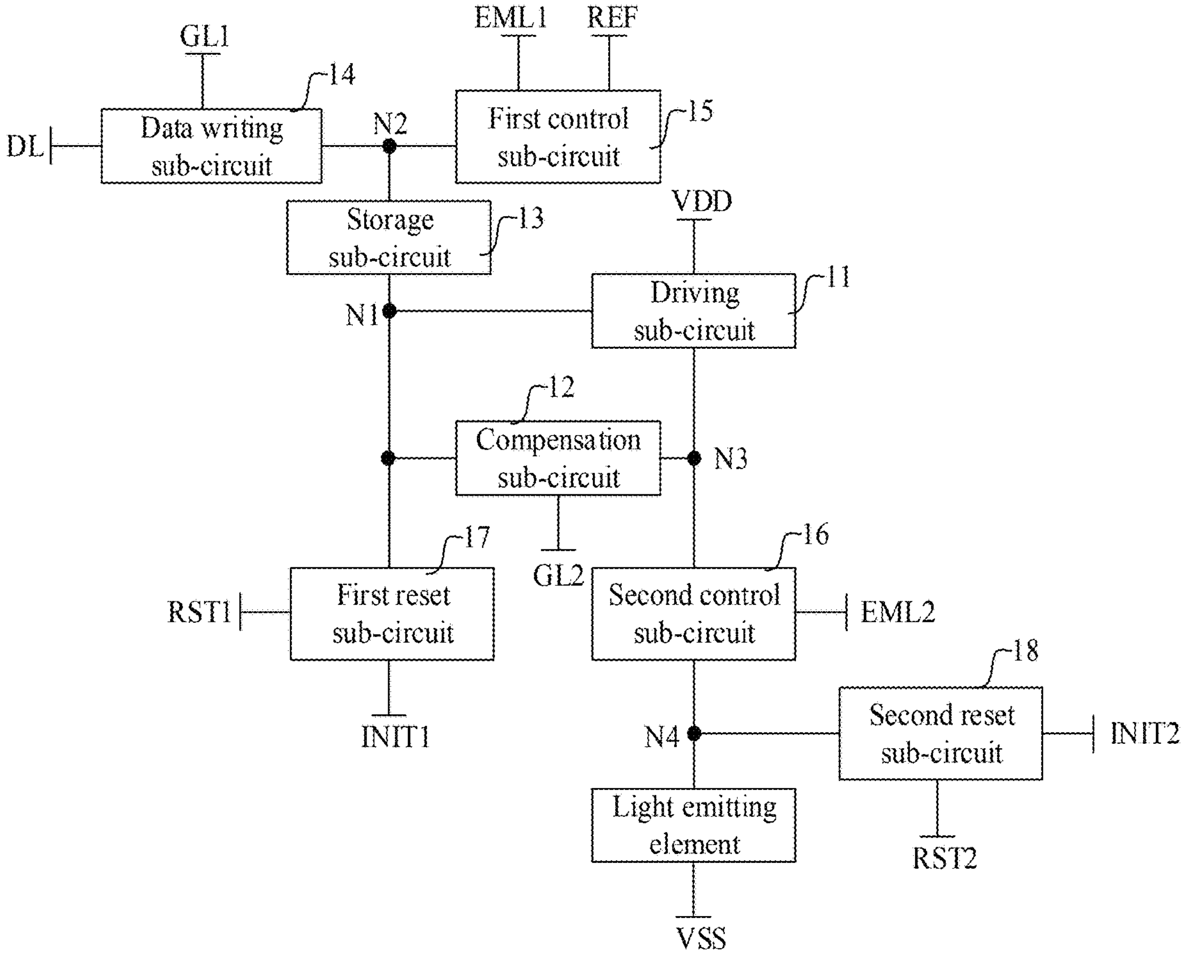
FIG. 14 is a schematic diagram of another structure of a pixel circuit according to at least one embodiment of the present disclosure.

FIG. 14 is a schematic diagram of another structure of a pixel circuit according to at least one embodiment of the present disclosure. In some examples, as shown in FIG. 14, the pixel circuit of this example may include a driving sub-circuit 11, a data writing sub-circuit 14, a storage sub-circuit 13, a compensation sub-circuit 12, a first control sub-circuit 15, a second control sub-circuit 16, a first reset sub-circuit 17 and a second reset sub-circuit 18. The second reset sub-circuit 18 may be coupled with a second reset control line RST2, a second initial signal line INIT2, and a fourth node N4, and is configured to transmit a second initial signal provided by the second initial signal line INIT2 to the fourth node N4 under control of the second reset control line RST2. In this example, the fourth node N4 is reset by the second reset sub-circuit 18. In this example, the fourth node N4 is reset by the second reset sub-circuit 18, so that a leakage current of the second control sub-circuit can be eliminated, the light emitting element can emit light in a dark state without being influenced by the leakage current, and the display quality can be improved. Moreover, residual positive charges on a surface of the first electrode of the light emitting element can be eliminated, and a service life of the light emitting element can be prolonged. Rest of the structure of the pixel circuit according to this embodiment may be referred to descriptions of the aforementioned embodiments, and thus will not be repeated here.

Figure 15:
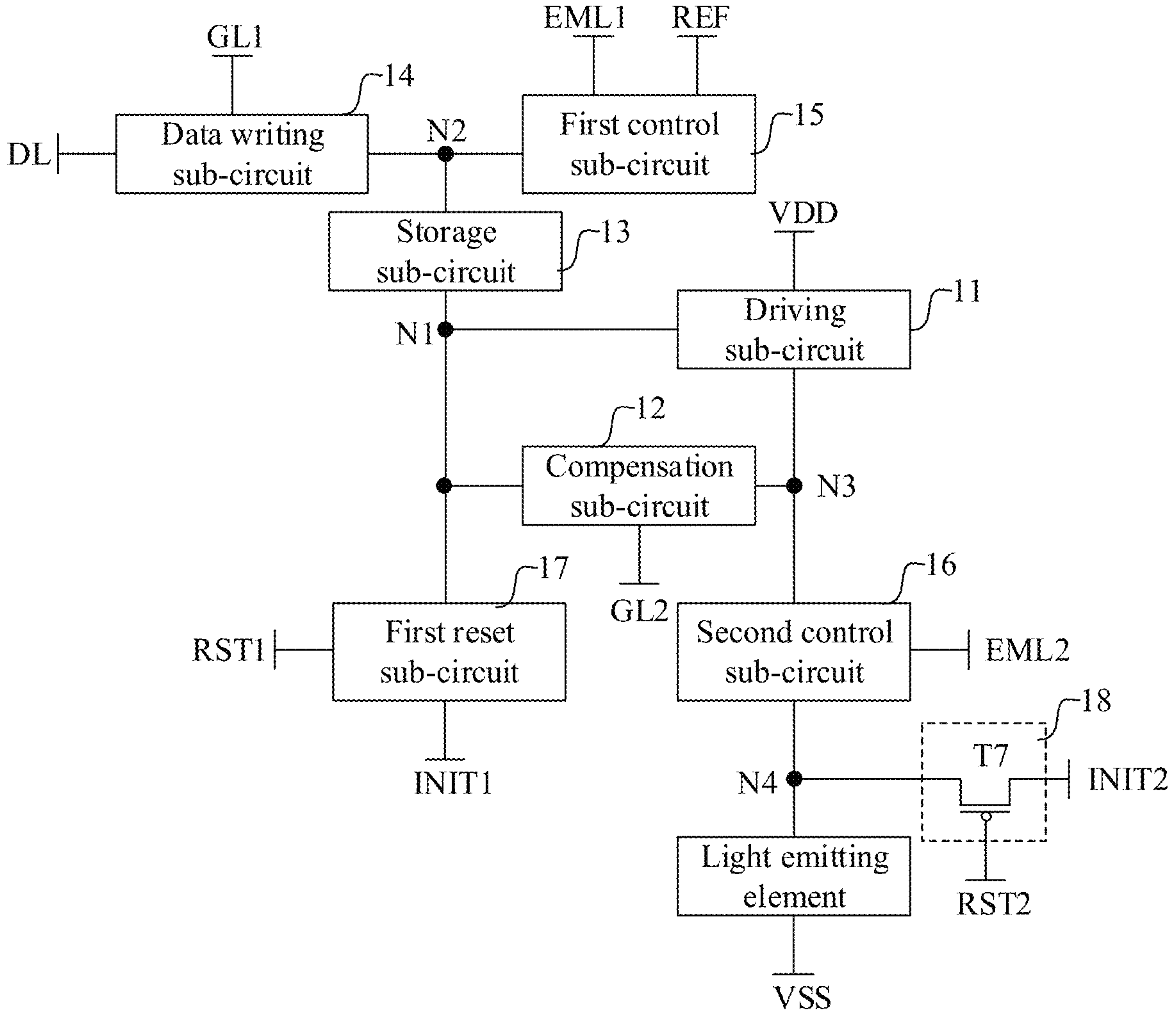
FIG. 15 is an equivalent circuit diagram of a second reset sub-circuit according to at least one embodiment of the present disclosure.

FIG. 15 is an equivalent circuit diagram of a second reset sub-circuit according to at least one embodiment of the present disclosure. In some examples, as shown in FIG. 15, the second reset sub-circuit 18 may include a second reset transistor T7. A gate of the second reset transistor T7 is coupled with a second reset control line RST2, a first electrode of the second reset transistor T7 is coupled with a second initial signal line INIT2, and a second electrode of the second reset transistor T7 is coupled with a fourth node N4. The second reset transistor T7 may be configured to reset the fourth node N4 using a second initial signal provided by the second initial signal line INIT2 under control of the second reset control line RST2.

FIG. 15 illustrates an exemplary structure of the second reset sub-circuit. Those skilled in the art easily understand that implementations of the second reset sub-circuit are not limited thereto, as long as its functions can be achieved.

Figure 16:
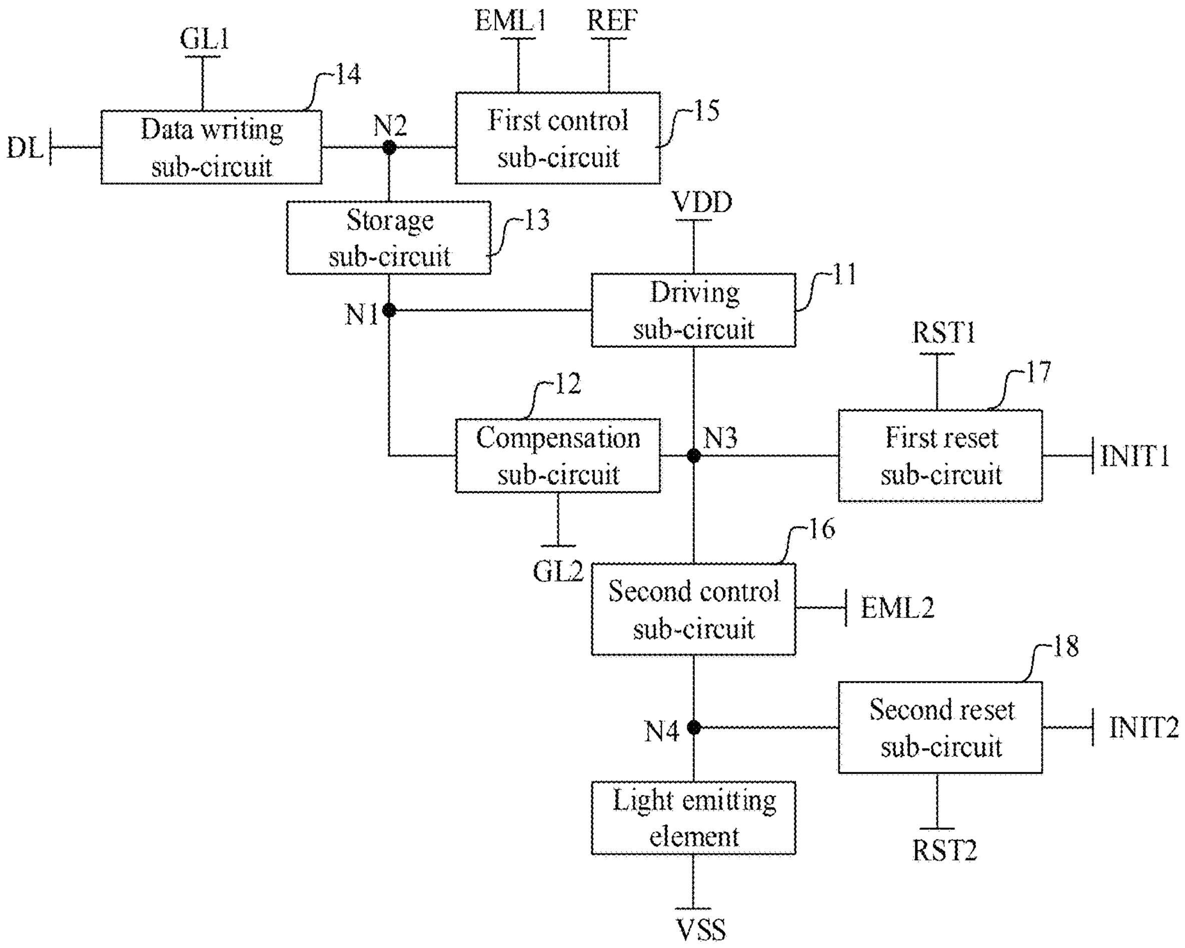
FIG. 16 is a schematic diagram of another structure of a pixel circuit according to at least one embodiment of the present disclosure.

FIG. 16 is a schematic diagram of another structure of a pixel circuit according to at least one embodiment of the present disclosure. In some examples, as shown in FIG. 11, the pixel circuit of this example may include a driving sub-circuit 11, a data writing sub-circuit 16, a storage sub-circuit 13, a compensation sub-circuit 12, a first control sub-circuit 15, a second control sub-circuit 16, a first reset sub-circuit 17 and a second reset sub-circuit 18. The first reset sub-circuit 17 is coupled with a first reset control line RST1, a first initial signal line INIT1, and a third node N3. The first reset sub-circuit 17 may be configured to transmit a first initial signal provided by the first initial signal line INIT1 to the third node N3 under control of the first reset control line RST1. In this example, the third node N3 can be reset by the first reset sub-circuit 17. Rest of the structure of the pixel circuit according to this embodiment may be referred to descriptions of the aforementioned embodiments, and thus will not be repeated here.

Figure 17:
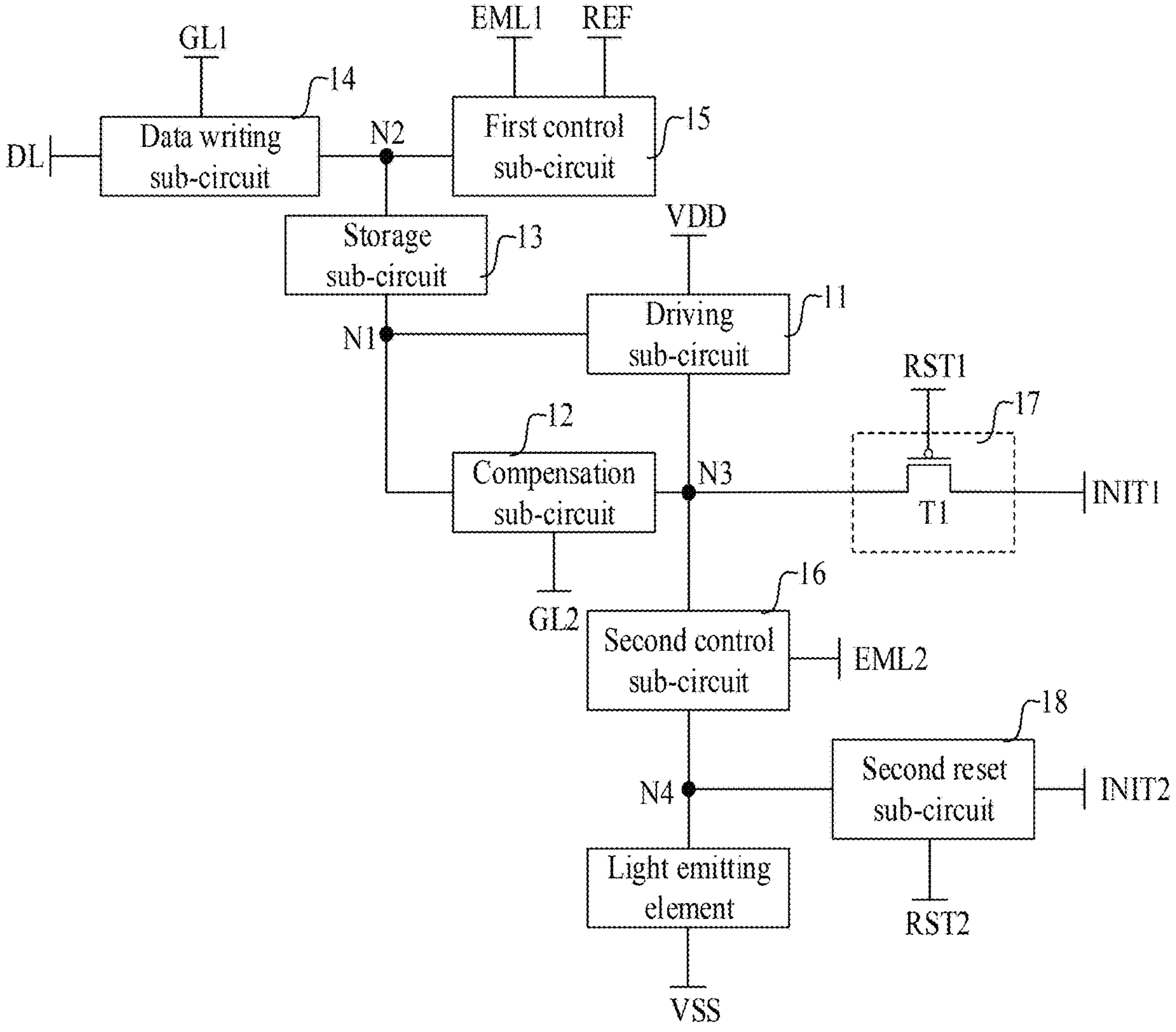
FIG. 17 is an equivalent circuit diagram of a first reset sub-circuit according to at least one embodiment of the present disclosure.

FIG. 17 is an equivalent circuit diagram of a first reset sub-circuit according to at least one embodiment of the present disclosure. In some examples, as shown in FIG. 17, the first reset sub-circuit 17 may include a first reset transistor T1. A gate of the first reset transistor T1 is coupled with a first reset control line RST1, a first electrode of the first reset transistor T1 is coupled with a first initial signal line INIT1, and a second electrode of the first reset transistor T1 is coupled with a third node N3. The first reset transistor T1 may be configured to reset the third node N3 using a first initial signal provided by the first initial signal line INIT1 under control of the first reset control line RST1. In some examples, the first reset transistor T1 may be a P-type transistor, such as a low temperature poly-silicon thin film transistor.

Figure 18:
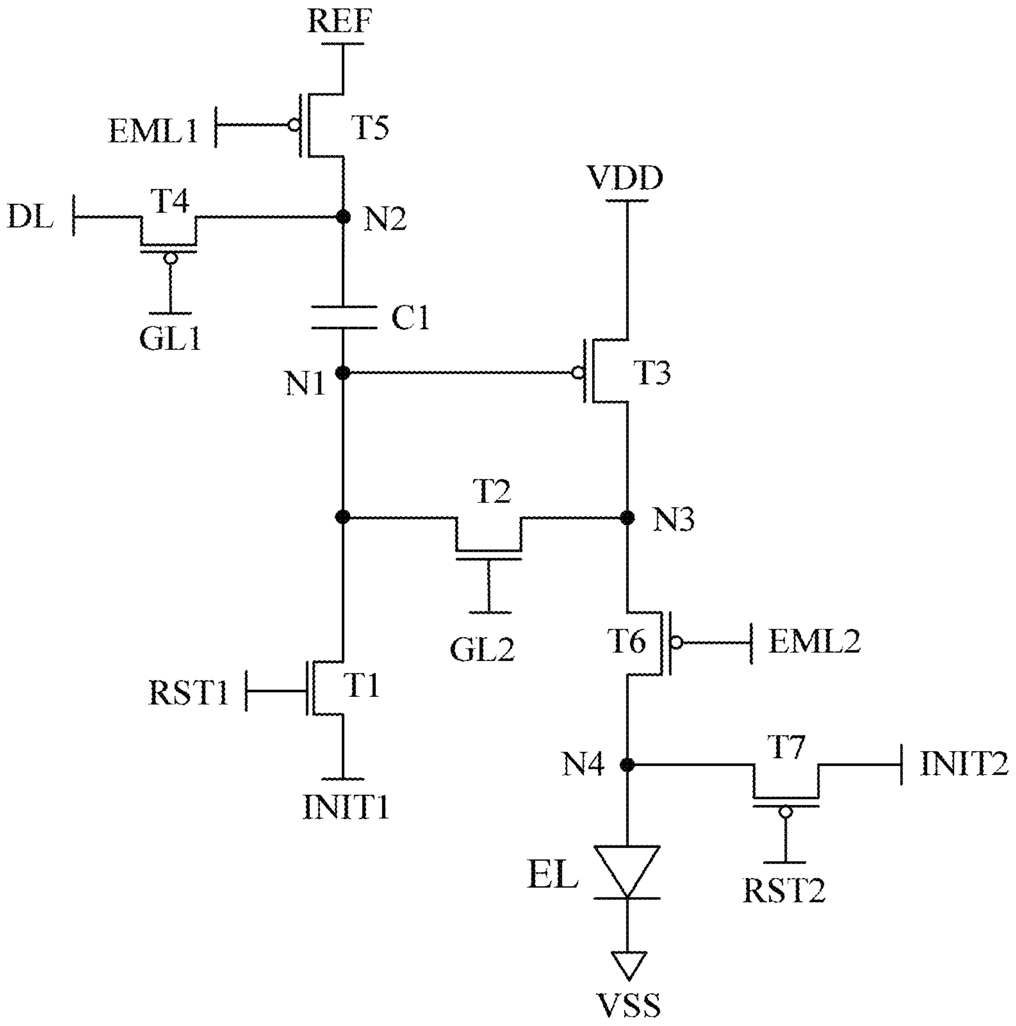
FIG. 18 is an equivalent circuit diagram of a pixel circuit according to at least one embodiment of the present disclosure.

FIG. 18 is an equivalent circuit diagram of a pixel circuit according to at least one embodiment of the present disclosure. In some examples, as shown in FIG. 18, the driving sub-circuit may include a driving transistor T3, the compensation sub-circuit may include a compensation transistor T2, the data writing sub-circuit may include a data writing transistor T4, the storage sub-circuit may include a storage capacitor C1, the first control sub-circuit may include a first control transistor T5, the second control sub-circuit may include a second control transistor T6, the first reset sub-circuit may include a first reset transistor T1, and the second reset sub-circuit may include a second reset transistor T7.

In some examples, as shown in FIG. 18, a gate of the driving transistor T3 is coupled with the first node N1, a first electrode of the driving transistor T3 is coupled with a first power supply line VDD, and a second electrode of the driving transistor T3 is coupled with a third node N3. A gate of the data writing transistor T4 is coupled a the first scan line GL1, a first electrode the data writing transistor T4 is coupled with a data line DL, and a second electrode the data writing transistor T4 is coupled with a second node N2. A gate of the compensation transistor T2 is coupled with a second scan line GL2, a first electrode of the compensation transistor T2 is coupled with a first node N1, and a second electrode of the compensation transistor T2 is coupled with a third node N3. A first plate of the storage capacitor C1 is coupled with the first node N1, and a second plate of the storage capacitor C1 is coupled with the second node N2. A gate of the first control transistor T5 is coupled with a first control line EML1, a first electrode of the first control transistor T5 is coupled with a reference voltage line REF, and a second electrode of the first control transistor T5 is coupled with the second node N2. A gate of the second control transistor T6 is coupled with a second control line EML2, a first electrode of the second control transistor T6 is coupled with the third node N3, and a second electrode of the second control transistor T6 is coupled with a fourth node N4. A gate of the first reset transistor T1 is coupled with a first reset control line RST1, a first electrode of the first reset transistor T1 is coupled with a first initial signal line INIT1, and a second electrode of the first reset transistor T1 is coupled with the first node N1. A gate of the second reset transistor T7 is coupled with a second reset control line RST2, a first electrode of the second reset transistor T7 is coupled with a second initial signal line INIT2, and a second electrode of the second reset transistor T7 is coupled with the fourth node N4. A first electrode of the light emitting element EL is coupled with the fourth node N4, and a second electrode of the light emitting element EL is coupled with a second power supply line VSS.

In some examples, as shown in FIG. 18, the first node N1 is a connection point for the storage capacitor C1, the driving transistor T3, the compensation transistor T2 and the first reset transistor T1. The second node N2 is a connection point for the storage capacitor C1, the first control transistor T5 and the data writing transistor T4. The third node N3 is a connection point for the driving transistor T3, the compensation transistor T2 and the second control transistor T6. The fourth node N4 is a connection point for the second control transistor T6, the second reset transistor T7 and the light emitting element EL.

In some examples, as shown in FIG. 18, the driving transistor T3, the data writing transistor T4, the first control transistor T5, the second control transistor T6, and the second reset transistor T7 in the pixel circuit may be P-type transistors, for example, low-temperature poly-silicon thin film transistors may be employed. The first reset transistor T1 and the compensation transistor T2 may be N-type transistors, for example, oxide thin film transistors may be employed. An active layer of a Low Temperature Poly-Silicon thin film transistor may be made of Low Temperature Poly-Silicon (LTPS), and an active layer of an oxide thin film transistor may be made of an oxide semiconductor (Oxide). A Low Temperature Poly Silicon thin film transistor has advantages such as a high mobility rate and fast charging, and an oxide thin film transistor has an advantage such as a low leakage current. The Low Temperature Poly Silicon thin film transistors and the oxide thin film transistors are integrated on one display substrate to form a Low Temperature Polycrystalline Oxide (LTPO) display substrate, and the advantages of both the Low Temperature Poly Silicon thin film transistor and the oxide thin film transistor may be utilized, which may reduce power consumption, and improve display quality.

Figure 19:
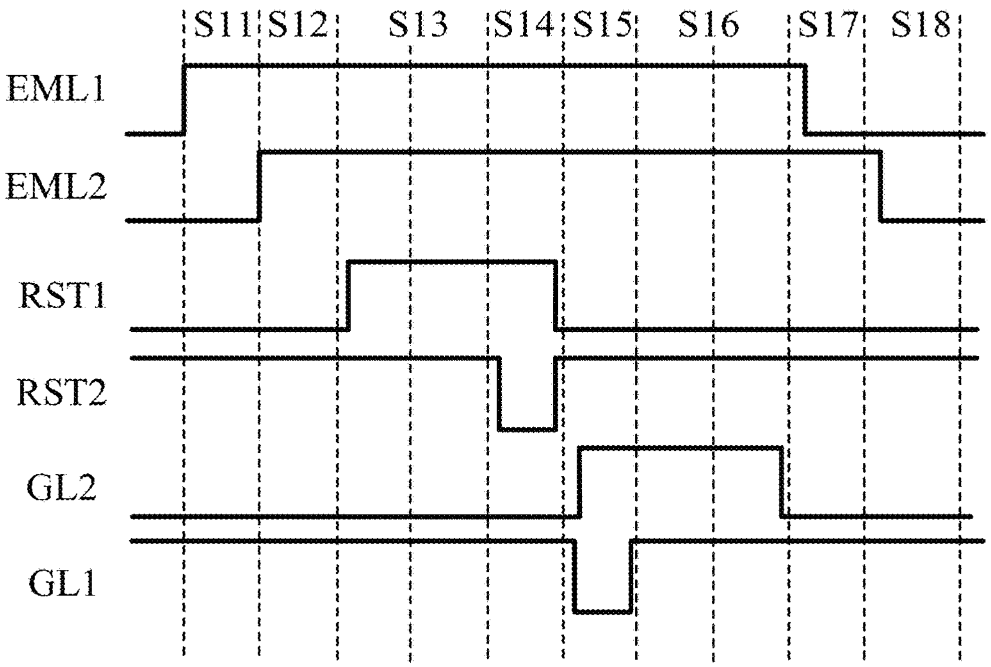
FIG. 19 is an operating timing diagram of the pixel circuit shown in FIG. 18.

FIG. 19 is an operating timing diagram of the pixel circuit shown in FIG. 18. As shown in FIG. 18, the pixel circuit of this example may include seven transistors (i.e. transistors T1 to T7), one capacitor unit (i.e. storage capacitor C1), ten input terminals (i.e. data line DL, first scan line GL1, second scan line GL2, first reset control line RST1, second reset control line RST2, first control line EML1, second control line EML2, reference voltage line REF, first initial signal line INIT1, second initial signal line INIT2), and two power supply terminals (i.e. first power supply line VDD and second power supply line VSS).

In some examples, as shown in FIG. 19, an operation process of the pixel circuit may include the following stages within a time period of one frame.

In a first stage S11, a first control signal provided by the first control line EML1 is at a high level, and the first control transistor T5 is turned off. A second control signal provided by the second control line EML2 is at a low level, and the second control transistor T6 is turned on. A first reset control signal provided by the first reset control line RST1 is at a low level, and the first reset transistor T1 is turned off. A second reset control signal provided by the second reset control line RST2 is at a high level, and the second reset transistor T7 is turned off. A first scan signal provided by the first scan line GL1 is at a high level, and the data writing transistor T4 is turned off. A second scan signal provided by the second scan line GL2 is at a low level, and the compensation transistor T2 is turned off. In this stage, the first node N1 and the second node N2 are in a floating state, and the light emitting element EL is in a light emitting state of the previous frame.

In a second stage S12, the second control signal provided by the second control line EML2 is at a high level, and the second control transistor T6 is turned off. The rest of signals are kept in the state of the first stage S11, and the rest of the transistors are kept in the state of the first stage S11. After displaying of the previous frame is ended, the light emitting element EL does not emit light.

In a third stage S13, the first reset control signal provided by the first reset control line RST1 jumps to high-level, and the first reset transistor T1 is turned on. The first reset transistor T1 is turned on, and the first node N1 can be refreshed by using a first initial signal provided by the first initial signal line INIT1 to erase display information of the previous frame. A gate-source voltage difference Vgs=Vinit1−Vdd of the driving transistor T3, where Vinit is a voltage of the first initial signal provided by the first initial signal line INIT1 and Vdd is a voltage of a first voltage signal provided by the first power supply line VDD, and the driving transistor T3 may be turned on at this time. In this stage, the first scan signal provided by the first scan line GL1 is at a high level, and the data writing transistor T4 is turned off. The second scan signal provided by the second scan line GL2 is at a low level, and the compensation transistor T2 is turned off. The first control signal provided by the first control line EML1 is at a high level and the first control transistor T5 is turned off. The second control signal provided by the second control line EML2 is at a high level and the second control transistor T6 is turned off. The second reset control signal provided by the second reset control line RST2 is at a high level, and the second reset transistor T7 is turned off.

In a fourth stage S14, the second reset control signal provided by the second reset control line RST2 is at a low level, the second reset transistor T7 is turned on, and the fourth node N4 is refreshed by using a second initial signal provided by the second initial signal line INIT2. In this stage, the first reset transistor T1 and the driving transistor T3 are turned on, and the data writing transistor T4, the compensation transistor T2, the first control transistor T5 and the second control transistor T6 are turned off.

In a fifth stage S15, the first reset transistor T1 and the second reset transistor T7 are turned off. The first scan signal provided by the first scan line GL1 is at a low level, the data writing transistor T4 is turned on, and a data signal transmitted by the data line DL is written into the second node N2. The second scan signal provided by the second scan line GL2 is at a high level, and the compensation transistor T2 is turned on. In this stage, both the driving transistor T3 and the compensation transistor T2 are turned on, and threshold compensation can be performed on the driving transistor T3 by using the first voltage signal provided by the first power supply line VDD. In theory, the first node N1 can be written with Vdd+Vth before the compensation transistor T2 is turned off, where Vdd is the voltage of the first voltage signal and Vth is a threshold voltage of the driving transistor T3. In this stage, the first reset transistor T1, the second reset transistor T7, the first control transistor T5 and the second control transistor T6 are all turned off.

In a sixth stage S16, the first scan signal provided by the first scan line GL1 is at the high level, and the data writing transistor T4 is turned off. The second scan signal provided by the second scan line GL2 is at the high level, and the compensation transistor T2 is kept turned on. In this stage, both the driving transistor T3 and the compensation transistor T2 are turned on, and threshold compensation can be performed on the driving transistor T3. In this stage, the first reset transistor T1, the second reset transistor T7, the first control transistor T5 and the second control transistor T6 are all turned off. By writing the threshold voltage into the first node N1 in the fifth stage S15 and the sixth stage S16, a period of time of writing the threshold voltage can be increased, and sufficient compensation can be achieved, so that definition of pictures in different gray-scales can be ensured to be clearer, thus improving the display quality at high frequency.

In this example, the data writing transistor T4 writes the data signal into the second node N2 in the fifth stage S15, and the compensation transistor T2 writes the threshold voltage into the first node N1 in the fifth stage S15 and the sixth stage S16. A period of time for which the data writing transistor T4 writes the data signal into the second node N2 may be less than a period of time for which the compensation transistor T2 writes the threshold voltage into the first node N1. An end time at which the data writing transistor T4 ends writing the data signal into the second node N2 may be earlier than an end time at which the compensation transistor T2 ends writing the threshold voltage to the first node N1. The sufficient compensation can be achieved in this example.

In a seventh stage S17, the compensation transistor T2 is turned off, and the data writing transistor T4 is turned off. After the data writing transistor T4 and the compensation transistor T2 are turned off, the first node N1 and the second node N2 are in a floating state, and the two plates of the storage capacitor C1 can respectively record information related to the data signal and information related to the threshold voltage. In this stage, the first control signal provided by the first control line EML1 jumps to the low level, the first control transistor T5 is turned on, the second node N2 can be pulled up to a reference voltage provided by the reference voltage line REF, and since the first node N1 is floating, the data signal stored in the second node N2 can be coupled to the first plate of the storage capacitor C1, and the first node N1 can simultaneously record the data signal and compensation information of the threshold voltage, thereby completing the processes of data signal writing and threshold voltage compensation.

In an eighth stage S18, the second control signal provided by the second control line EML2 is at the low level, and the second control transistor T6 is turned on, so that the light emitting element EL is turned on to emit light. In this stage, the first reset transistor T1, the second reset transistor T7, the data writing transistor T4, and the compensation transistor T2 are all turned off, and the first control transistor T5 is turned on.

After the eighth stage S18, the eighth stage S18 may be repeated until the first stage S11 is entered again.

In this example, a driving signal output by the driving transistor T3 is independent of the threshold voltage Vth of the driving transistor T3, and the influence of the threshold voltage of the driving transistor on the driving signal can be eliminated, thereby ensuring uniform display brightness and improving display effect.

In some examples, the signals of the second scan line GL2 and the first reset control line RT1 may be provided by shift register units in different stages of a same scan driving circuit.

In the operating timing of the pixel circuit of this example, the data signal and the threshold voltage of the driving transistor can be respectively written into the second node and the first node (i.e., written into the two plates of the storage capacitor C1 respectively), and the data signal can be written into the first node N1 from the second node N2 by the jumping of the first control signal of the first control line EML1, so that the data signal can be written into the first node N1. In this example, a charging process of writing the data signal to the first node N1 may be separated from the compensation process of the threshold voltage, which can flexibly control the threshold compensation duration, and can improve the data writing difficulty.

The first reset transistor T1 and the compensation transistor T2 in the pixel circuit provided in this example may be oxide thin film transistors, and the rest of the transistors may be low temperature poly-silicon thin film transistors. The first reset transistor T1 and the compensation transistor T2 may be oxide thin film transistors, which can prevent occurrence of electric leakage of the first node N1 and is beneficial to low-frequency display. The pixel circuit of this example is a LTPO pixel circuit, wherein the first scan line and the second scan line provide different scan signals, which can realize high and low frequency operation.

Figure 20A:
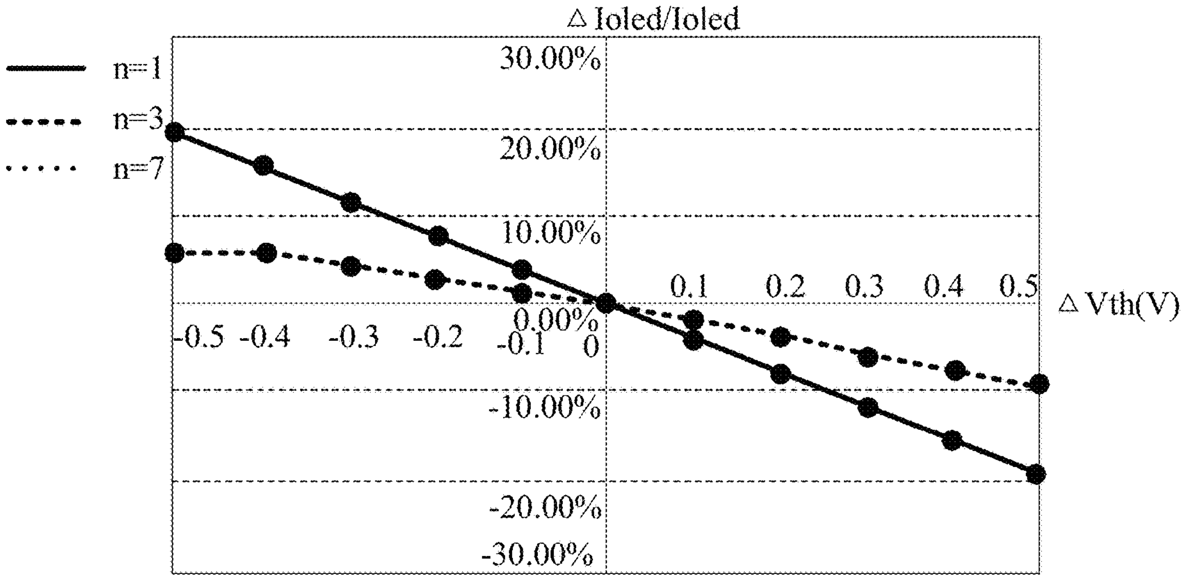
FIG. 20A to FIG. 20C are schematic diagrams of a threshold voltage sensitivity (Vth Sensitivity) of a pixel circuit.
Figure 20B:
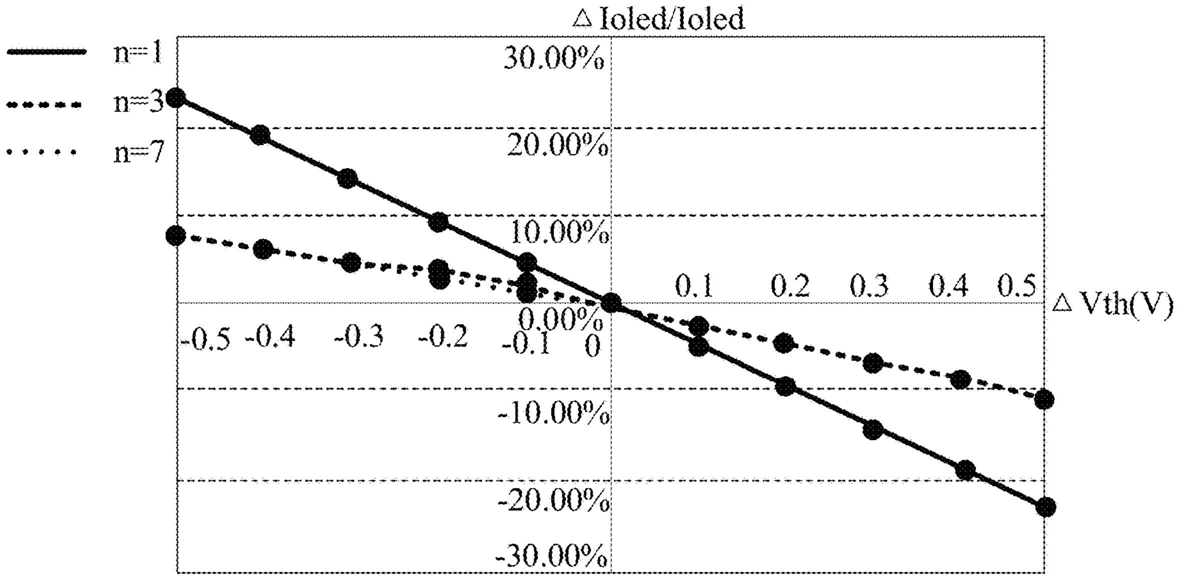
Figure 20C:
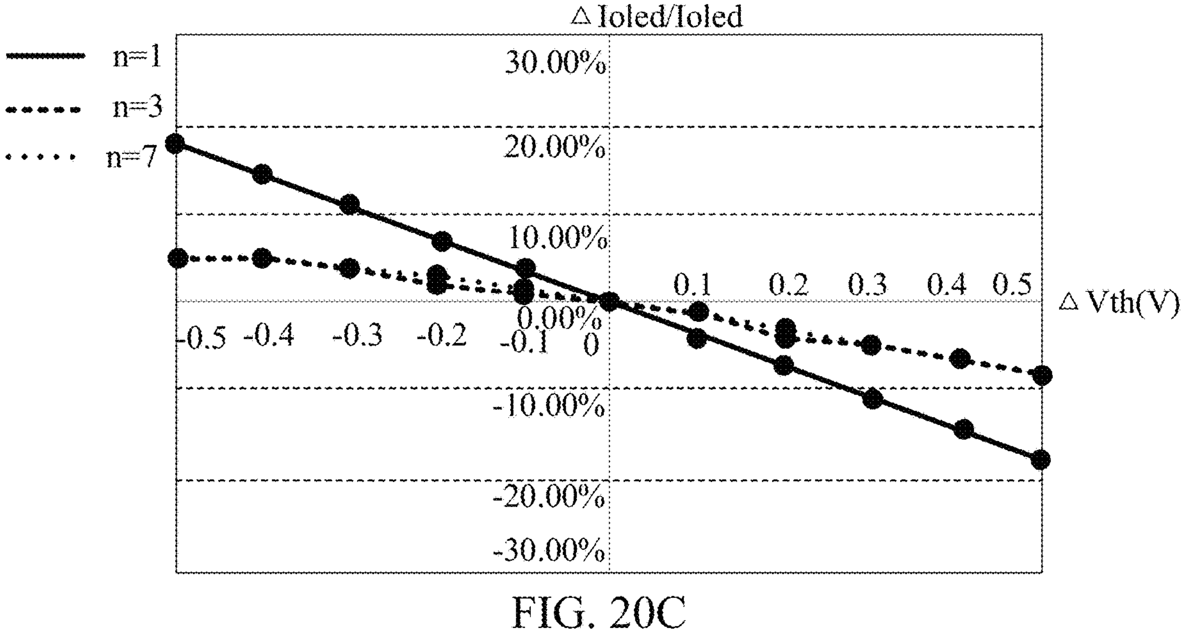

FIG. 20A to FIG. 20C are schematic diagrams of a threshold voltage sensitivity (Vth Sensitivity) of a pixel circuit. FIG. 20A is a schematic diagram of a threshold voltage sensitivity of a pixel circuit of a red sub-pixel, FIG. 20B is a schematic diagram of a threshold voltage sensitivity of a pixel circuit of a green sub-pixel, and FIG. 20C is a schematic diagram of a threshold voltage sensitivity of a pixel circuit of a blue sub-pixel. In FIG. 20A to FIG. 20C, the horizontal ordinate denotes a threshold voltage variation amount ΔVth, the threshold voltage variation amount can refer to a fluctuation amount between the threshold voltage and a theoretical threshold voltage due to operation fluctuation. The vertical ordinate indicates a fluctuation percentage of the driving signal of the light emitting element ΔIoled/Ioled (for example, a percentage of the amount of driving current fluctuation due to the fluctuation amount of threshold voltage and the theoretical drive current). In FIG. 20A to FIG. 20C, n may denote an integer multiple of scan time at a corresponding frequency, and the larger n, the longer a turned-on duration of the compensation transistor T2. The straight line represents a case where n is 1, the dotted line represents a case where n is 3, and the dash line represents a case where n is 7. In FIG. 20A, threshold voltage sensitivity curves for the cases where n is 3 and n is 7 may be approximately the same. As can be seen from FIG. 20A to FIG. 20C, the threshold voltage sensitivity of the driving signal of the light emitting element decreases as the turned-on duration of the compensation transistor T2 increases. In this example, sufficient compensation can be achieved by increasing the turned-on duration of the compensation transistor T2, thereby reducing display defects.

Figure 21:
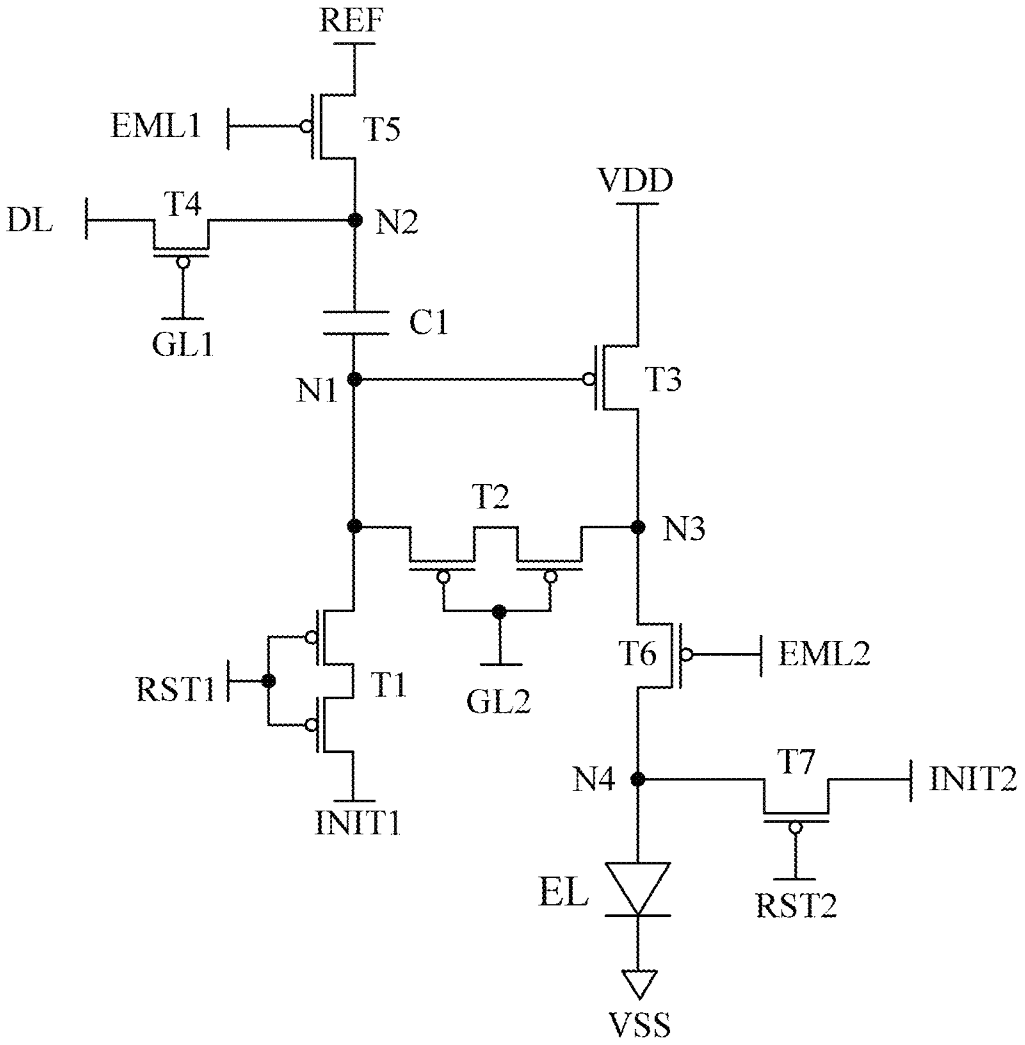
FIG. 21 is another equivalent circuit diagram of a pixel circuit according to at least one embodiment of the present disclosure.

FIG. 21 is another equivalent circuit diagram of a pixel circuit according to at least one embodiment of the present disclosure. In some examples, as shown in FIG. 21, the first reset transistor T1 and the compensation transistor T2 may be P-type transistors of a double gate structure, and the driving transistor T3, the data writing transistor T4, the first control transistor T5, the second control transistor T6, and the second reset transistor T7 may be P-type transistors. In this example, a first electrode of the first control transistor T5 is coupled with a reference voltage line which provides a reference voltage signal that may be different from a first voltage signal provided by a first power supply line VDD. In this way, a retention frame and a write frame at low frequency can be dynamically adjusted to compensate for the electric leakage of the first node N1. Rest of the structure of the pixel circuit according to this example may be referred to descriptions of the aforementioned embodiments, and thus will not be repeated here.

Figure 22:
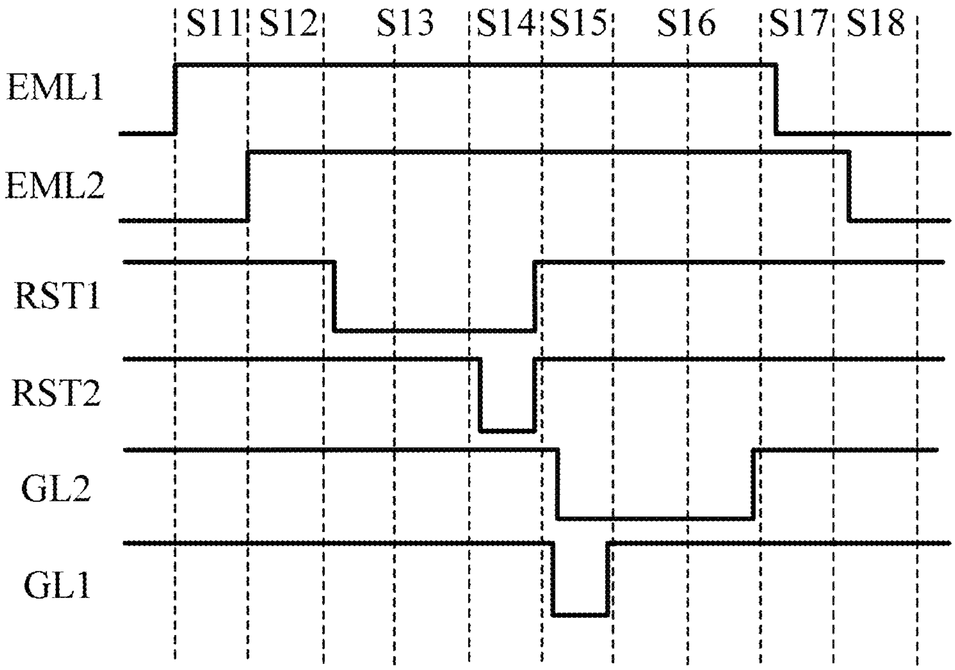
FIG. 22 is an operating timing diagram of the pixel circuit shown in FIG. 21.

FIG. 22 is an operating timing diagram of the pixel circuit shown in FIG. 21. In some examples, as shown in FIGS. 21 and 22, an operation process of the pixel circuit may include the following stages within a time period of one frame.

In a first stage S11, a first control signal provided by the first control line EML1 is at a high level, and the first control transistor T5 is turned off. A second control signal provided by the second control line EML2 is at a low level, and the second control transistor T6 is kept turned on. A first reset control signal provided by the first reset control line RST1 is at a high level, and the first reset transistor T1 is turned off. A second reset control signal provided by the second reset control line RST2 is at a high level, and the second reset transistor T7 is turned off. A first scan signal provided by the first scan line GL1 is at a high level, and the data writing transistor T4 is turned off. A second scan signal provided by the second scan line GL2 is at a high level, and the compensation transistor T2 is turned off. In this stage, the first node N1 and the second node N2 are in a floating state, and the light emitting element EL is in a light emitting state of the previous frame.

In a second stage S12, the second control signal provided by the second control line EML2 is at a high level, and the second control transistor T6 is turned off. The rest of signals are kept in the state of the first stage S11, and the rest of the transistors are kept in the state of the first stage S11. After displaying of the previous frame is ended, the light emitting element EL does not emit light.

In a third stage S13, the first reset control signal provided by the first reset control line RST1 jumps to a low level, and the first reset transistor T1 is turned on. The first reset transistor T1 is turned on, and the first node N1 can be refreshed by using the first initial signal provided by the first initial signal line INIT1 to erase display information of the previous frame. A gate-source voltage difference Vgs=Vinit1−Vdd of the driving transistor T3, where Vinit1 is a voltage of the first initial signal and Vdd is a voltage of the first voltage signal, and the driving transistor T3 may be turned on at this time. In this stage, the data writing transistor T4, the compensation transistor T2, the first control transistor T5, the second control transistor T6, and the second reset transistor T7 are all turned off.

In a fourth stage S14, the second reset control signal provided by the second reset control line RST2 is at a low level, the second reset transistor T7 is turned on, and the fourth node N4 is refreshed by using the second initial signal provided by the second initial signal line INIT2. In this stage, the first reset transistor T1 and the driving transistor T3 are turned on, and the data writing transistor T4, the compensation transistor T2, the first control transistor T5 and the second control transistor T6 are turned off.

In a fifth stage S15, the first reset transistor T1 and the second reset transistor T7 are turned off. The first scan signal provided by the first scan line GL1 is at the low level, the data writing transistor T4 is turned on, and the data signal transmitted by the data line DL is written into the second node N2. The second scan signal provided by the second scan line GL2 is at the low level, and the compensation transistor T2 is turned on. In this stage, both the driving transistor T3 and the compensation transistor T2 are turned on, and threshold compensation can be performed on the driving transistor T3 by using the first voltage signal provided by the first power supply line VDD. In theory, the first node N1 can be written with Vdd+Vth before the compensation transistor T2 is turned off, where Vdd is the voltage of the first voltage signal and Vth is a threshold voltage of the driving transistor T3. In this stage, the first reset transistor T1, the second reset transistor T7, the first control transistor T5 and the second control transistor T6 are all turned off.

In a sixth stage S16, the first scan signal provided by the first scan line GL1 is at the high level, and the data writing transistor T4 is turned off, the second scan signal provided by the second scan line GL2 is at the low level, and the compensation transistor T2 is kept turned on. In this stage, both the driving transistor T3 and the compensation transistor T2 are turned on, and threshold compensation can be performed on the driving transistor T3. In this stage, the first reset transistor T1, the second reset transistor T7, the first control transistor T5 and the second control transistor T6 are all turned off. By writing the threshold voltage into the first node N1 in the fifth stage S15 and the sixth stage S16, duration of writing the threshold voltage can be increased, and sufficient compensation can be realized, so that definition of pictures in different gray-scales can be ensured to be clearer, thus improving the display quality at high frequency.

In a seventh stage S17, the compensation transistor T2 is turned off, and the data writing transistor T4 is turned off. After the data writing transistor T4 and the compensation transistor T2 are turned off, the first node N1 and the second node N2 are in a floating state, and the two plates of the storage capacitor C1 can respectively record information related to the data signal and information related to the threshold voltage. In this stage, the first control signal provided by the first control line EML1 jumps to a low level, the first control transistor T5 is turned on, the second node N2 can be pulled up to a reference voltage provided by the reference voltage line REF, and since the first node N1 is floating, the data signal stored in the second node N2 can be coupled to the first plate of the storage capacitor C1, and the first node N1 can simultaneously record the data signal and compensation information of the threshold voltage, thereby completing the processes of data signal writing and threshold voltage compensation.

In an eighth stage S18, the second control signal provided by the second control line EML2 is at the low level, and the second control transistor T6 is turned on, so that the light emitting element EL is turned on to emit light. In this stage, the first reset transistor T1, the second reset transistor T7, the data writing transistor T4, and the compensation transistor T2 are all turned off, and the first control transistor T5 is turned on.

After the eighth stage S18, the eighth stage S18 may be repeated until the first stage S11 is entered again.

In this example, the driving signal output by the driving transistor T3 is independent of the threshold voltage Vth of the driving transistor T3, and influence of the threshold voltage of the driving transistor on the driving signal can be eliminated, thereby ensuring uniform display brightness and improving display effect.

In the pixel circuit provided in this example, the first reset transistor T1 and the compensation transistor T2 may be a low-temperature poly-silicon thin film transistor of a double gate structure, which can prevent electric leakage of the first node N1 and is beneficial to low-frequency display.

For rest of the description of the pixel circuit of this embodiment, reference may be made to the description of the foregoing embodiments, so details will not be repeated here.

Figure 23:
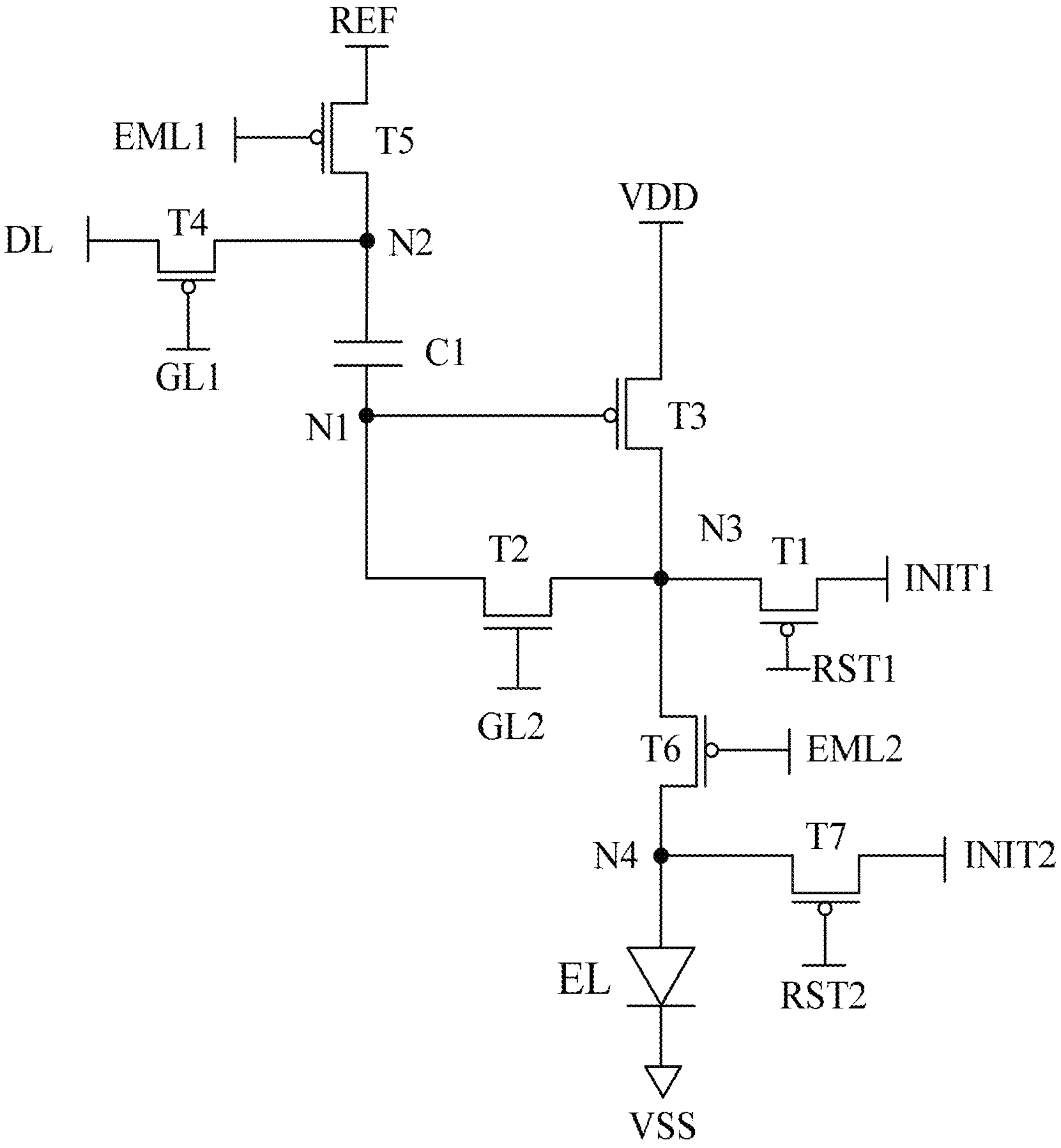
FIG. 23 is another equivalent circuit diagram of a pixel circuit according to at least one embodiment of the present disclosure.

FIG. 23 is another equivalent circuit diagram of a pixel circuit according to at least one embodiment of the present disclosure. In some examples, as shown in FIG. 23, a compensation transistor T2 may be an N-type transistor, for example, an oxide thin film transistor may be employed. Rest of the transistors may be P-type transistors, for example, low-temperature poly-silicon thin film transistors may be employed. A gate of a first reset transistor T1 is coupled with the first reset control line RST1, a first electrode of the first reset transistor T1 is coupled with the first initial signal line INIT1, and a second electrode of the first reset transistor T1 is coupled with a third node N3. The first reset transistor T1 of this example may be configured to reset the third node N3. Rest of the structure of the pixel circuit according to this example may be referred to descriptions of the aforementioned embodiments, and thus will not be repeated here.

Figure 24:
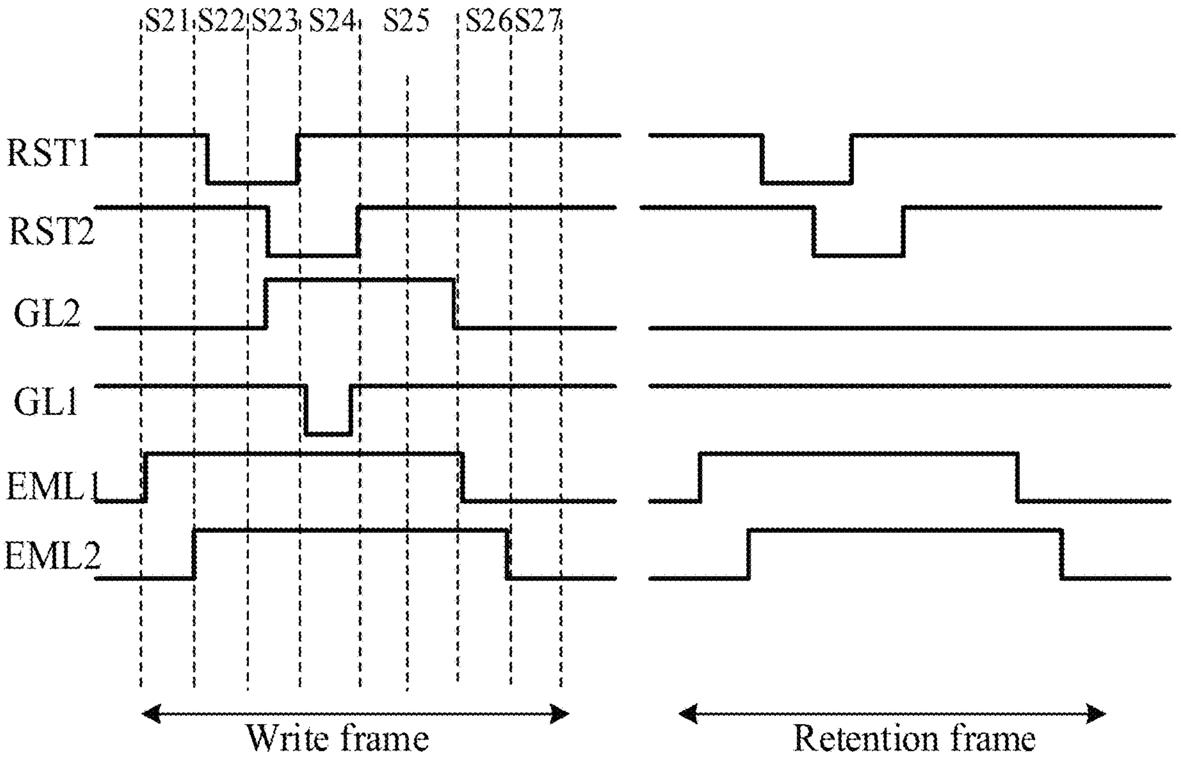
FIG. 24 is an operating timing diagram of the pixel circuit shown in FIG. 23.

FIG. 24 is an operating timing diagram of the pixel circuit shown in FIG. 23. In some examples, as shown in FIGS. 23 and 24, each display period of the pixel circuit may include a write frame and a retention frame after the write frame. In a write frame, the pixel circuit performs a process of writing a data signal and compensating a threshold voltage, and in a retention frame, no further data writing is required.

In some examples, as shown in FIGS. 23 and 24, an operation process of the pixel circuit may include the following stages within the write frame.

In a first stage S21, the first control line EML1 provides a high-level first control signal, and the first control transistor T5 is turned off. The second control line EML2 provides a low-level second control signal, and the second control transistor T6 is kept turned on. The data writing transistor T4, the compensation transistor T2, the first reset transistor T1, and the second reset transistor T7 are all turned off. In this stage, the first node N1 and the second node N2 are in a floating state, and the light emitting element EL is in a light emitting state of the previous frame.

In a second stage S22, the second control line EML2 provides a high-level second control signal, the second control transistor T6 is turned off, and displaying of the previous frame ends. After the second control transistor T6 is turned off, the first reset control line RST1 provides a low-level first reset control signal, the first reset transistor T1 is turned on, and the third node N3 is refreshed by a first initial signal provided by the first initial signal line INIT1. The rest of the signals are kept in the state of the first stage S21, and the rest of the transistors are kept in the state of the first stage S21.

In a third stage S23, the first reset transistor T1 is kept turned on. The second reset control line RST2 provides a low-level second reset control signal, the second reset transistor T7 is turned on, and the fourth node N4 is refreshed. The second scan line GL2 provides a high-level second scan signal, and the compensation transistor T2 is turned on. Since both the first reset transistor T1 and the compensation transistor T2 are turned on, the first node N1 can be refreshed by the first initial signal provided by the first initial signal line INIT1, and the display information of the previous frame can be erased until end time of the third stage S23. At this time, a gate-source voltage difference of the driving transistor T3 Vgs=Vinit1−Vdd, where Vinit1 is a voltage of the first initial signal and Vdd is a voltage of a first voltage signal, and the driving transistor T3 is turned-on. In this stage, the rest of the signals are kept in the state of the second stage S22, and the rest of the transistors are kept in the state of the second stage S22.

In a fourth stage S24, the first scan line GL1 provides a low-level first scan signal, the data writing transistor T4 is turned on, and a data signal transmitted by the data line DL is written into the second node N2. In this stage, the first reset control line RST1 provides a high-level first reset control signal, and the first reset transistor T1 is turned off. The rest of the signals are kept in the state of the third stage S23, and the rest of the transistors are kept in the state of the third stage S23.

In a fifth stage S25, the first scan line GL1 provides a high-level first scan signal, and the data writing transistor T4 is turned off. The second scan line GL2 continuously provides a high-level second scan signal, and the compensation transistor T2 is turned on. In this stage, both the compensation transistor T2 and the driving transistor T3 are turned on, and threshold compensation may be performed on the driving transistor T3 by using the first voltage signal provided by the first power may provide line VDD. In theory, the first node N1 can be written with Vdd+Vth before the compensation transistor T2 is turned off, where Vdd is the voltage of the first voltage signal and Vth is a threshold voltage of the driving transistor T3. In this stage, the first reset transistor T1, the second reset transistor T7, the first control transistor T5 and the second control transistor T6 are all turned off. In this example, the threshold voltage is written into the first node N1 by using the fourth stage S24 and the fifth stage S25, which can increase the duration of writing the threshold voltage and achieve sufficient compensation, thus ensuring that the definition of pictures in different gray-scales is clearer, thus improving the display quality at high frequency.

In a sixth stage S26, the compensation transistor T2 is turned off, and the data writing transistor T4 is turned off. After the data writing transistor T4 and the compensation transistor T2 are turned off, the first node N1 and the second node N2 are in a floating state, and the two plates of the storage capacitor C1 can respectively record information related to the data signal and information related to the threshold voltage.

In this stage, the first control line EML1 provides a low-level first control signal, the first control transistor T5 is turned on, the second node N2 can be pulled up to a reference voltage provided by the reference voltage line REF, and since the first node N1 is floating, a data signal stored in the second node N2 can be coupled to the first plate of the storage capacitor C1, and the first node N1 can simultaneously record the data signal and compensation information of the threshold voltage, thereby completing the processes of data signal writing and the threshold voltage compensation.

In a seventh stage S27, the second control line EML2 provides a low-level second control signal, and the second control transistor T6 is turned on, so that the light emitting element EL is turned on to emit light. In this stage, the first reset transistor T1, the second reset transistor T7, the data writing transistor T4, and the compensation transistor T2 are all turned off, and the first control transistor T5 is turned on.

In some examples, as shown in FIG. 24, in the retention frame, timings of the first scan signal provided by the first scan line GL1, the first control signal provided by the first control line EML1, and the second control signal provided by the second control line EML2 may be substantially the same as timings of the first scan signal, the first control signal, and the second control signal in the write frame respectively. The first scan line GL1 may continuously provide a high-level signal, and the second scan line GL2 may continuously provide a low-level signal, so that the data writing transistor T4 and the compensation transistor T2 are kept turned off without performing a data refresh process. The timing of the first reset control signal provided by the first reset control line RST1 and the timing of the first reset control signal in the write frame may be substantially the same, and the first reset control line RST1 may be continuously refreshed. In this example, by setting the first reset control line RST1 to be continuously refreshed, a hysteresis level of the driving transistor T3 can be improved, and Vrr can be improved, where Vrr is a frequency switching flicker, showing that there is a difference between brightness and color coordinates before and after frequency switching.

In some other examples, in the write frame, after threshold voltage compensation, the first reset transistor T1 may be controlled to turn on by the first reset control line RST1 to refresh the third node N3 to improve the hysteresis level of the driving transistor T3. For example, the first reset control line RST1 may provide a low-level first reset control signal before the first control line EML1 provides a low-level first control signal and after the high-level second scan signal provided by the second scan line GL2 ends. In some other examples, the first reset control signal provided by the first reset control line RST1 to which the pixel circuit is connected and the second reset control signal provided by the second reset control line RST2 to which the pixel circuit is connected may be the same. This embodiment is not limited thereto.

Figure 25:
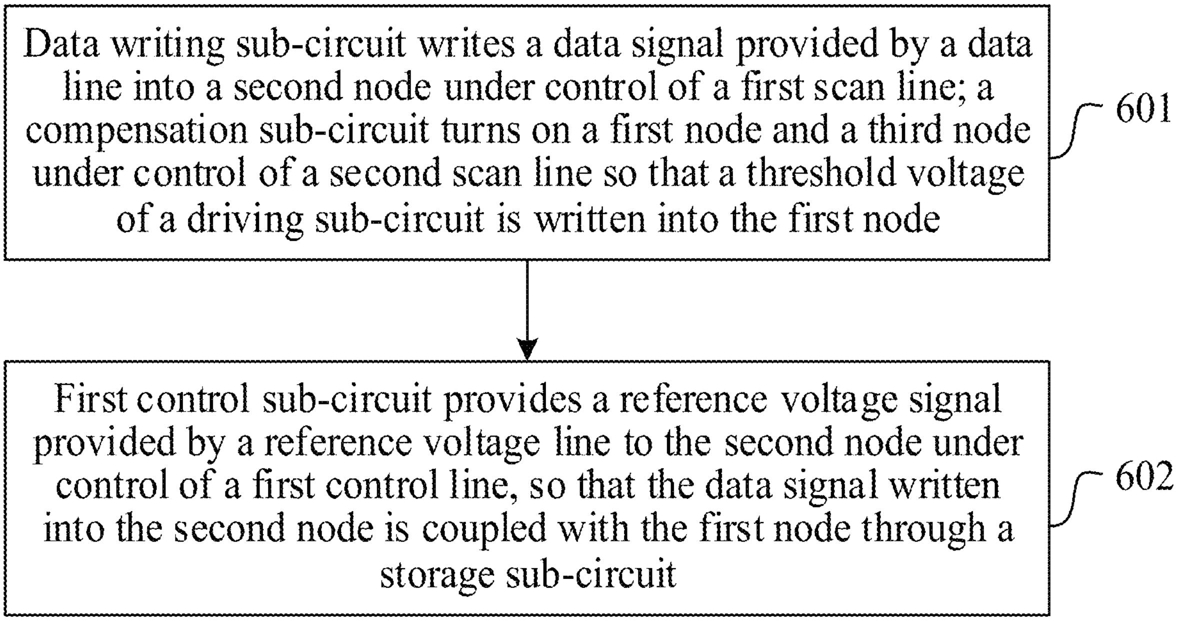
FIG. 25 is a flowchart of a method for driving a pixel circuit according to at least one embodiment of the present disclosure.

FIG. 25 is a flowchart of a method for driving a pixel circuit according to at least one embodiment of the present disclosure. In some examples, as shown in FIG. 25, the method for driving the pixel circuit according to an embodiment of the present disclosure may include following steps.

Step 601: a data writing sub-circuit writes a data signal provided by a data line into a second node under control of a first scan line; a compensation sub-circuit turns on a first node and a third node under control of a second scan line so that a threshold voltage of a driving sub-circuit is written into the first node;

Step 602: a first control sub-circuit provides a reference voltage signal provided by a reference voltage line to the second node under control of a first control line, so that the data signal written into the second node is coupled to the first node through a storage sub-circuit.

In some examples, the method may further include: a second control sub-circuit transmits a driving signal output by the driving sub-circuit to a light emitting element under control of the second control line.

In some examples, duration of an effective level signal of the first scan signal may be less than the duration of an effective level signal of the second scan signal.

In some examples, the method may further include: a first reset sub-circuit transmits a first initial signal provided by a first initial signal line to the first node or the third node under control of the first reset control line before the compensation sub-circuit writes the threshold voltage of the driving sub-circuit into the first node.

In some examples, the method may further include: the first reset sub-circuit transmits the first initial signal provided by the first initial signal line to the third node under control of the first reset control line after the compensation sub-circuit writes the threshold voltage of the driving sub-circuit into the first node.

In some examples, the method may further include: a second reset sub-circuit transmits a second initial signal provided by a second initial signal line to the fourth node under control of the second reset control line before the data writing sub-circuit writes the data signal into the second node.

For the description of the method for driving the pixel circuit of this embodiment, reference may be made to the description of the foregoing embodiments, so details will not be repeated here.

Figure 26:
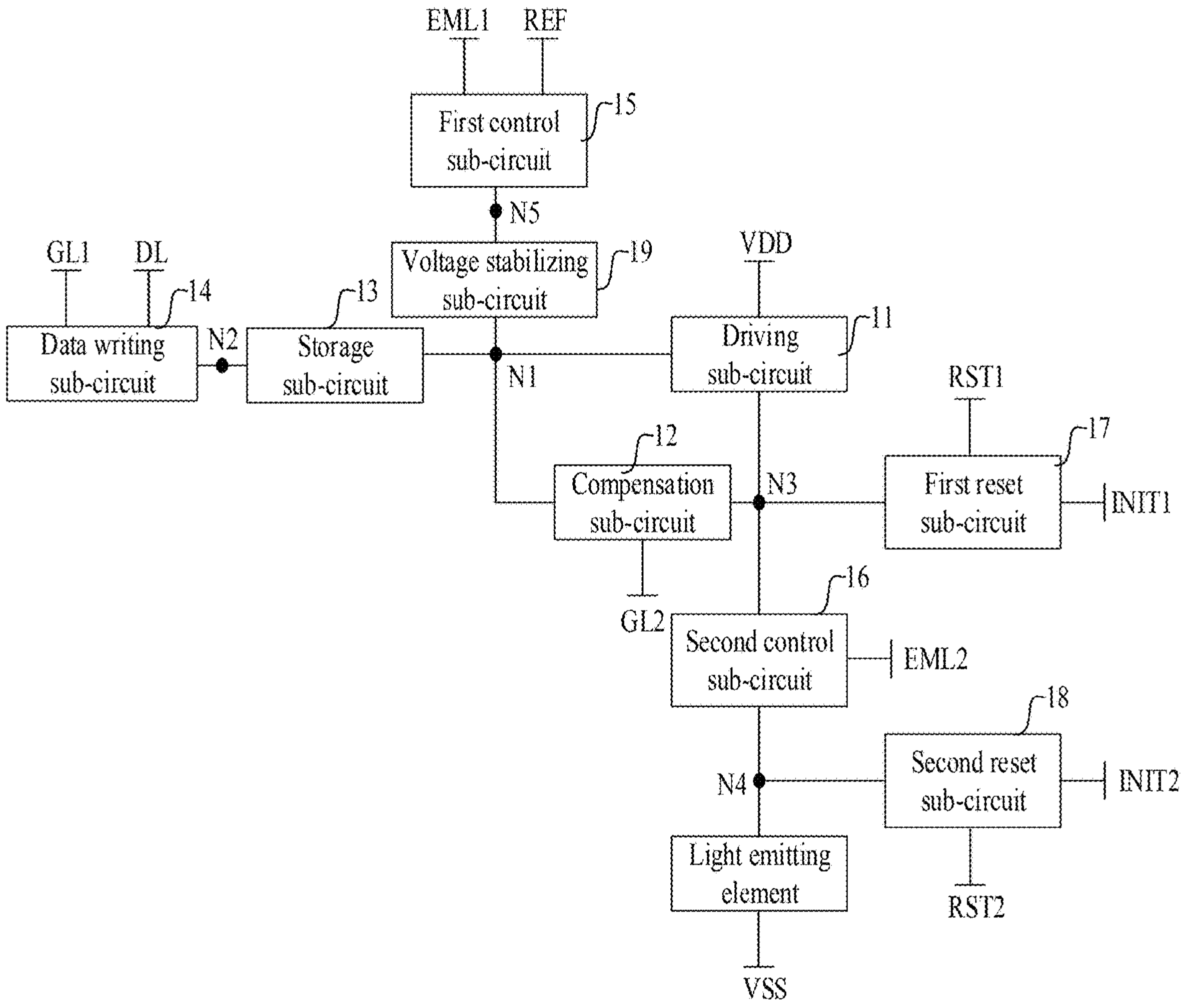
FIG. 26 is a schematic diagram of another structure of a pixel circuit according to at least one embodiment of the present disclosure.

FIG. 26 is a schematic diagram of another structure of a pixel circuit according to at least one embodiment of the present disclosure. In some examples, as shown in FIG. 26, the pixel circuit of the this embodiment may include a driving sub-circuit 11, a data writing sub-circuit 14, a compensation sub-circuit 12, a storage sub-circuit 13, a first control sub-circuit 15, a voltage stabilizing sub-circuit 19, a second control sub-circuit 16, a first reset sub-circuit 17 and a second reset sub-circuit 18. The driving sub-circuit 11 is coupled with a first power supply line VDD, a first node N1 and a third node N3, and is configured to provide a driving signal to the third node N3 under control of the first node N1. The storage sub-circuit 13 is coupled with the first node N1 and the second node N2. The data writing sub-circuit 14 is coupled with a data line DL, a first scan line GL1, and the second node N2, and is configured to write a data signal provided by the data line DL into the first node N1 through the storage sub-circuit 13 under control of the first scan line GL1. The compensation sub-circuit 12 is coupled with a second scan line GL2, the first node N1, and a third node N3, and is configured to turn on the first node N1 and the third node N3 under control of the second scan line GL2 to write a threshold voltage of the driving sub-circuit 11 into the first node N1. The voltage stabilizing sub-circuit 19 is coupled with the first node N1 and a fifth node N5. The first control sub-circuit 15 is coupled with a first control line EML1, a reference voltage line REF, and the fifth node N5, and is configured to provide a reference voltage signal provided by the reference voltage line REF to the fifth node N5 under control of the first control line EML1 after the data signal is written into the first node N1. The second control sub-circuit 16 is coupled with a second control line EML2, the third node N3, and a fourth node N4, and is configured to transmit the driving signal provided by the driving sub-circuit 11 to the fourth node N4 under control of the second control line EML2. The fourth node N4 is coupled with a light emitting element. The first reset sub-circuit 17 is coupled with a first reset control line RST1, a first initial signal line INIT1, and the third node N3, and is configured to transmit a first initial signal provided by the first initial signal line INIT1 to the third node N3 under control of the first reset control line RST1. The second reset sub-circuit 18 is coupled with a second reset control line RST2, a second initial signal line INIT2, and the fourth node N4, and is configured to transmit a second initial signal provided by the second initial signal line INIT2 to the fourth node N4 under control of the second reset control line RST2.

In this example, the data signal provided by the data line is directly charged into the first node through the storage sub-circuit, and compensation of the threshold voltage is driven by the first voltage signal provided by the first power supply line, which can ensure fast charging. In this example, the processes of threshold voltage compensation and data signal writing can be performed independently. When duration of the threshold voltage compensation is prolonged, less data writing time can be used, thus improving a refresh rate of the product.

Figure 27:
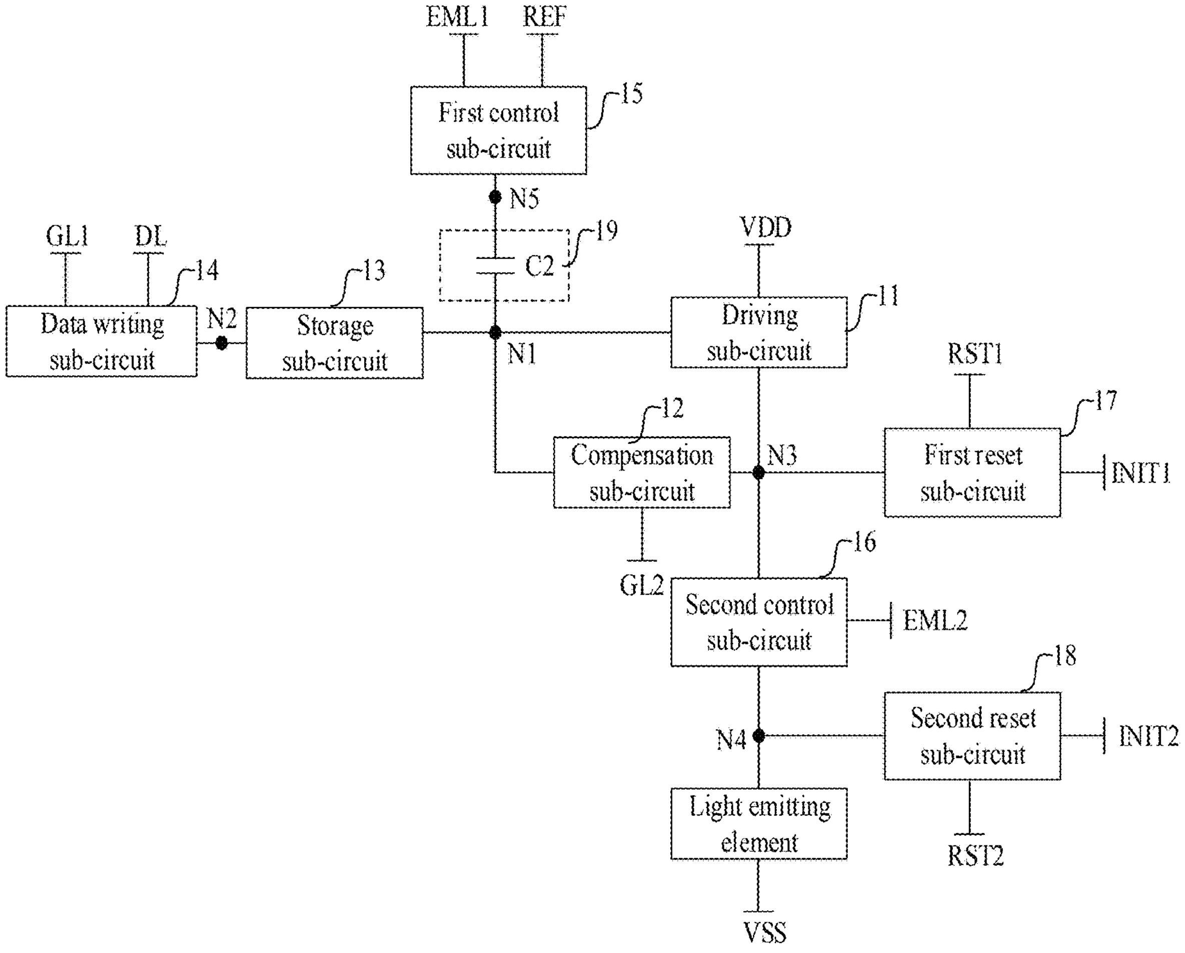
FIG. 27 is an equivalent circuit diagram of a voltage stabilizing sub-circuit of a pixel circuit according to at least one embodiment of the present disclosure.

FIG. 27 is an equivalent circuit diagram of a voltage stabilizing sub-circuit of a pixel circuit according to at least one embodiment of the present disclosure. In some examples, as shown in FIG. 27, the voltage stabilizing sub-circuit 19 in the pixel circuit includes a voltage stabilizing capacitor C2. A first plate of the voltage stabilizing capacitor C2 is coupled with a first node N1, and a second plate of the voltage stabilizing capacitor C2 is coupled with a fifth node N5. The voltage stabilizing capacitor C2 may be configured to stabilize a potential of the first node N1, thereby improving stability of the circuit.

FIG. 27 illustrates an exemplary structure of a voltage stabilizing sub-circuit. Those skilled in the art may easily understand that embodiments of the voltage stabilizing sub-circuit are not limited thereto as long as its functions can be achieved.

Figure 28:
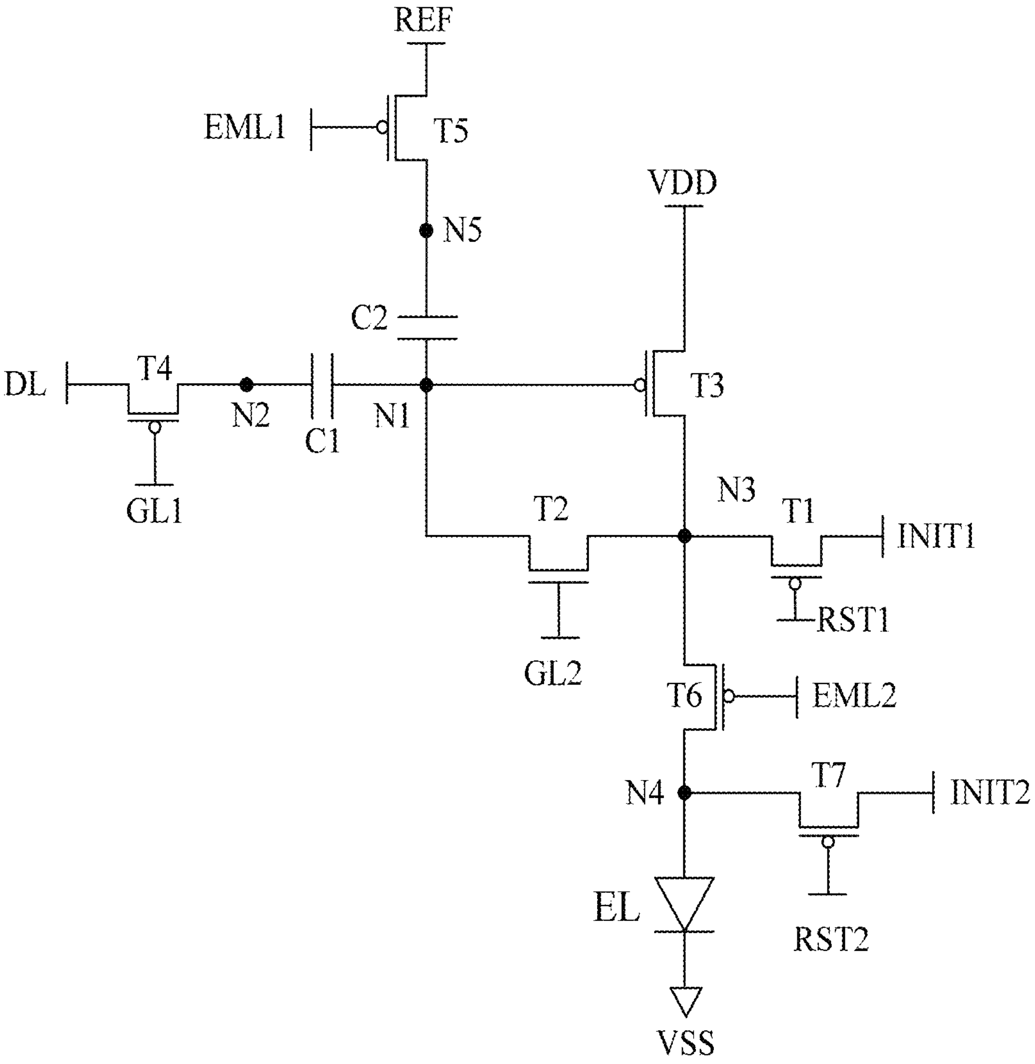
FIG. 28 is an equivalent circuit diagram of a pixel circuit according to at least one embodiment of the present disclosure.

FIG. 28 is an equivalent circuit diagram of a pixel circuit according to at least one embodiment of the present disclosure. In some examples, as shown in FIG. 28, the driving sub-circuit may include a driving transistor T3, the compensation sub-circuit may include a compensation transistor T2, the data writing sub-circuit may include a data writing transistor T4, the storage sub-circuit may include a storage capacitor C1, the first control sub-circuit may include a first control transistor T5, the second control sub-circuit may include a second control transistor T6, the first reset sub-circuit may include a first reset transistor T1, the second reset sub-circuit may include a second reset transistor T7 and the voltage stabilizing sub circuit may include a voltage stabilizing capacitor C2. In some examples, the compensation transistor T2 may be an N-type transistor, for example, an oxide thin film transistor may be employed. Rest of the transistors may be P-type transistors, for example, low-temperature poly-silicon thin film transistors may be employed.

In some examples, as shown in FIG. 28, a first plate of the voltage stabilizing capacitor C2 is coupled with the first node N1, and a second plate of the voltage stabilizing capacitor C2 is coupled with the fifth node N5. A gate of the first control transistor T5 is coupled with a first control line EML1, a first electrode of the first control transistor T5 is coupled with a reference voltage line REF, and a second electrode of the first control transistor T5 is coupled with the fifth node N5. Rest of the structure of the pixel circuit according to this embodiment may be referred to descriptions of the aforementioned embodiments, and thus will not be repeated here.

Figure 29:
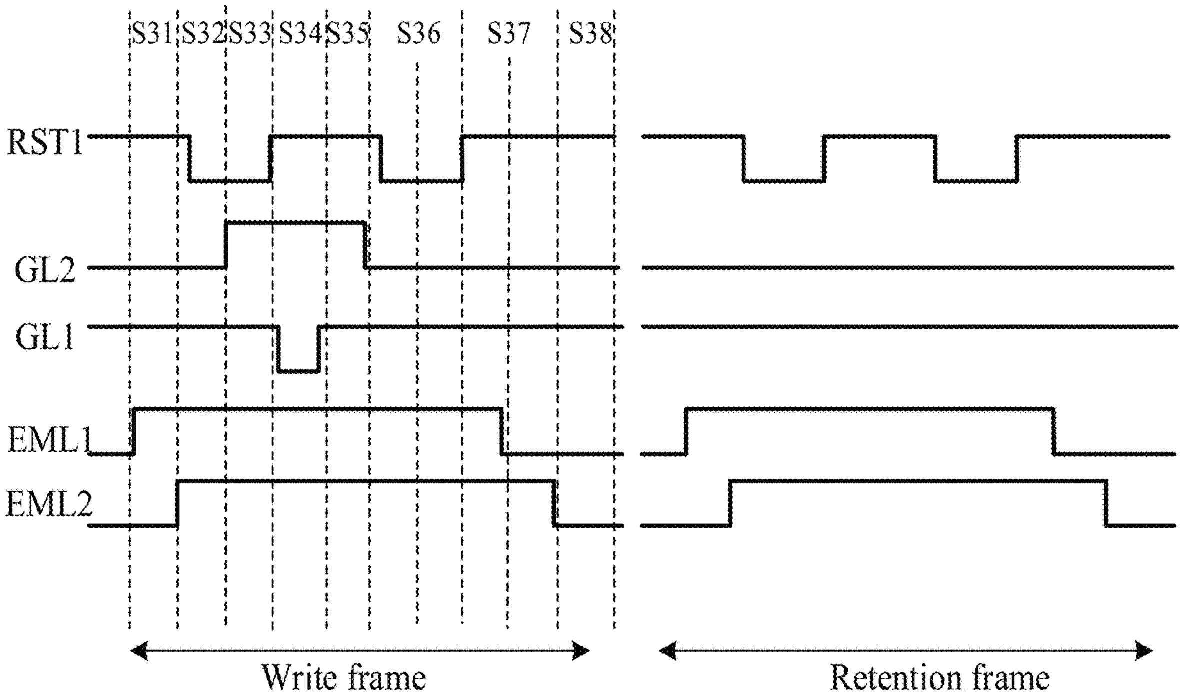
FIG. 29 is an operating timing diagram of the pixel circuit shown in FIG. 28.

FIG. 29 is an operating timing diagram of the pixel circuit shown in FIG. 28. In some examples, as shown in FIGS. 28 and 29, each display period of the pixel circuit may include a write frame and a retention frame after the write frame. In a write frame, the pixel circuit performs a process of writing a data signal and compensating a threshold voltage, and in a retention frame, no further data writing is required. In this example, the second reset control signal provided by the second reset control line RST2 may be the same as the first reset control signal provided by the first reset control line RST1. However, this embodiment is not limited thereto. In some other examples, the second reset control signal provided by the second reset control line RST2 may be different from the first reset control signal provided by the first reset control line RST1, for example, the second reset control line RST2 of a pixel circuit in current row may be electrically connected to the first reset control line RST1 connected to a pixel circuit in a previous row.

In some examples, as shown in FIGS. 28 and 29, an operation process of the pixel circuit may include the following stages within the write frame.

In a first stage S31, the first control line EML1 provides a high-level first control signal, the first control transistor T5 is turned off, the second control line EML2 provides a low-level second control signal, and the second control transistor T6 is kept turned on. The data writing transistor T4, the compensation transistor T2, the first reset transistor T1, and the second reset transistor T7 are all turned off. In this stage, the first node N1 and the second node N2 are in a floating state, and the light emitting element EL is in a light emitting state of the previous frame.

In a second stage S32, the second control line EML2 provides a high-level second control signal, the second control transistor T6 is turned off, and displaying of the previous frame is ended. After the second control transistor T6 is turned off, the first reset control line RST1 provides a low-level first reset control signal, the first reset transistor T1 is turned on, and the third node N3 is refreshed by using the first initial signal provided by the first initial signal line INIT1. The rest of the signals are kept in the state of the first stage S31, and the rest of the transistors are kept in the state of the first stage S31.

In a third stage S33, the first reset transistor T1 is kept turned on. The second scan line GL2 provides a high-level second scan signal, and the compensation transistor T2 is turned on. Since both the first reset transistor T1 and the compensation transistor T2 are turned on, the first node N1 can be refreshed by using the first initial signal provided by the first initial signal line INIT1, and display information of the previous frame can be erased until end time of the third stage S23. At this time, a gate-source voltage difference of the driving transistor T3 Vgs=Vinit1−Vdd, where Vinit1 is a voltage of the first initial signal and Vdd is a voltage of the first voltage signal, and the driving transistor T3 is turned-on. In this stage, the rest of the signals are kept in the state of the second stage S32, and the rest of the transistors are kept in the state of the second stage S32.

In a fourth stage S34, the first scan line GL1 provides a low-level first scan signal, the data writing transistor T4 is turned on, the data signal transmitted by the data line DL is directly charged to the storage capacitor C1, and the data signal is written into the first node N1 through the storage capacitor C1. In this stage, the first reset control line RST1 provides a high-level first reset control signal, and the first reset transistor T1 is turned off. The rest of the signals are kept in the state of the third stage S23, and the rest of the transistors are kept in the state of the third stage S23.

In a fifth stage S35, the first scan line GL1 provides a high-level first scan signal, and the data writing transistor T4 is turned off. The second scan line GL2 continuously provides the high-level second scan signal, and the compensation transistor T2 is turned on. In this stage, both the compensation transistor T2 and the driving transistor T3 are turned on, and threshold compensation may be performed on the driving transistor T3 by using the first voltage signal provided by the first power may provide line VDD. In this stage, the first reset transistor T1, the data writing transistor T4, the first control transistor T5, and the second control transistor T6 are all turned off.

In a sixth stage S36, after the compensation transistor T2 is turned off, the first reset control line RST1 provides a low-level first control signal, the first reset transistor T1 is turned on, and the third node N3 is refreshed by using the first initial signal. In this stage, the data writing transistor T4, the first control transistor T5, and the second control transistor T6 are all turned off.

In a seventh stage S37, the first control signal provided by the first control line EML1 is switched from high level to low level, the first control transistor T5 is turned on, and the reference voltage signal provided by the reference voltage line REF is written into the fifth node N5, the voltage stabilizing capacitor C2 functions in stabilizing the potential of the first node N1, and the voltage stabilizing capacitor C2 does not participate in circuit compensation, thus avoiding influence of process error on the stability of the circuit.

In an eighth stage S38, the second control line EML2 provides the low-level second control signal, and the second control transistor T6 is turned on, so that the light emitting element EL is turned on to emit light. In this stage, the first reset transistor T1, the second reset transistor T7, the data writing transistor T4, and the compensation transistor T2 are all turned off, and the first control transistor T5 is turned on. In this example, the first reset transistor T1 is controlled to be turned on by the first reset control line before and after the threshold voltage compensation in the write frame, and the third node N3 is refreshed to improve a hysteresis level of the driving transistor T3. However, this embodiment is not limited thereto. In some other examples, the operating timing of the pixel circuit in the write frame may be as shown in FIG. 24, that is, the pixel circuit controls the first reset transistor T1 to be turned on to refresh the third node N3 only before the threshold voltage compensation.

In some examples, as shown in FIG. 29, in the retention frame, timings of the first scan signal provided by the first scan line GL1, the first control signal provided by the first control line EML1, and the second control signal provided by the second control line EML2 may be substantially the same as timings of the first scan signal, the first control signal, and the second control signal in the write frame respectively. The first scan line GL1 may continuously provide a high-level signal, and the second scan line GL2 may continuously provide a low-level signal, so that the data writing transistor T4 and the compensation transistor T2 are kept turned off without performing a data refresh process. The timing of the first reset control signal provided by the first reset control line RST1 and the timing of the first reset control signal in the write frame may be substantially the same, and the first reset control line RST1 may be continuously refreshed. In this example, by setting the first reset control line RST1 to be continuously refreshed, a hysteresis level of the driving transistor T3 can be improved, and Vrr can be improved, where Vrr is a frequency switching flicker, showing that there is a difference between brightness and color coordinates before and after frequency switching.

Figure 30:
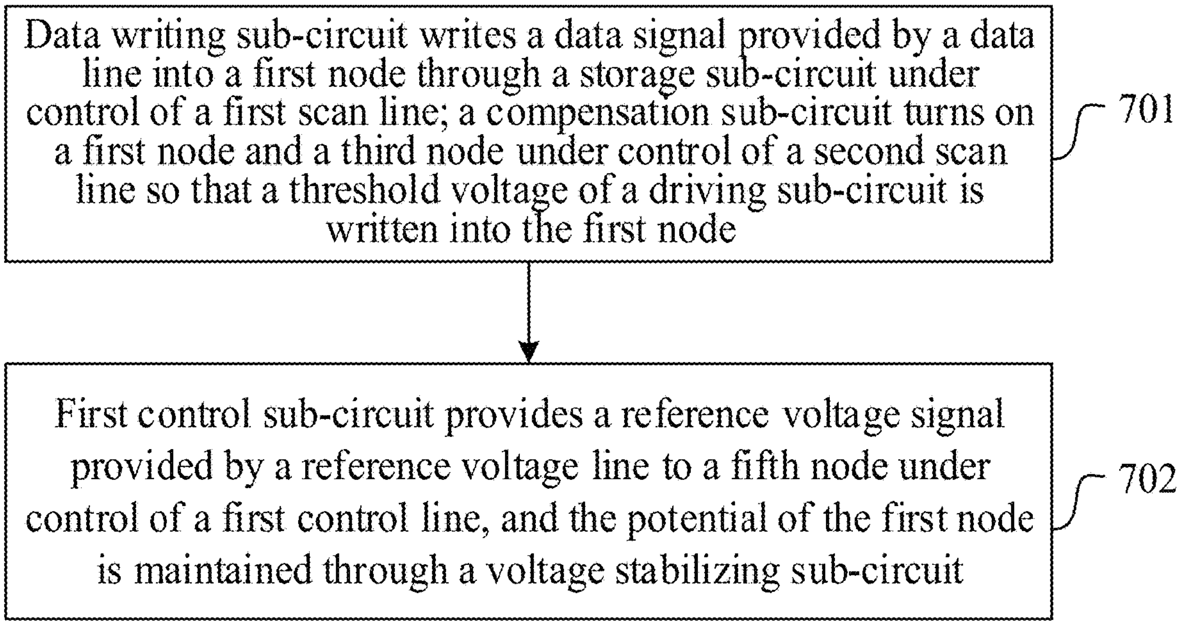
FIG. 30 is a flowchart of a method for driving a pixel circuit according to at least one embodiment of the present disclosure.

FIG. 30 is a flowchart of a method for driving a pixel circuit according to at least one embodiment of the present disclosure. In some examples, as shown in FIG. 30, the method for driving the pixel circuit according to an embodiment of the present disclosure may include following steps.

Step 701: a data writing sub-circuit writes a data signal provided by a data line into a first node through a storage sub-circuit under control of a first scan line; a compensation sub-circuit turns on a first node and a third node under control of a second scan line so that a threshold voltage of a driving sub-circuit is written into the first node;

Step 702: a first control sub-circuit provides a reference voltage signal provided by a reference voltage line to a fifth node under control of a first control line, and a potential of the first node is maintained through a voltage stabilizing sub-circuit.

In some examples, the method may further include: a first reset sub-circuit transmits a first initial signal provided by a first initial signal line to the third node under control of the first reset control line before and after the compensation sub-circuit writes the threshold voltage of the driving sub-circuit into the first node.

For the description of the method for driving the pixel circuit of this embodiment, reference may be made to the description of the foregoing embodiments, so details will not be repeated here.

The present disclosure further includes a display substrate, which includes a base substrate, a circuit structure layer disposed on the base substrate. The circuit structure layer may include at least one pixel circuit group. At least one pixel circuit group may include two pixel circuits disposed adjacent to each other along a first direction. The two pixel circuits in the at least one pixel circuit group may be symmetrically arranged with respect to a center line of the pixel circuit group in the first direction. The pixel circuit of this example may be the pixel circuit of the embodiment described above.

In the present disclosure, "symmetrically" may refer to a case that a boundary is defined not so strictly and an approximately symmetrical arrangement within a range of a process and measurement error is allowed.

Figure 31:
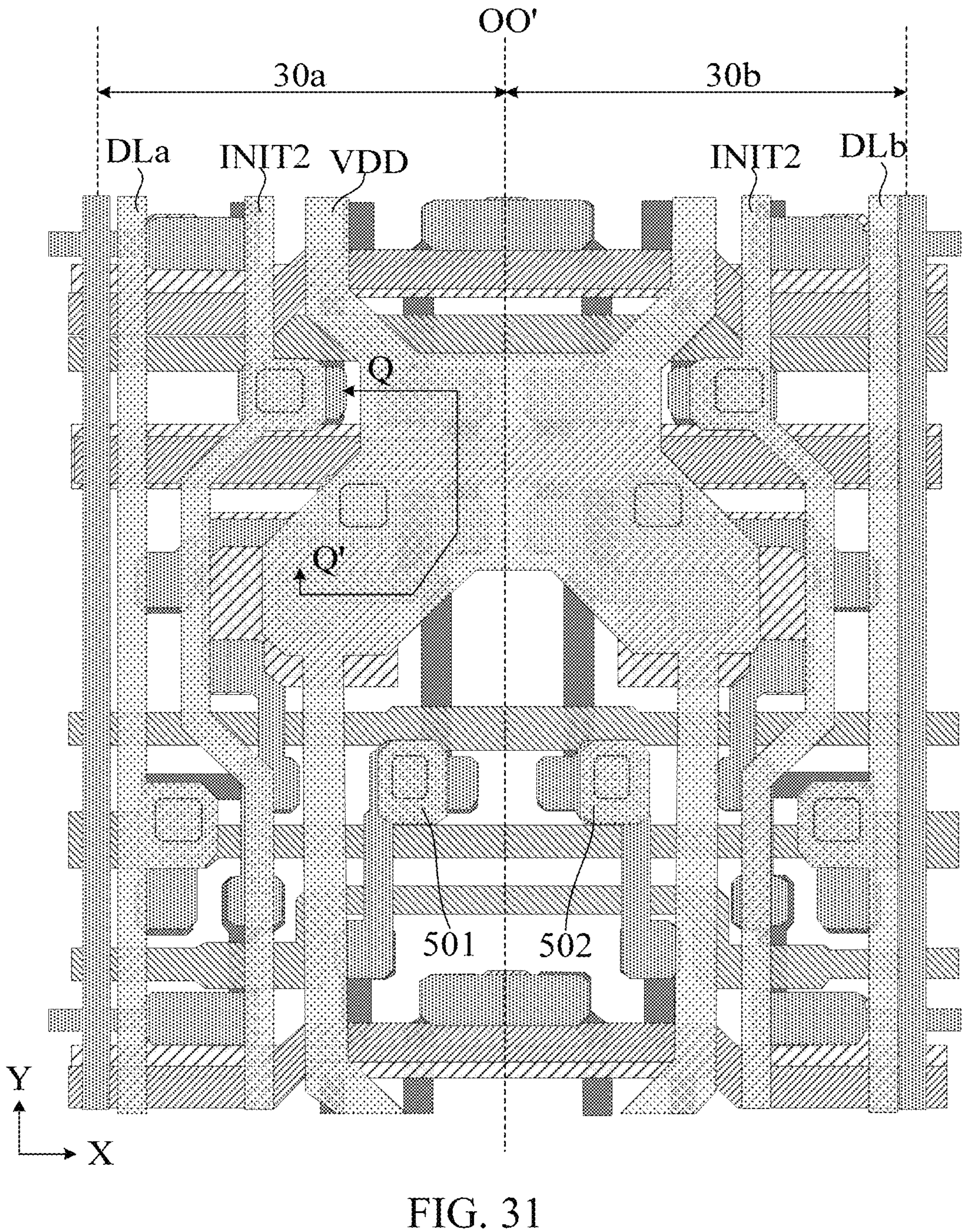
FIG. 31 is a schematic diagram of a partial plan structure of a circuit structure layer of a display substrate according to at least one embodiment of the present disclosure.
Figure 32:
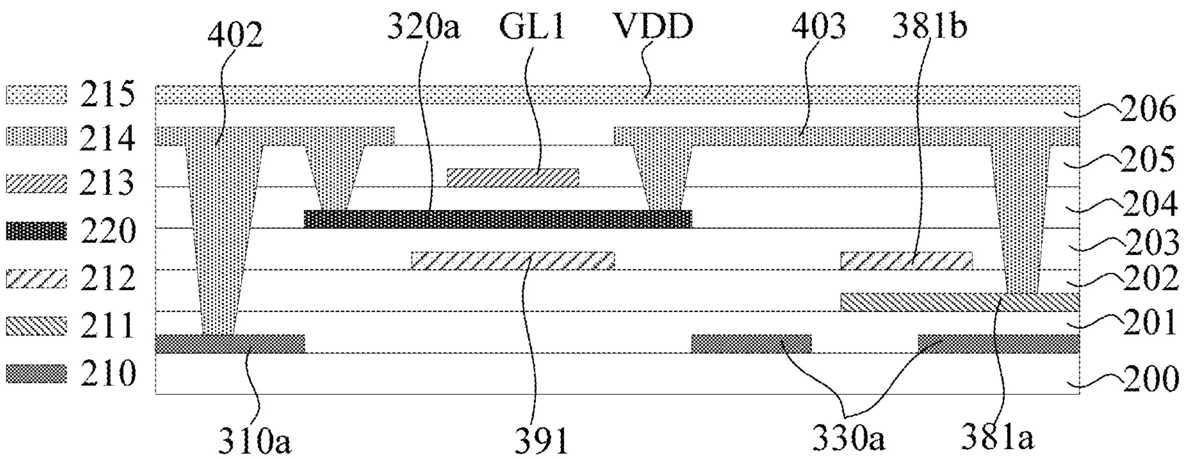
FIG. 32 is a schematic partial cross-section view along a Q-Q' direction in FIG. 31.

FIG. 31 is a schematic diagram of a partial plan structure of a circuit structure layer of a display substrate according to at least one embodiment of the present disclosure. FIG. 31 illustrates a pixel circuit group (including two pixel circuits 30*a* and 30*b*) of a circuit structure layer of a display substrate as an example. FIG. 32 is a schematic partial cross-section view along a Q-Q' direction in FIG. 31.

In some examples, as shown in FIG. 31, in a plane parallel to the display substrate, two pixel circuits 30*a* and 30*b* of one pixel circuit group may be sequentially arranged along a first direction X and symmetrically arranged with respect to a centerline OO' of the pixel circuit group along the first direction X. The pixel circuit 30*a* may be electrically connected to a data line DLa and a first power supply line VDD, and the pixel circuit 30*b* may be electrically connected to a data line DLb and the first power supply line VDD. The data lines DLa, DLb and the first power supply line VDD may be disposed on a same layer, and the first power supply line VDD may be located between the data lines DLa and DLb. The first power supply line VDD may be symmetrical with respect to the center line OO', and the data lines DLa and DLb may be symmetrical with respect to the center line OO'. In this example, adopting a pixel circuit with symmetrical arrangement is beneficial to reducing occupied space of pixel circuits, thereby realizing a high-resolution display substrate.

In some examples, as shown in FIG. 32, in a direction perpendicular to the display substrate, the circuit structure layer may include: a first semiconductor layer 210, a first conductive layer 211, a second conductive layer 212, a second semiconductor layer 220, a third conductive layer 213, a fourth conductive layer 214, and a fifth conductive layer 215 that are sequentially disposed on the base substrate 200. In some examples, the first conductive layer 211 may also be referred to as a first gate metal layer, the second conductive layer 212 may also be referred to as a second gate metal layer, the third conductive layer 213 may also be referred to as a third gate metal layer, the fourth conductive layer 214 may also be referred to as a first source-drain metal layer, and the fifth conductive layer 215 may also be referred to as a second source-drain metal layer. In some examples, a light emitting structure layer and an encapsulation structure layer may be sequentially disposed at a side of the circuit structure layer away from the base substrate 200.

In some examples, as shown in FIG. 32, the circuit structure layer may further at least include a first insulation layer 201 to a sixth insulation layer 206. The first insulation layer 201 may be located between the first semiconductor layer 210 and the first conductive layer 211, the second insulation layer 202 may be located between the first conductive layer 211 and the second conductive layer 212, the third insulation layer 203 may be located between the second conductive layer 212 and the second semiconductor layer 220, the fourth insulation layer 204 may be located between the second semiconductor layer 220 and the third conductive layer 213, the fifth insulation layer 205 may be located between the third conductive layer 213 and the fourth conductive layer 214, and the sixth insulation layer 206 may be located between the fourth conductive layer 214 and the fifth conductive layer 215. In some examples, the first insulation layer 201 to the fifth insulation layer 205 may be inorganic insulation layers, and the sixth insulation layer 206 may be an organic insulation layer. However, this embodiment is not limited thereto.

Figure 33:
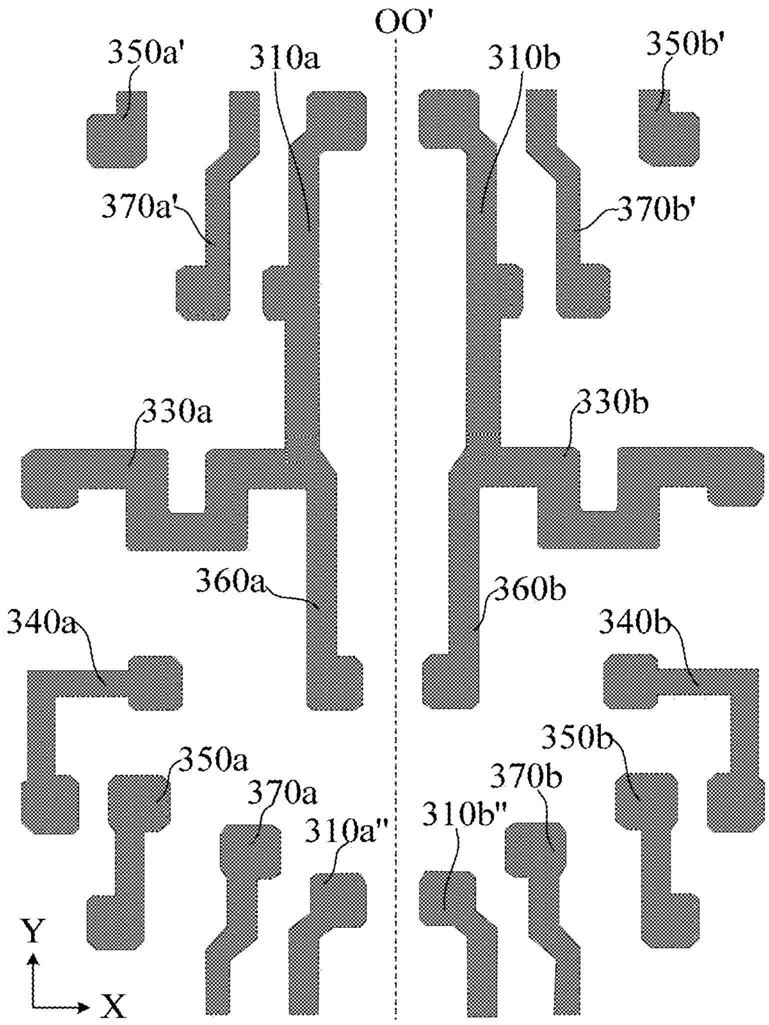
FIG. 33 is a schematic partial view of a display substrate after a first semiconductor layer is formed in FIG. 31.
Figure 34:
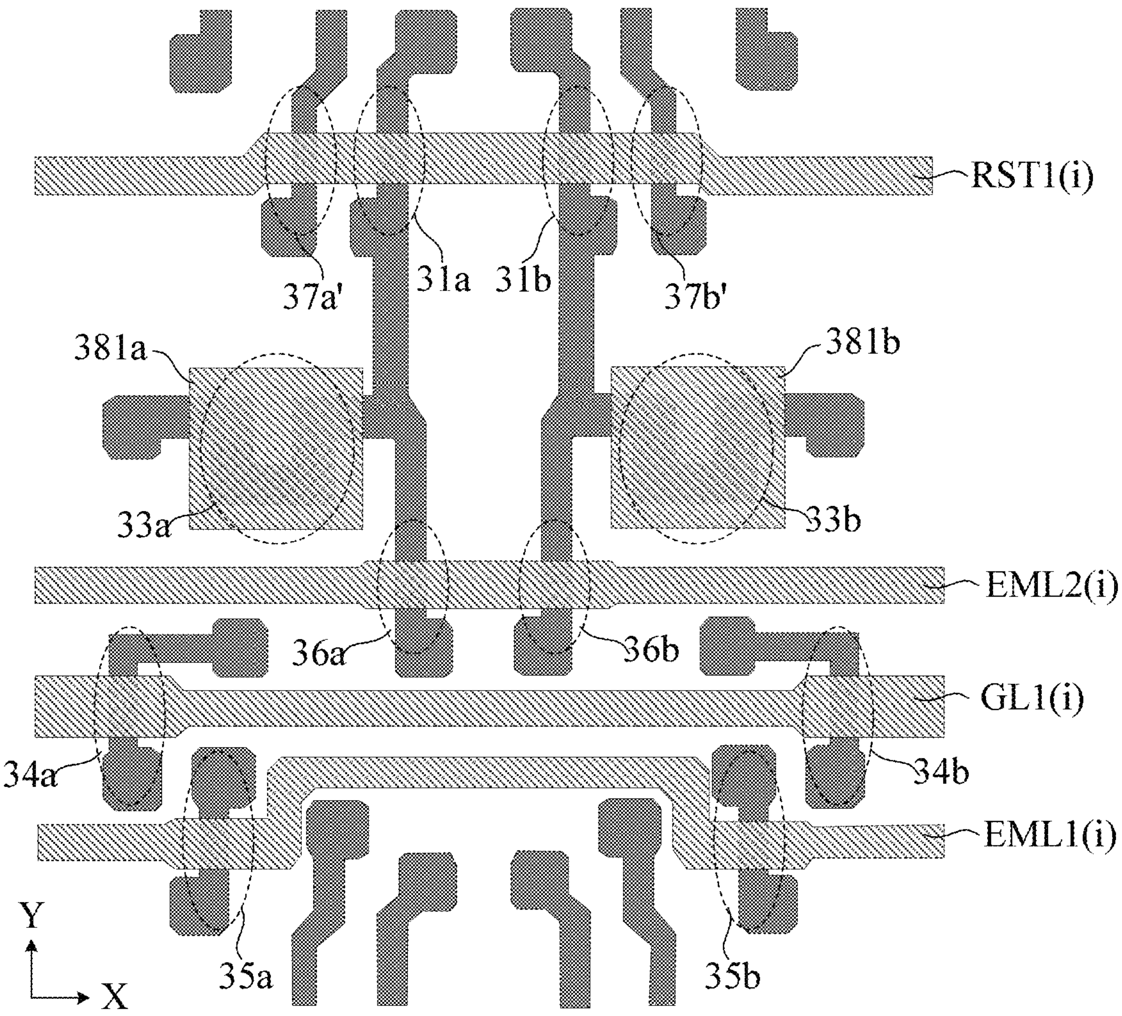
FIG. 34 is a schematic partial view of a display substrate after a first conductive layer is formed in FIG. 31.
Figure 35:
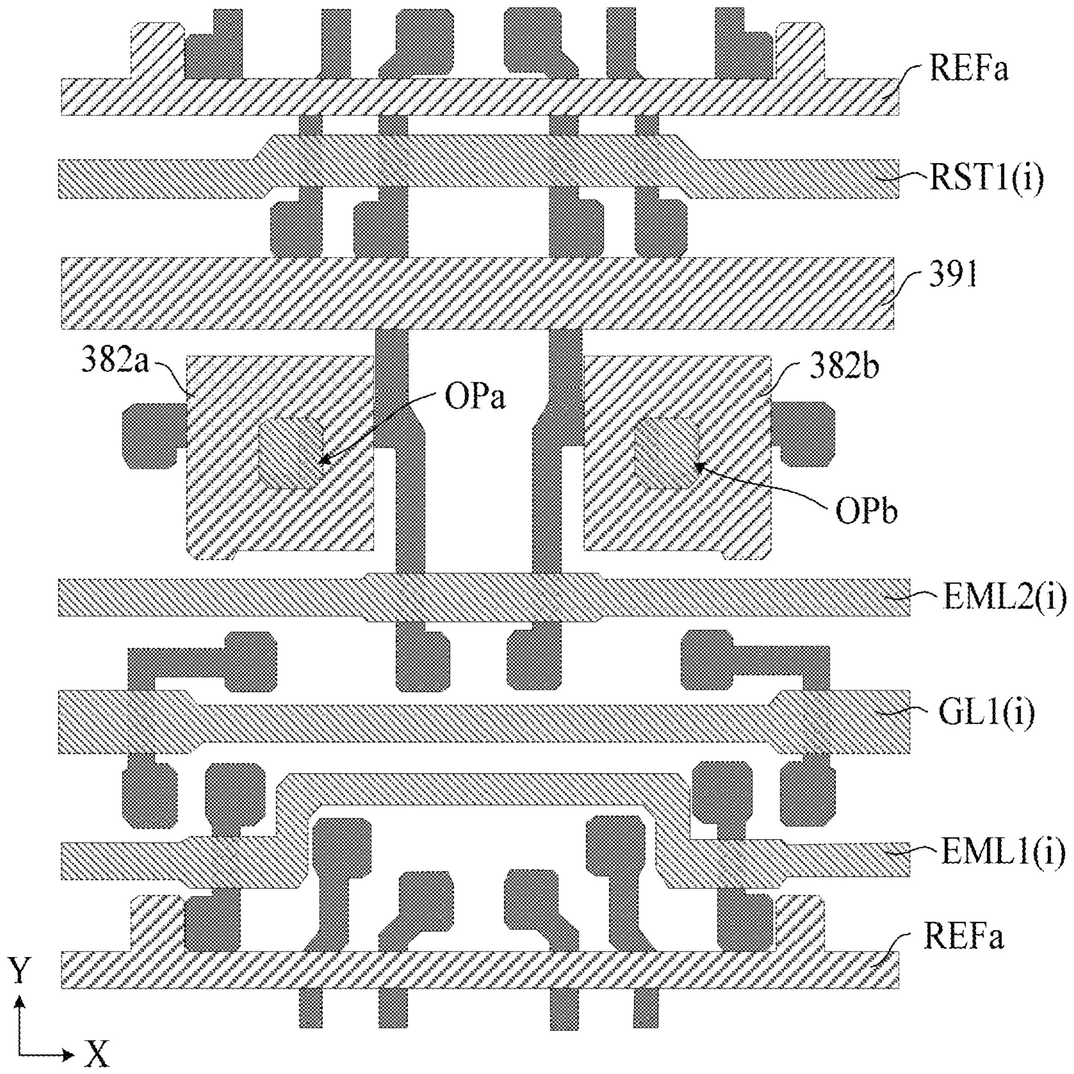
FIG. 35 is a schematic partial view of a display substrate after a second conductive layer is formed in FIG. 31.
Figure 36:
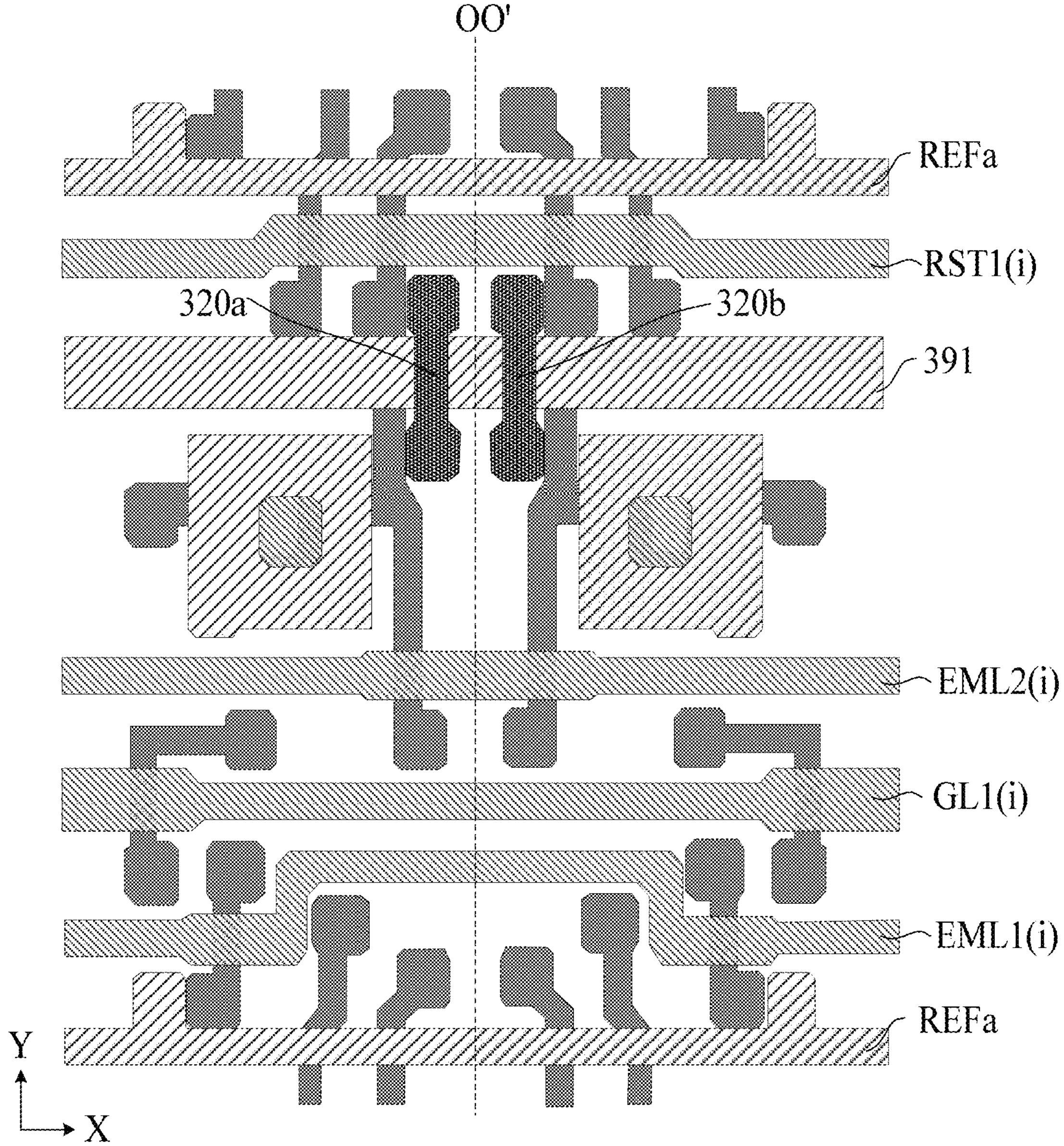
FIG. 36 is a schematic partial view of a display substrate after a second semiconductor layer is formed in FIG. 31.
Figure 37:
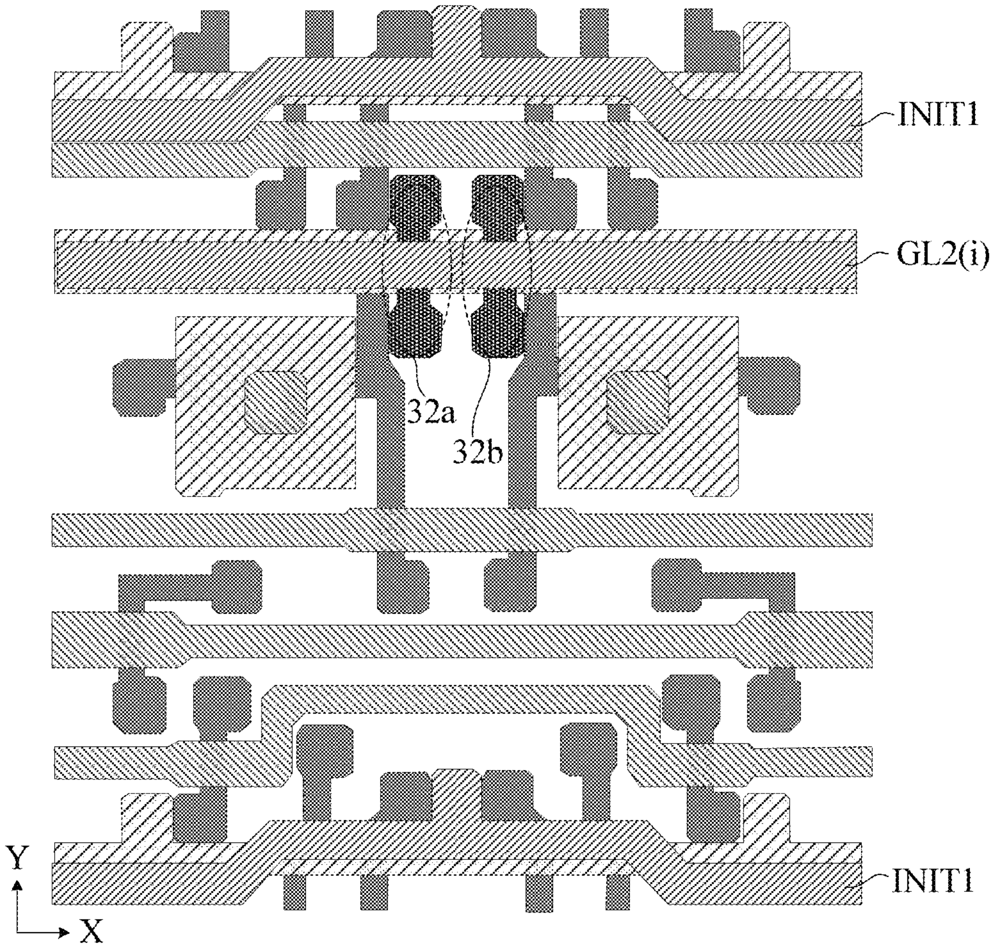
FIG. 37 is a schematic partial view of a display substrate after a third conductive layer is formed in FIG. 31.
Figure 38:
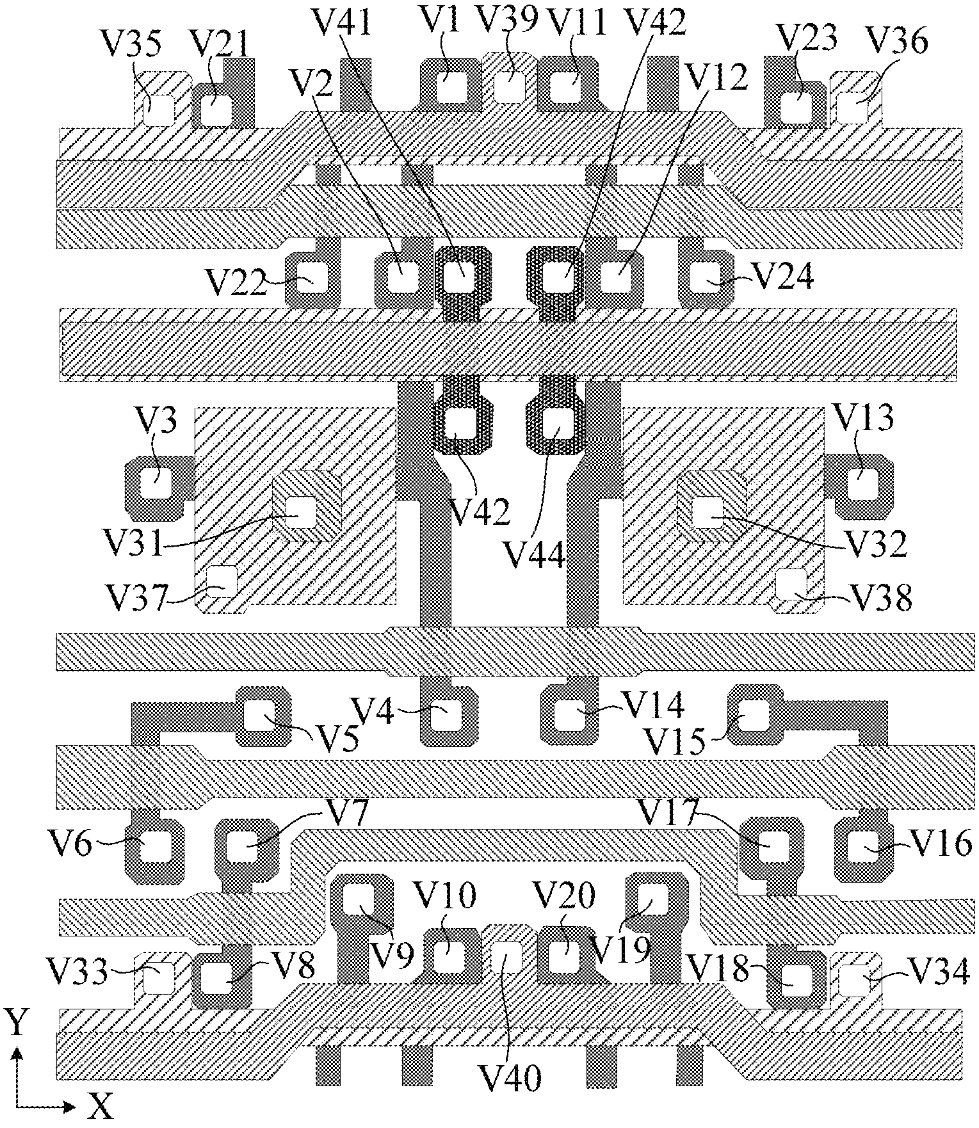
FIG. 38 is a schematic partial view of a display substrate after a fifth insulation layer is formed in FIG. 31.
Figure 39:
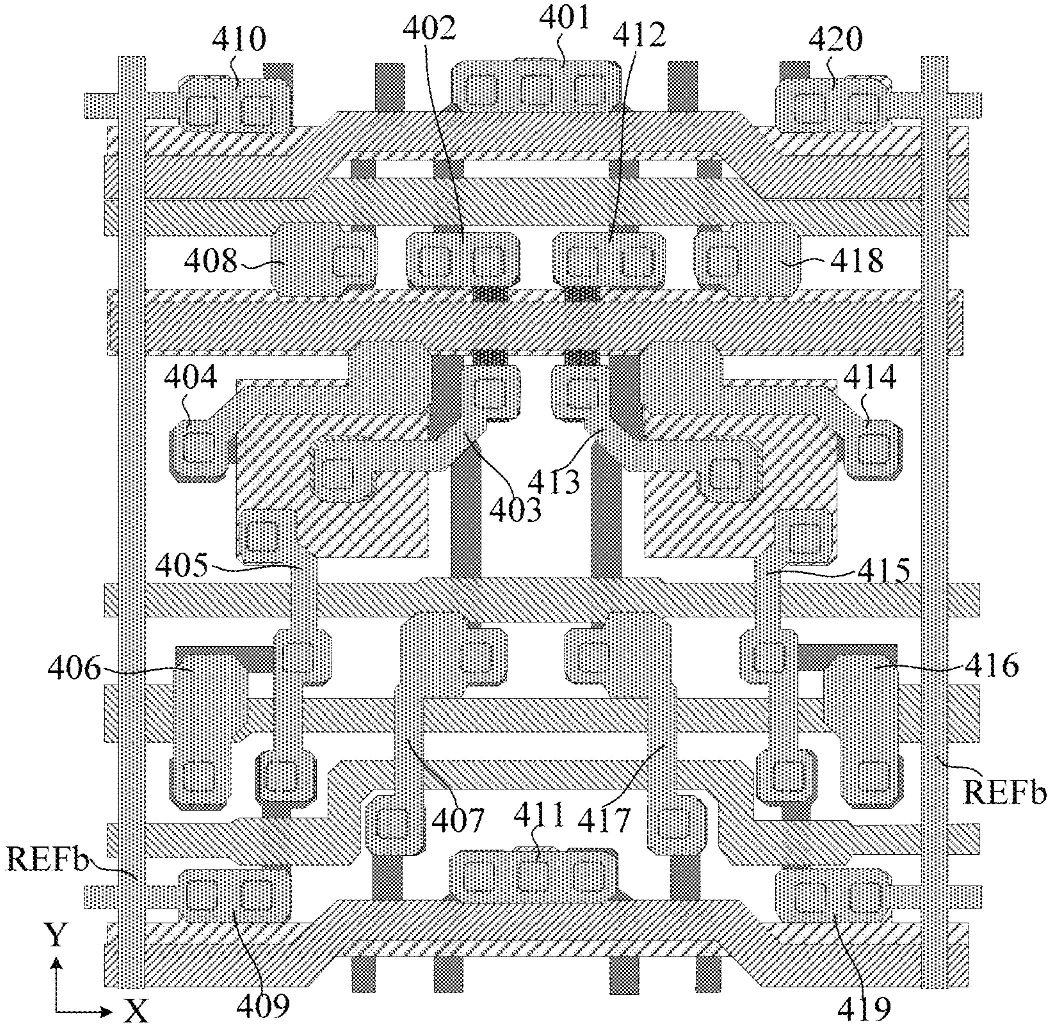
FIG. 39 is a schematic partial view of a display substrate after a fourth conductive layer is formed in FIG. 31.
Figure 40:
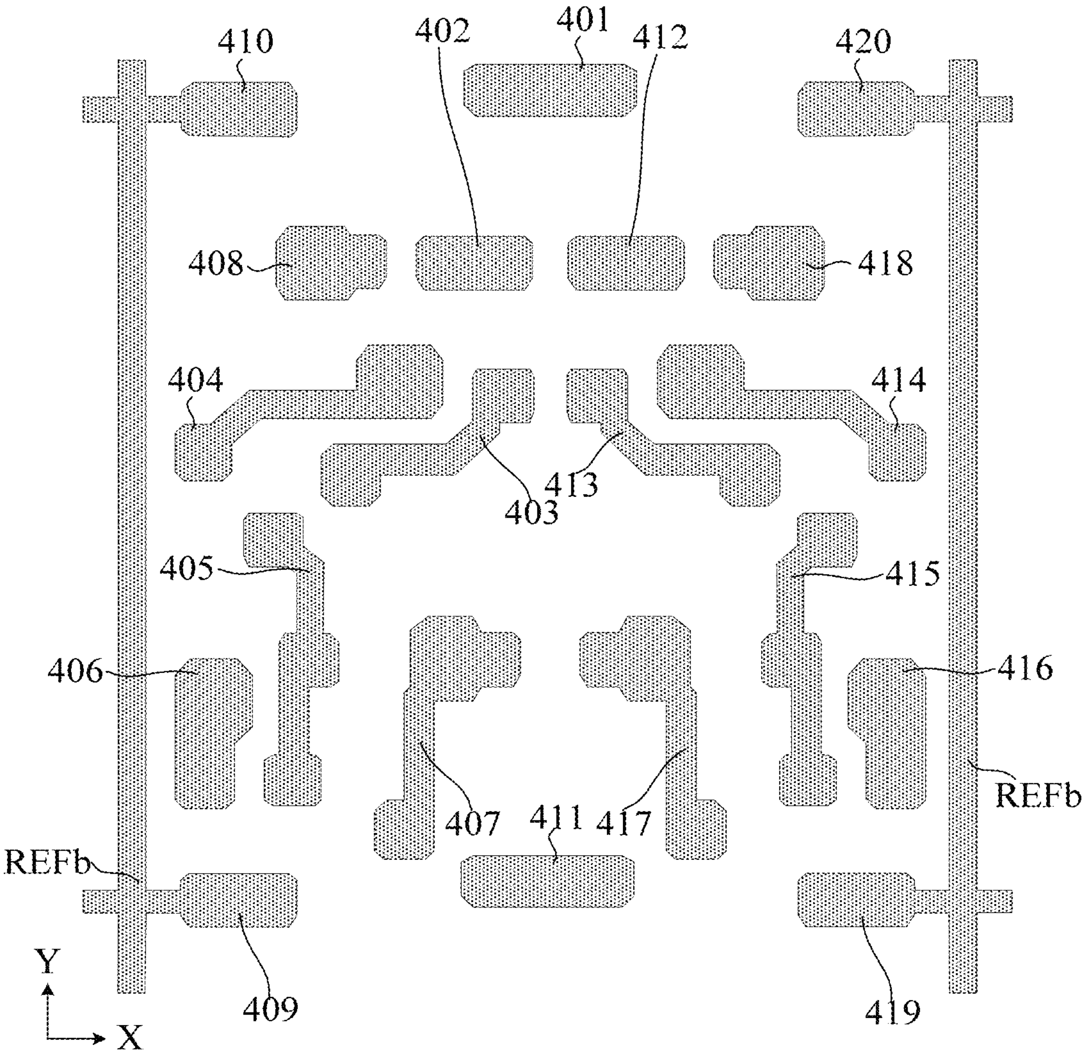
FIG. 40 is a schematic plan view of a fourth conductive layer in FIG. 39.
Figure 41:
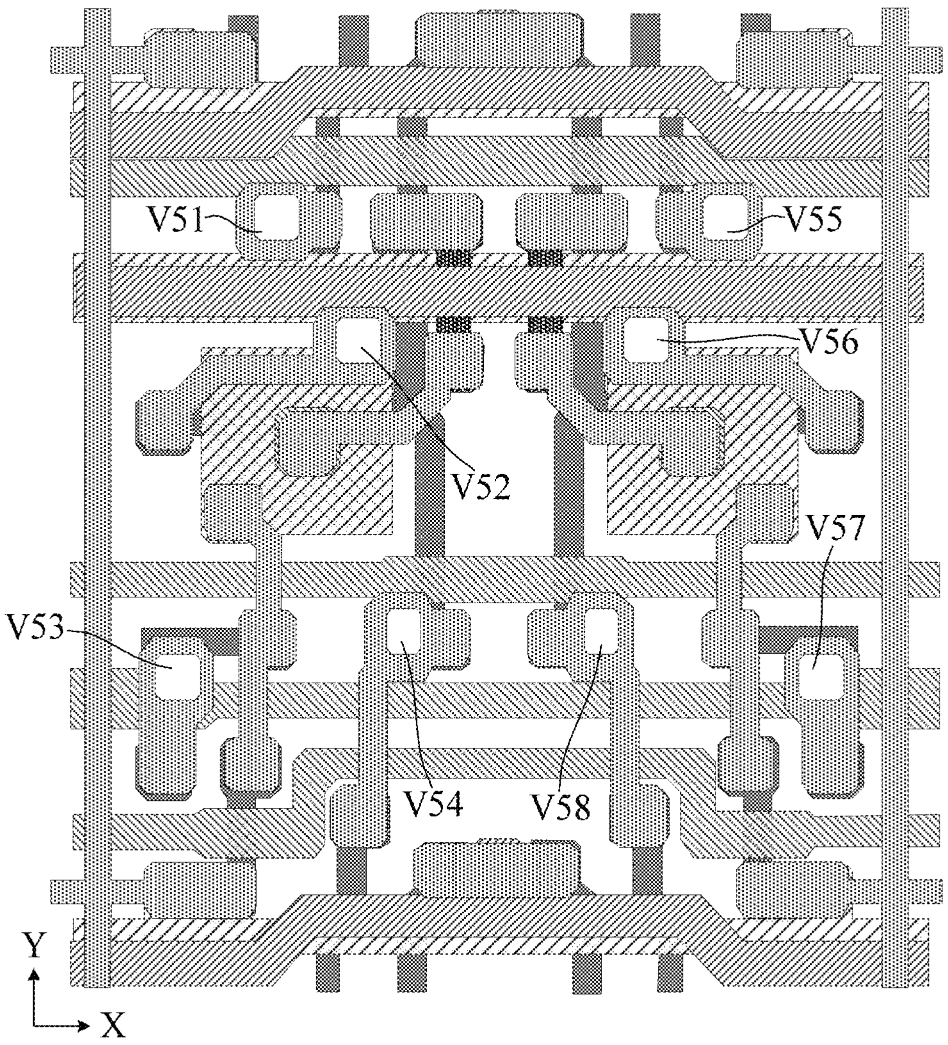
FIG. 41 is a schematic partial view of a display substrate after a sixth insulation layer is formed in FIG. 31.
Figure 42:
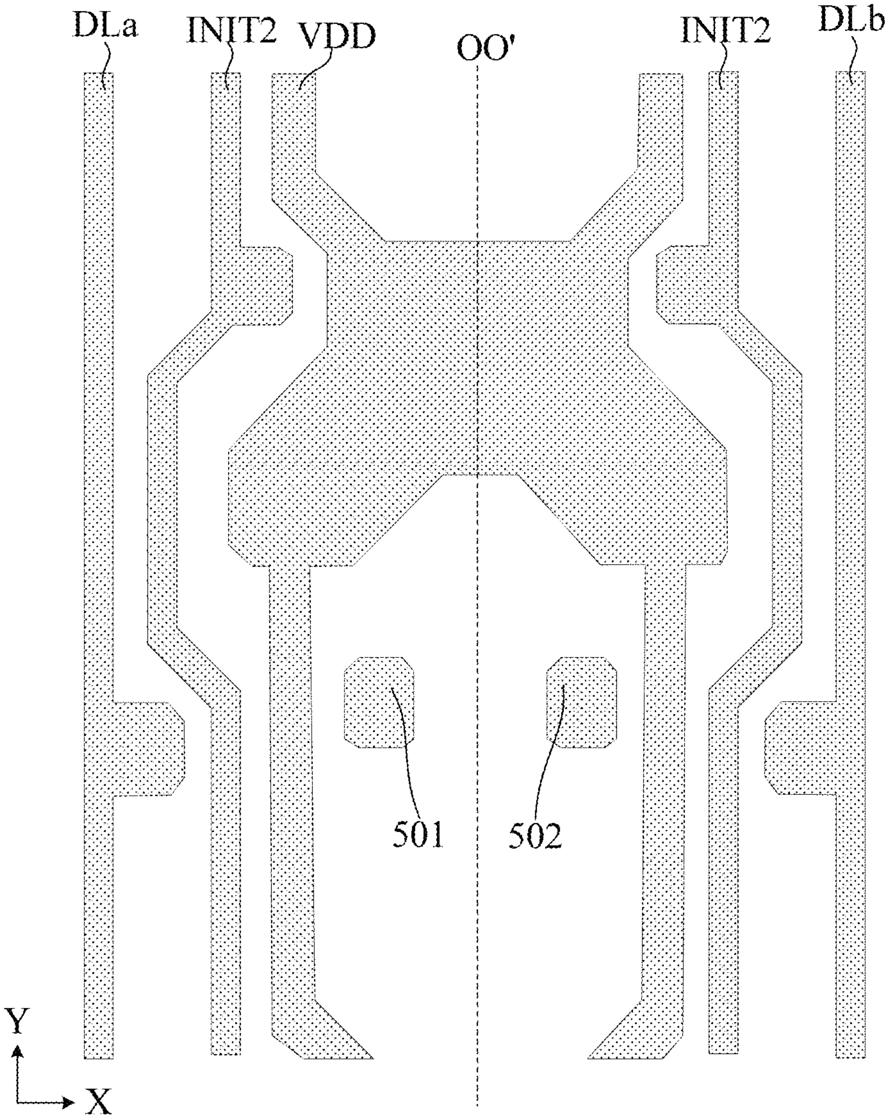
FIG. 42 is a schematic plan view of a fifth conductive layer in FIG. 31.

An exemplary description will be given for a structure and a manufacturing process of the display substrate below with reference to FIGS. 31 to 42. FIG. 33 is a schematic partial view of a display substrate after a first semiconductor layer is formed in FIG. 31. FIG. 34 is a schematic partial view of a display substrate after a first conductive layer is formed in FIG. 31. FIG. 35 is a schematic partial view of a display substrate after a second conductive layer is formed in FIG. 31. FIG. 36 is a schematic partial view of a display substrate after a second semiconductor layer is formed in FIG. 31. FIG. 37 is a schematic partial view of a display substrate after a third conductive layer is formed in FIG. 31. FIG. 38 is a schematic partial view of a display substrate after a fifth insulation layer is formed in FIG. 31. FIG. 39 is a schematic partial view of a display substrate after a fourth conductive layer is formed in FIG. 31. FIG. 40 is a schematic plan view of the fourth conductive layer in FIG. 39. FIG. 41 is a schematic partial view of a display substrate after a sixth insulation layer is formed in FIG. 31. FIG. 42 is a schematic plan view of a fifth conductive layer in FIG. 31.

A "patterning process" mentioned in the embodiments of the present disclosure includes a treatment such as photoresist coating, mask exposure, development, etching, and photoresist stripping for a metal material, an inorganic material, or a transparent conductive material, and includes a treatment such as organic material coating, mask exposure, and development for an organic material. Deposition may be any one or more of sputtering, evaporation and chemical vapor deposition, the coating may be any one or more of spray coating, spin coating and inkjet printing, and the etching may be any one or more of dry etching and wet etching, the present disclosure is not limited thereto. A "thin film" refers to a layer of thin film made of a material on a base substrate by using deposition, coating, or other processes. If the "thin film" does not need to be processed through a patterning process in the entire manufacturing process, the "thin film" may also be called a "layer". If the "thin film" needs to be processed through the patterning process in the entire manufacturing process, the "thin film" is called a "thin film" before the patterning process is performed and is called a "layer" after the patterning process is performed. At least one "pattern" is contained in the "layer" which has been processed through the patterning process.

In some exemplary implementations, the manufacturing process of the display substrate may include following operations. An equivalent circuit of the pixel circuit of the circuit structure layer may be as shown in FIG. 23. The pixel circuit may include at least one first type transistor and at least one second type transistor. The transistor types of the first type transistor and the second type transistor may be different. For example, the first-type transistor may include a Low Temperature Poly-Silicon thin film transistor, and the second-type transistor may include an oxide thin film transistor. In this example, the compensation transistor T2 of the pixel circuit may be an oxide thin film transistor, and the rest of the transistors may be low temperature poly-silicon thin film transistors.

(1) Providing a base substrate. In some examples, the base substrate 200 may be a rigid substrate, or may be a flexible substrate. For example, the rigid substrate may include, but not limited to, one or more of glass and quartz, and the flexible substrate may be made of, but not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In some exemplary embodiments, the flexible substrate may include a first flexible material layer, a first inorganic material layer, a semiconductor layer, a second flexible material layer and a second inorganic material layer which are stacked, wherein materials of the first flexible material layer and the second flexible material layer may be polyimide (PI), polyethylene terephthalate (PET) or a surface-treated polymer soft film, or the like. Materials of the first inorganic material layer and the second inorganic material layer may be silicon nitride ($SiN_x$) or silicon oxide ($SiO_x$), etc., for improving water-resistance and oxygen-resistance of the base substrate, and a material of the semiconductor layer may be amorphous silicon (a-si). This embodiment is not limited thereto.

(2) Forming a first semiconductor layer. In some examples, a first semiconductor thin film is deposited on the base substrate, and the first semiconductor thin film is patterned through a patterning process to form the first semiconductor layer disposed on the base substrate. In some examples, a material of the first semiconductor layer may be amorphous silicon (a-Si), polycrystalline silicon (p-Si), hexathiophene or polythiophene, or other materials.

In some examples, as shown in FIG. 33, the first semiconductor layer may at least include: active layers of multiple first type transistors of a pixel circuit 30*a* in current row (e.g. including an active layer 310*a* of a first reset transistor, an active layer 330*a* of a driving transistor, an active layer 350*a* of a first control transistor, an active layer 360*a* of a second control transistor, an active layer 340*a* of a data writing transistor, an active layer 370*a* of a second reset transistor), active layers of multiple transistors of a pixel circuit 30*b* in current row (e.g. including an active layer 310*b* of the first reset transistor, an active layer 330*b* of the driving transistor, active layer 350*b* of the first control transistor, an active layer 360*b* of the second control transistor, an active layer 340*b* of the data writing transistor, an active layer 370*b* of the second reset transistor), active layers of multiple first type transistors of a pixel circuit 30*a* in previous row (e.g. including an active layer 370*a*' of the second reset transistor, an active layer 350*a*' of the first control transistor, active layers of multiple first type transistors of the pixel circuit 30*b* in a previous row (e.g. including an active layer 370*b*' of the second reset transistor, an active layer 350*b*' of the first control transistor), active layers of multiple first type transistors of the pixel circuit 30*a* in a next row (e.g. including an active layer 310*a*" of the first reset transistor), active layers of multiple first type transistors of the pixel circuit 30*b* in the next row (e.g. including an active layer 310*b*" of the first reset transistor). In some examples, the active layer of each first type transistor of the pixel circuit may include: at least one channel region and a first region and a second region located on opposite sides of the channel region.

In some examples, as shown in FIG. 33, the active layer 310*a* of the first reset transistor of the pixel circuit 30*a* in a current row may be adjacent to the active layer 370*a*' of the second reset transistor of the pixel circuit 30*a* in the previous row in the first direction X, and the active layer 370*a* of the second reset transistor of the pixel circuit 30*a* in the current row may be adjacent to the active layer 310*a*" of the first reset transistor of the pixel circuit 30*a* in the next row in the first direction X. The active layer 310*a* of the first reset transistor the active layer 330*a* of the driving transistor and the active layer 360*a* of the second control transistor of the pixel circuit 30*a* may be an integral structure. For example, the active layer 310*a* of the first reset transistor may be substantially I-shaped, the active layer 330*a* of the driving transistor may be substantially U-shaped, and the active layer 360*a* of the second control transistor may be substantially I-shaped. The active layer 340*a* of the data writing transistor, the active layer 350*a* of the first control transistor, and the active layer 370*a* of the second reset transistor may be located at a side of the active layer 330*a* of the driving transistor away from the active layer 310*a* of the first reset transistor in a second direction Y. The active layer 340*a* of the data writing transistor may be located at a side of the active layer 350*a* of the first control transistor away from the active layer 370*a* of the second reset transistor in the first direction X. The active layer 340*a* of the data writing transistor may be substantially in an inverted L-shape. The active layer 350*a* of the first control transistor may be substantially I-shaped. The active layer 370*a* of the second reset transistor may be substantially I-shaped. However, this embodiment is not limited thereto. Structures of the active layers of the first type transistors of the pixel circuit 30*b* and the structures of the active layers of the first type transistors of the pixel circuit 30*a* may be approximately symmetrical with respect to a centerline OO', so the structures of the active layers of the pixel circuit 30*b* will not be repeated here.

(3) Forming a first conductive layer. In some examples, a first insulation thin film and a first conductive thin film are deposited sequentially on the base substrate on which the aforementioned structures are formed, and the first conductive thin film is patterned through a patterning process to form a first insulation layer and a first conductive layer disposed on the first insulation layer.

In some examples, after the first conductive layer is formed, the first conductive layer may be used as a shield to perform a conductive treatment on the first semiconductor layer. A region of the first semiconductor layer, which is shielded by the first conductive layer, forms channel regions of the multiple transistors, and a region of the first semiconductor layer, which is not shielded by the first conductive layer, is made to be conductive, that is, all of the first regions and the second regions of the active layers of the first type transistors are made to be conductive.

In some examples, as shown in FIG. 34, the first conductive layer may at least include: a first reset control line RST1 (*i*), a first scan line GL1 (*i*), a first control line EML1 (*i*), a second control line EML2 (*i*), a first plate 381*a* of a storage capacitor and gates of multiple first type transistors of the pixel circuit 30*a* (e.g. including a gate of a first reset transistor 31*a*, a gate of a driving transistor 33*a*, a gate of a first control transistor 35*a*, a gate of a second control transistor 36*a*, a gate of a data writing transistor 34*a* of the pixel circuit 30*a* in the current row, and a gate of a second reset transistor 37*a*' of the pixel circuit 30*a* in the previous row), a first plate 381*b* of a storage capacitor and gates of multiple first type transistors of the pixel circuit 30*b* (e.g. including a gate of a first reset transistor 31*b*, a gate of a driving transistor 33*b*, a gate of a first control transistor 35*b*, a gate of a second control transistor 36*b*, a gate of a data writing transistor 34*b* of the pixel circuit 30*b* in the current row, and a gate of a second reset transistor 37*b*' of the pixel circuit 30*b* in the previous row).

In some examples, as shown in FIG. 34, the first reset control line RST1 (*i*), the first scan line GL1 (*i*), the first control line EML1 (*i*), and the second control line EML2 (*i*) may all extend along the first direction X. The first scan line GL1 (*i*) may be located between the first control line EML1 (*i*) and the second control line EML2 (*i*) in the second direction Y, and the first reset control line RST1 (*i*) may be located at a side of the gate of the driving transistor away from the second control line EML2 (*i*) in the second direction Y.

In some examples, as shown in FIG. 34, the first plate 381*a* of the storage capacitor of the pixel circuit 30*a* and the gate of the driving transistor 33*a* may be in an integral structure. The gate of the first reset transistor 31*a* of the pixel circuit 30*a* in the current row, the gate of the second reset transistor 37*a*' of the pixel circuit 30*a* in the previous row, the gate of the first reset transistor 31*b* of the pixel circuit 30*b* in the current row and the gate of the second reset transistor 37*b*' of the pixel circuit 30*b* in the previous row, and the first reset control line RST1 (*i*) may be in an integral structure. The gate of the second control transistor 36*a* of the pixel circuit 30*a* in the current row, the gate of the second control transistor 36*b* of the pixel circuit 30*b* in the current row, and the second control line EML2 (*i*) may be in an integral structure. The gate of the data writing transistor 34*a* of the pixel circuit 30*a* in the current row, the gate of the data writing transistor 34*b* of the pixel circuit 30*b* in the current row, and the first scan line GL1 (*i*) may be in an integral structure. The gate of the first control transistor 35*a* of the pixel circuit 30*a* in the current row, the gate of the first control transistor 35*b* of the pixel circuit 30*b* in the current row, and the first control line EML1 (*i*) may be in an integral structure.

(4) Forming a second conductive layer. In some examples, a second insulation thin film and a second conductive thin film are deposited sequentially on the base substrate on which the aforementioned structures are formed, and the second conductive thin film is patterned through a patterning process to form a second insulation layer and a second conductive layer disposed on the second insulation layer.

In some examples, as shown in FIG. 35, the second conductive layer may at least include a second plate 382*a* of the storage capacitor of the pixel circuit 30*a*, a second plate 382*b* of the storage capacitor of the pixel circuit 30*b*, a first reference trace REFa and a scan auxiliary line 391. The scan auxiliary line 391 may extend along the first direction X, and an orthographic projection of the scan auxiliary line 391 on the base substrate may be located at a side of an orthographic projection of the first reset control line RST1 (*i*) on the base substrate close to the gate of the driving transistor. The orthographic projection of the scan auxiliary line 391 and an orthographic projection of the first scan line GL1 (*i*) on the base substrate may be located on opposite sides of the gate of the driving transistor in the second direction Y. The first reference trace REFa may extend substantially along the first direction X, and an orthographic projection of the first reference trace REFa on the base substrate may be located at a side of the orthographic projection of the first reset control line RST1 (*i*) on the base substrate away from the scan auxiliary line 391.

In some examples, as shown in FIGS. 34 and 35, orthographic projections of the first plate 381*a* and the second plate 382*a* of the storage capacitor of the pixel circuit 30*a* on the base substrate may be overlapped. The second plate 382*a* may have a hollow area OPa, and an orthographic projection of the hollow area OPa on the base substrate may be within a range of the orthographic projection of the first plate 381*a* on the base substrate. Orthographic projections of the first plate 381*b* and the second plate 382*b* of the storage capacitor of the pixel circuit 30*b* on the base substrate may be overlapped. The second plate 382*b* may have a hollow area OPb, an orthographic projection of the hollow area OPb on the base substrate may be within a range of the orthographic projection of the first plate 381*b* on the base substrate.

(5) Forming a second semiconductor layer. In some examples, a third insulation thin film and a second semiconductor thin film are sequentially deposited on the base substrate on which the aforementioned structures are formed, and the second semiconductor thin film is patterned through a patterning process to form a third insulation layer and a second semiconductor layer disposed on the third insulation layer. In some examples, a material of the second semiconductor layer may include indium gallium zinc oxide (IGZO).

In some examples, as shown in FIG. 36, the second semiconductor layer may at least include an active layer of a second type transistor of the pixel circuit 30*a* (e.g. including an active layer 320*a* of the compensation transistor), an active layer of a second type transistor of the pixel circuit 30*b* (e.g. including an active layer 320*b* of the compensation transistor). In the pixel circuit 30*a*, the active layer 320*a* of the compensation transistor may be located at a side of the active layer of the first reset transistor 31*a* close to the centerline OO' in the first direction X, and the active layer 320*b* of the compensation transistor of the pixel circuit 30*b* may be located at a side of the active layer of the first reset transistor 31*b* close to the centerline OO' in the first direction X. An orthographic projection of the active layer 320*a* of the compensation transistor on the base substrate may be not overlapped with an orthographic projection of the active layer 310*a* of the first reset transistor on the base substrate, and an orthographic projection of the active layer 320*b* of the compensation transistor on the base substrate may be not overlapped with an orthographic projection of the active layer 310*b* of the first reset transistor on the base substrate. The orthographic projections of the active layers 320*a* and 320*b* of the compensation transistor of the pixel circuit on the base substrate may be approximately I-shaped.

In some examples, as shown in FIG. 36, the orthographic projection of the scan auxiliary line 391 on the base substrate may be overlapped with the orthographic projections of the active layer 320*a* of the compensation transistor and the active layer 320*b* of the compensation transistor on the base substrate. The scan auxiliary line 391 may be used as a bottom gate of the compensation transistor and may also shield the channel region of the compensation transistor to avoid affecting performance of the compensation transistor.

(6) Forming a third conductive layer. In some examples, a fourth insulation thin film and a third conductive thin film are sequentially deposited on the base on which the aforementioned patterns are formed, and the third conductive thin film is patterned through a patterning process to form a fourth insulation layer and a third conductive layer disposed on the fourth insulation layer.

In some examples, as shown in FIG. 37, the third conductive layer may at least include a gate of a second type transistor of the pixel circuit 30*a* (e.g. including a gate of a compensation transistor 32*a*), a gate of a second type transistor of the pixel circuit 30*b* (e.g. including a gate of the compensation transistor 32*b*), a second scan line GL2 (*i*), and a first initial signal line INIT1. The first initial signal line INIT1 may extend at least along the first direction X. The second scan line GL2 (*i*) may extend along the first direction X, and an orthographic projection of the second scan line GL2 (*i*) on the base substrate and an orthographic projection of the scan auxiliary line 391 on the base substrate may be overlapped. For example, the orthographic projection of the second scan line GL2 (*i*) on the base substrate may be within a range of the orthographic projection of the scan auxiliary line 391 on the base substrate. A gate of the compensation transistor 32*a* of the pixel circuit 30*a* in the current row, a gate of the compensation transistor 32*b* of the pixel circuit 30*b* in the current row, and the second scan line GL2 (*i*) may be in an integral structure. For example, the second scan line GL2 (*i*) and the scan auxiliary line 391 may be configured to transmit a second scan signal. The second scan line GL2 (*i*) and the scan auxiliary line 391 may be electrically connected in a peripheral area. However, this embodiment is not limited thereto.

(7) Forming a fifth insulation layer. In some examples, a fifth insulation thin film is deposited on the base on which the aforementioned patterns are formed, and the fifth insulation thin film is patterned through a patterning process to form a fifth insulation layer.

In some examples, as shown in FIG. 38, the fifth insulation layer may be provided with multiple, such as a first type of vias exposing a surface of the first semiconductor layer (e.g. including a first via V1 to a twenty-fourth via V24), a second type of vias exposing a surface of the first conductive layer (e.g. including a thirty-first via V31 and a thirty-second via V32), a third type of vias exposing a surface of the second conductive layer (e.g. including a thirty-third via V33 to a thirty-eighth via V38), a fourth type of vias exposing a surface of the second semiconductor layer (e.g. including a forty-first via V41 to a forty-fourth via V44), and a fifth type of vias exposing a surface of the third conductive layer (e.g. including a thirty-ninth via V39 to a fortieth via V40). For example, the fourth type of vias and the fifth type of vias may be formed by a same patterning process and the first type of vias, the second type of vias, and the third type of vias may be formed by a same patterning process. This embodiment is not limited thereto.

(8) Forming a fourth conductive layer. In some examples, a fourth conductive thin film is deposited on the base substrate on which the aforementioned patterns are formed, and the fourth insulation thin film is patterned through a patterning process to form the fourth conductive layer on the fifth insulation layer.

In some examples, as shown in FIGS. 39 and 40, the fourth conductive layer may at least include multiple connection electrodes (including, for example, a first connection electrode 401 to a twentieth connection electrode 420), and a second reference trace REFb. The second reference trace REFb may extend along the second direction Y.

In some examples, the first connection electrode 401 may be electrically connected to a first region of the active layer 310*a* of the first reset transistor 31*a* of the pixel circuit 30*a* through the first via V1, may also be electrically connected to a first region of the active layer 310*b* of the first reset transistor 31*b* of the pixel circuit 30*b* through the eleventh via V11, and may also be electrically connected to the first initial signal line INIT1 through the thirty-ninth via V39. The second connection electrode 402 may be electrically connected to a second region of the active layer 310*a* of the first reset transistor 31*a* of the pixel circuit 30*a* through the second via V2, and may also be electrically connected to a second region of the active layer 320*a* of the compensation transistor 32*a* through the forty-first via V41. The third connection electrode 403 may be electrically connected to a first region of the active layer 320*a* of the compensation transistor 32*a* of the pixel circuit 30*a* through the forty-second via V42, and may also be electrically connected to the gate of the driving transistor 33*a* through the thirty-first via V31. The fourth connection electrode 404 may be electrically connected to a first region of the active layer 330*a* of the driving transistor 33*a* of the pixel circuit 30*a* through the third via V3. The fifth connection electrode 405 may be electrically connected to the second plate 382*a* of the storage capacitor of the pixel circuit 30*a* through the thirty-seventh via V37, may also be electrically connected to a second region of the active layer 340*a* of the data writing transistor 34*a* through the fifth via V5, and may also be electrically connected to a second region of the active layer 350*a* of the first control transistor 35*a* through the seventh via V7. The sixth connection electrode 406 may be electrically connected with a first region of the active layer 340*a* of the data writing transistor 34*a* of the pixel circuit 30*a* through the sixth via V6. The seventh connection electrode 407 may be electrically connected to a second region of the active layer 360*a* of the second control transistor 36*a* of the pixel circuit 30*a* through the fourth via V4, and may also be electrically connected to the active layer 370*a* of the second reset transistor 37*a* through the ninth via V9. The eighth connection electrode 408 may be electrically connected to the active layer 370*a* of the second reset transistor 37*a* of the pixel circuit 30*a* in the previous row through the twenty-second via V22. The ninth connection electrode 409 may be electrically connected to a first region of the active layer 350*a* of the first control transistor 35*a* of the pixel circuit 30*a* in the current row through the eighth via V8, and may also be electrically connected to a first reference line REFa through the thirty-third via V33. The tenth connection electrode 410 may be electrically connected to a first region of the active layer 350*a*' of the first control transistor of the pixel circuit 30*a* in the previous row through the twenty-first via V21, and may also be electrically connected to another first reference line REFa through the thirty-fifth via V35. The ninth connection electrode 409, the tenth connection electrode 410, and one of the second reference traces REFb may be in an integral structure. The eleventh connection electrode 411 may be electrically connected to the active layer 310*a*" of the first reset transistor of the pixel circuit 30*a* in the next row through the tenth via V10, may also be electrically connected to the active layer 310*b*" of the first reset transistor of the pixel circuit 30*b* in the next row through the twentieth via V20, and may also be electrically connected to the first initial signal line INIT through the fortieth via V40. The twelfth connection electrode 412 may be electrically connected to a second region of the active layer 310*b* of the first reset transistor 31*b* of the pixel circuit 30*b* through the twelfth via V12, and may also be electrically connected to a second region of the active layer 320*b* of the compensation transistor 32*b* through the forty-second via V42. The thirteenth connection electrode 413 may be electrically connected to a first region of the active layer 320*b* of the compensation transistor 32*b* of the pixel circuit 30*b* through the forty-fourth via V44, and may also be electrically connected to the gate of the driving transistor 33*b* through the thirty-second via V32. The fourteenth connection electrode 414 may be electrically connected to a first region of the active layer 330*b* of the driving transistor 33*b* of the pixel circuit 30*b* through the thirteenth via V13. The fifteenth connection electrode 415 may be electrically connected to the second plate 382*b* of the storage capacitor of the pixel circuit 30*b* through the thirty-eighth via V38, may also be electrically connected to a second region of the active layer 340*b* of the data writing transistor 34*b* through the fifteenth via V15, and may also be electrically connected to a second region of the active layer 350*b* of the first control transistor 35*b* through the seventeenth via V17. The sixteenth connection electrode 416 may be electrically connected with a first region of the active layer 340*b* of the data writing transistor 34*b* of the pixel circuit 30*b* through the sixteenth via V16. The seventeenth connection electrode 417 may be electrically connected to a second region of the active layer 360*b* of the second control transistor 36*b* of the pixel circuit 30*b* through the fourteenth via V14, and may also be electrically connected to the active layer 370*b* of the second reset transistor 37*b* through the nineteenth via V19. The eighteenth connection electrode 418 may be electrically connected to the active layer 370*b* of the second reset transistor 37*b* of the pixel circuit 30*b* in the previous row through the twenty-fourth via V24. The nineteenth connection electrode 419 may be electrically connected to a first region of the active layer 350*b* of the first control transistor 35*b* of the pixel circuit 30*b* in the current row through the eighteenth via V18, and may also be electrically connected to the first reference line REFa through the thirty-fourth via V34. The twentieth connection electrode 420 may be electrically connected to a first region of the active layer 350*b*' of the first control transistor of the pixel circuit 30*b* in the previous row through the twenty-third via V23, and may also be electrically connected to the other first reference trace REFa through the thirty-sixth via V36. The nineteenth connection electrode 419, the twentieth connection electrode 420 and one of the second reference traces REFb may be in an integral structure.

In this example, the first reference traces REFa and the second reference traces REFb are located in different film layers, and their extension directions cross each other, so that a mesh transmission structure can be formed, thereby achieving uniform transmission of the reference voltage signal.

(9) Forming a sixth insulation layer. In some examples, a sixth insulation thin film is coated on the base substrate on which the aforementioned patterns are formed, and the sixth insulation thin film is patterned through a patterning process to form a sixth insulation layer.

In some examples, as shown in FIG. 41, the sixth insulation layer may be provided with multiple vias, for example, which may include a fifty-first via V51 to a fifty-eighth via V58. The sixth insulation layer within the fifty-first via V51 to the fifty-eighth via V58 may be removed to expose at least a part of a surface of the fourth conductive layer.

(10) Forming a fifth conductive layer. In some examples, a fifth conductive thin film is deposited on the base on which the aforementioned patterns are formed, and the fifth conductive thin film is patterned through a patterning process to form a fifth conductive layer on the sixth insulation layer.

In some examples, as shown in FIGS. 31 and 42, the fifth conductive layer may include first power supply line sVDD, data lines DLa and DLb, second initial signal lines INIT2, a first anodic connection electrode 501 and a second anodic connection electrode 502. The first power supply lines VDD, the data lines DLa and DLb, and the second initial signal lines INIT2 may all extend along the second direction Y. In the first direction X, the first power supply lines VDD may be located between the data lines DLa and DLb, and each second initial signal line INIT2 may be located between a first power supply line VDD and a data line. The data lines DLa and DLb may be approximately symmetrical with respect to the centerline OO', the two second initial signal lines INIT2 may be approximately symmetrical with respect to the centerline OO', and the first power supply lines VDD may be approximately symmetrical with respect to the centerline OO'. In this example, the data lines are disposed in the fifth conductive layer, which can reduce a parasitic capacitance between the data signal and other trace signals.

In some examples, as shown in FIGS. 31, and 40 to 42, the data line DLa may be electrically connected with the sixth connection electrode 406 through the fifty-third via V53 to achieve an electrical connection with the first region of the active layer 340*a* of the data writing transistor 34*a* of the pixel circuit 30*a*. The data line DLb may be electrically connected to the sixteenth connection electrode 416 through the fifty-seventh via V57 to achieve an electrical connection with the data writing transistor 34*b* of the pixel circuit 30*b*. One of the second initial signal lines INIT2 may be electrically connected to the eighth connection electrode 408 through the fifty-first via V51, thereby achieving an electrical connection with the second reset transistor of the pixel circuit 30*a*. The other one of the second initial signal lines INIT2 may be electrically connected to the eighteenth connection electrode 418 through the fifty-fifth via V55, thereby achieving an electrical connection with the second reset transistor of the pixel circuit 30*b*. The first power supply line VDD may be electrically connected to the fourth connection electrode 404 through the fifty-second via V52 to achieve an electrical connection with the driving transistor 33*a* of the pixel circuit 30*a*, and may be electrically connected to the fourteenth connection electrode 414 through the fifty-sixth via V56 to achieve an electrical connection with the driving transistor 33*b* of the pixel circuit 30*b*. The first anode connection electrode 501 may also be electrically connected to the seventh connection electrode 407 through the fifty-fourth via V54 to achieve an electrical connection with the second control transistor 36*a* of the pixel circuit 30*a*. The second anode connection electrode 502 may be electrically connected to the seventeenth connection electrode 417 through the fifty-eighth via V58 to achieve an electrical connection with the second control transistor 36*b* of the pixel circuit 30*b*.

This example can facilitate a transmission stability of the first voltage signal by increasing a width of the first power supply line VDD. Moreover, an orthographic projection of the first power supply line VDD on the base substrate may cover an orthographic projection of the third connection electrode 403 on the base substrate, so that a connection node of the driving transistor 33*a*, the compensation transistor 32*a* and the storage capacitor of the pixel circuit 30*a* (i.e., the first node of the pixel circuit 30*a*) may be covered. The orthographic projection of the first power supply line VDD on the base substrate may also cover an orthographic projection of the thirteenth connection electrode 413 on the base substrate, so that a connection node of the driving transistor 33*b*, the compensation transistor 32*b* and the storage capacitor of the pixel circuit 30*b* (i.e., the first node of the pixel circuit 30*b*) may be covered. In this example, the first node of the pixel circuit is covered by the first power supply line VDD, so that the first node can be prevented from being interfered by other signals around it.

(11) Forming a seventh insulation layer, a light emitting structure layer, and an encapsulation structure layer sequentially.

In some examples, a seventh insulation thin film is coated on the base on which the aforementioned patterns are formed, and the seventh insulation thin film is patterned through a patterning process to form a seventh insulation layer. Subsequently, an anode thin film is deposited on the base substrate on which the aforementioned patterns are formed, and the anode thin film is patterned through a patterning process to form an anode layer. Then, a pixel definition thin film is coated and a pixel definition layer is formed by masking, exposure and development processes. The pixel definition layer may be formed with multiple pixel openings exposing the anode layer. An organic emitting layer is formed in the pixel openings formed earlier, and the organic light emitting layer is connected with the anode layer. Subsequently, a cathode thin film is deposited, the cathode thin film is patterned through a patterning process to form a cathode layer, and the cathode layer is connected with the organic emitting layer. Then, the encapsulation structure layer is formed on the cathode layer, for example, the encapsulation structure layer may include a stacked structure of an inorganic material/an organic material/an inorganic material.

In some examples, the first conductive layer, the second conductive layer, the third conductive layer, the fourth conductive layer, and the fifth conductive layer may be made of a metal material, such as, any one or more of silver (Ag), copper (Cu), aluminum (Al), and molybdenum (Mo), or an alloy material of the above metals, such as, an aluminum-neodymium alloy (AlNd), or a molybdenum-niobium alloy (MoNb), which may be in a single layer structure, or a multi-layer composite structure, such as, Mo/Cu/Mo, etc. The first insulation layer, the second insulation layer, the third insulation layer, the fourth insulation layer, and the fifth insulation layer may be made of any one or more of Silicon Oxide ($SiO_x$), Silicon Nitride ($SiN_x$), and Silicon OxyNitride (SiON), and may be in a single layer, a multi-layer, or a composite layer. The sixth insulation layer and the seventh insulation layer may be made of an organic material, such as polyimide, acrylic, or polyethylene terephthalate. The pixel definition layer may be made of an organic material, such as polyimide, acrylic, or polyethylene terephthalate. The anode layer may be made of a reflective material such as a metal and the cathode layer may be made of a transparent conductive material. However, this embodiment is not limited thereto.

A structure and a manufacturing process of the display substrate of this embodiment are merely illustrative. In some examples, a corresponding structure may be changed and a patterning process may be added or reduced according to actual needs. The manufacturing process of this example may be implemented using an existing mature manufacturing equipment, and may be compatible well with an existing manufacturing process, simple in process implementation, easy to implement, high in a production efficiency, low in production cost, and high in a yield.

Figure 43:
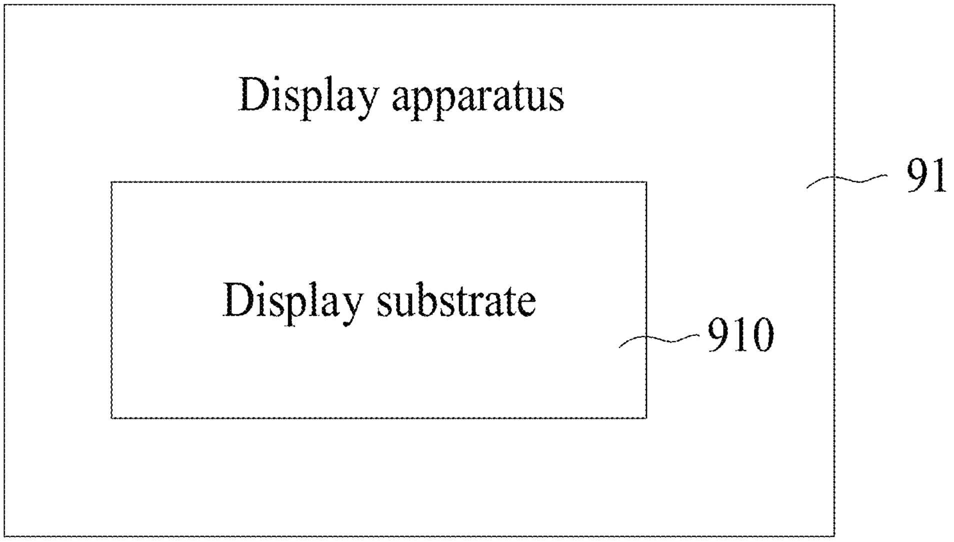
FIG. 43 is a schematic diagram of a display device according to at least one embodiment of the present disclosure.

FIG. 43 is a schematic diagram of a display device according to at least one embodiment of the present disclosure. In some examples, as shown in FIG. 43, this embodiment provides a display device 91, including the display substrate 910 in the aforementioned embodiments. In some examples, the display substrate 910 may include an OLED display substrate, a QLED display substrate, a Micro-LED display substrate, or a Mini-LED display substrate. The display device 91 may be any product or component with a display function, such as a mobile phone, a tablet computer, a television, a display, a laptop computer, a digital photo frame, and a navigator. However, this embodiment is not limited thereto.

The drawings of the present disclosure only involve structures involved in the present disclosure, and other structures may refer to conventional designs. The embodiments of the present disclosure and features in the embodiments may be combined to each other to obtain new embodiments if there is no conflict. Those of ordinary skills in the art should understand that modifications or equivalent replacements may be made to the technical solutions of the present disclosure without departing from the essence and scope of the technical solutions of the present disclosure, and shall all fall within the scope of the claims of the present disclosure.

The invention claimed is:

1. A pixel circuit comprising: a driving sub-circuit, a data writing sub-circuit, a compensation sub-circuit, a storage sub-circuit, a first control sub-circuit, and a voltage stabilizing sub-circuit;

the driving sub-circuit is coupled with a first power supply line, a first node and a third node, and is configured to provide a driving signal to the third node under control of the first node;

the storage sub-circuit is coupled with the first node and a second node;

the data writing sub-circuit is coupled with a data line, a first scan line and the second node, and is configured to write a data signal provided by the data line into the first node through the storage sub-circuit under control of the first scan line;

the compensation sub-circuit is coupled with a second scan line, the first node, and a third node, and is configured to turn on between the first node and the third node under control of the second scan line to write a threshold voltage of the driving sub-circuit into the first node;

the voltage stabilizing sub-circuit is coupled with the first node and a fifth node; and the first control sub-circuit is coupled with a first control line, a reference voltage line and the fifth node, and is configured to provide a reference voltage signal provided by the reference voltage line to the fifth node under control of the first control line after the data signal is written into the first node;

further comprising: a second control sub-circuit, wherein the second control sub-circuit is coupled with a second control line, the third node and a fourth node, and is configured to transmit the driving signal to the fourth node under control of the second control line, and the fourth node is coupled with a light emitting element;

the pixel circuit further comprises: a first reset sub-circuit, wherein the first reset sub-circuit is coupled with a first reset control line, a first initial signal line and the third node, and is configured to transmit a first initial signal provided by the first initial signal line to the third node under control of the first reset control line; and a second reset sub-circuit, wherein the second reset sub-circuit is coupled with a second reset control line, a second initial signal line and the fourth node, and is configured to transmit a second initial signal provided by the second initial signal line to the fourth node under control of the second reset control line.

2. The pixel circuit according to claim 1, wherein the driving sub-circuit comprises: a driving transistor; a gate of the driving transistor is coupled with the first node, a first electrode of the driving transistor is coupled with the first power supply line, and a second electrode of the driving transistor is coupled with the third node;

the data writing sub-circuit comprises a data writing transistor, wherein a gate of the data writing transistor is coupled with the first scan line, a first electrode of the data writing transistor is coupled with the data line, and a second electrode of the data writing transistor is coupled with the second node;

the compensation sub-circuit comprises a compensation transistor, wherein a gate of the compensation transistor is coupled with the second scan line, a first electrode of the compensation transistor is coupled with the first node, and a second electrode of the compensation transistor is coupled with the third node;

the storage sub-circuit comprises a storage capacitor, wherein a first plate of the storage capacitor is coupled with the first node, and a second plate of the storage capacitor is coupled with the second node;

the voltage stabilizing sub-circuit comprises a voltage stabilizing capacitor, wherein a first plate of the voltage stabilizing capacitor is coupled with the first node, and a second plate of the voltage stabilizing capacitor is coupled with the fifth node;

the first control sub-circuit comprises a first control transistor, wherein a gate of first control transistor is coupled with the first control line, a first electrode of first control transistor is coupled with the reference voltage line, and a second electrode of first control transistor is coupled with the fifth node;

the second control sub-circuit comprises a second control transistor, wherein a gate of the second control transistor is coupled with the second control line, a first electrode of the second control transistor is coupled with the third node, and a second electrode of the second control transistor is coupled with the fourth node;

the first reset sub-circuit comprises a first reset transistor, wherein a gate of the first reset transistor is coupled with the first reset control line, a first electrode of the first reset transistor is coupled with the first initial signal line, and a second electrode of the first reset transistor is coupled with the third node; and the second reset sub-circuit comprises a second reset transistor, wherein a gate of the second reset transistor is coupled with the second reset control line, a first electrode of the second reset transistor is coupled with the second initial signal line, and a second electrode of the second reset transistor is coupled with the fourth node.

3. A method for driving a pixel circuit, applied to the pixel circuit according to claim 1, the method comprising:

the data writing sub-circuit writing the data signal provided by the data line into the first node through the storage sub-circuit under control of the first scan line; the compensation sub-circuit turning on between the first node and the third node under control of the second scan line so that the threshold voltage of the driving sub-circuit is written into the first node; and the first control sub-circuit providing the reference voltage signal provided by the reference voltage line to the fifth node under control of the first control line, and a potential of the first node is maintained by the voltage stabilizing sub-circuit.

4. The method according to claim 3, further comprising: a first reset control line transmitting a first initial signal provided by a first initial signal line to the third node under control of the first reset control line before and after the compensation sub-circuit writes the threshold voltage of the driving sub-circuit into the first node.

* * * * *